United States Patent
Kobata et al.

(10) Patent No.: US 7,101,465 B2
(45) Date of Patent: *Sep. 5, 2006

(54) ELECTROLYTIC PROCESSING DEVICE AND SUBSTRATE PROCESSING APPARATUS

(75) Inventors: Itsuki Kobata, Tokyo (JP); Mitsuhiko Shirakashi, Tokyo (JP); Masayuki Kumekawa, Tokyo (JP); Takayuki Saito, Fujisawa (JP); Yasushi Toma, Fujisawa (JP); Tsukuru Suzuki, Fujisawa (JP); Kaoru Yamada, Fujisawa (JP); Yuji Makita, Fujisawa (JP); Hozumi Yasuda, Tokyo (JP)

(73) Assignee: Ebara Corporation, Tokyo (JP)

( * ) Notice: Subject to any disclaimer, the term of this patent is extended or adjusted under 35 U.S.C. 154(b) by 647 days.

This patent is subject to a terminal disclaimer.

(21) Appl. No.: 10/337,357

(22) Filed: Jan. 7, 2003

(65) Prior Publication Data

US 2003/0136668 A1    Jul. 24, 2003

Related U.S. Application Data

(63) Continuation-in-part of application No. 10/296,333, filed on Feb. 21, 2002.

(60) Provisional application No. PCT/JP02/01545, filed on Feb. 21, 2002, now abandoned.

(30) Foreign Application Priority Data

Jan. 7, 2002 (JP) .............................. 2002-000838
Apr. 26, 2002 (JP) .............................. 2002-126400

(51) Int. Cl.
*C25D 17/00* (2006.01)

(52) U.S. Cl. ................. 204/198; 204/224 M; 204/227; 204/275.1

(58) Field of Classification Search ................ 204/198, 204/224 M, 227, 275.1
See application file for complete search history.

(56) References Cited

U.S. PATENT DOCUMENTS

| | | | |
|---|---|---|---|
| 6,121,152 A | 9/2000 | Adams et al. | |
| 6,368,493 B1 | 4/2002 | Mori et al. | |
| 6,602,396 B1 * | 8/2003 | Mori et al. | 205/652 |
| 6,743,349 B1 * | 6/2004 | Mori et al. | 205/652 |
| 6,875,335 B1 * | 4/2005 | Mori et al. | 205/652 |

* cited by examiner

*Primary Examiner*—Arun S. Phasge
(74) *Attorney, Agent, or Firm*—Wenderoth, Lind & Ponack, L.L.P.

(57) ABSTRACT

There is provided an electrolytic processing device including: a processing electrode to be brought into contact with or close to a workpiece; a feeding electrode for supplying electricity to the workpiece; an ion exchanger disposed in at least one of spaces between the workpiece and the processing electrode, and between the workpiece and the feeding electrode; a power source for applying a voltage between the processing electrode and the feeding electrode; and a liquid supply section for supplying a liquid to the space between the workpiece and at least one of the processing electrode and the feeding electrode, in which the ion exchanger is present. A substrate processing apparatus having the electrolytic processing device is also provided.

62 Claims, 60 Drawing Sheets

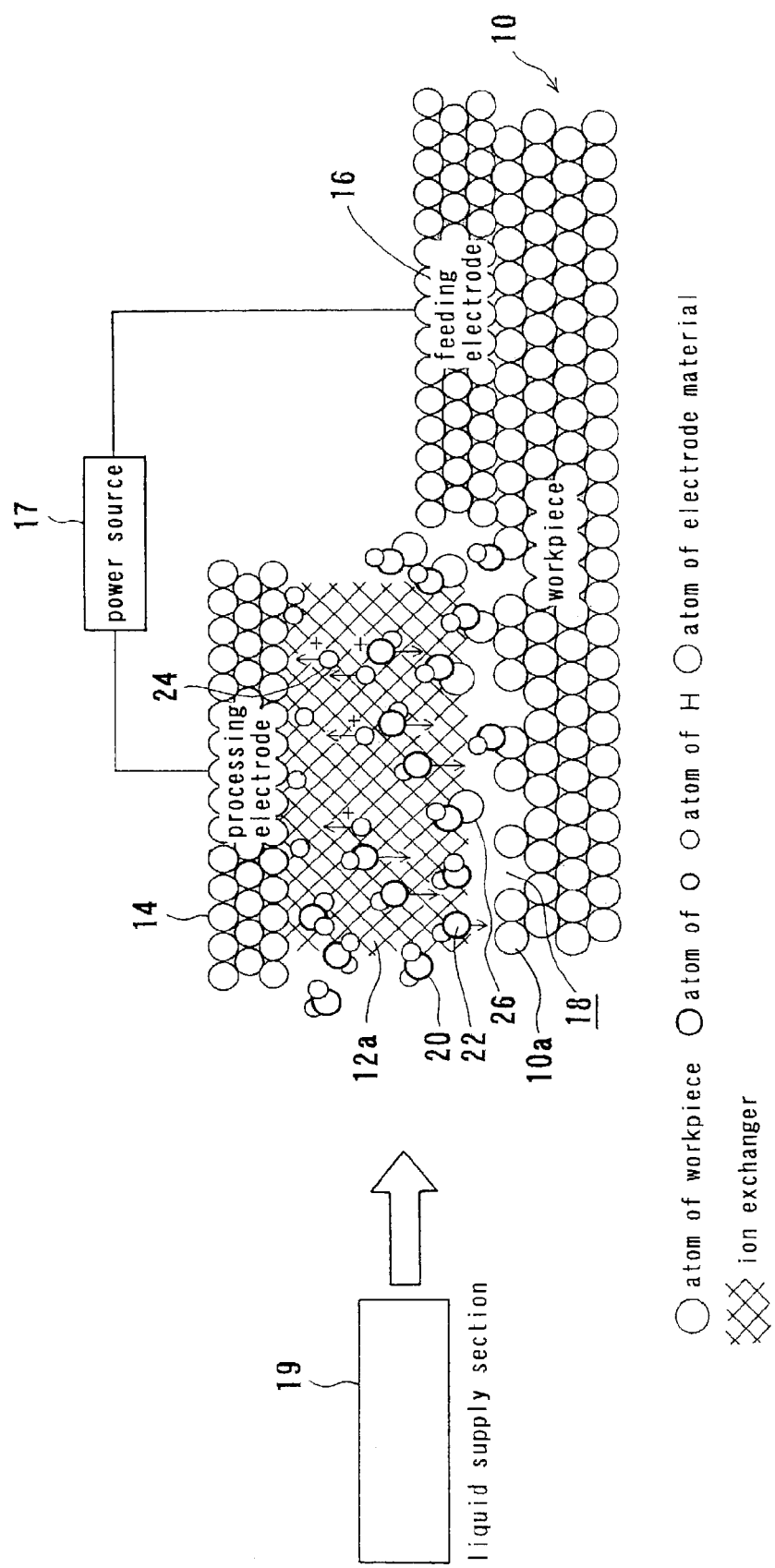

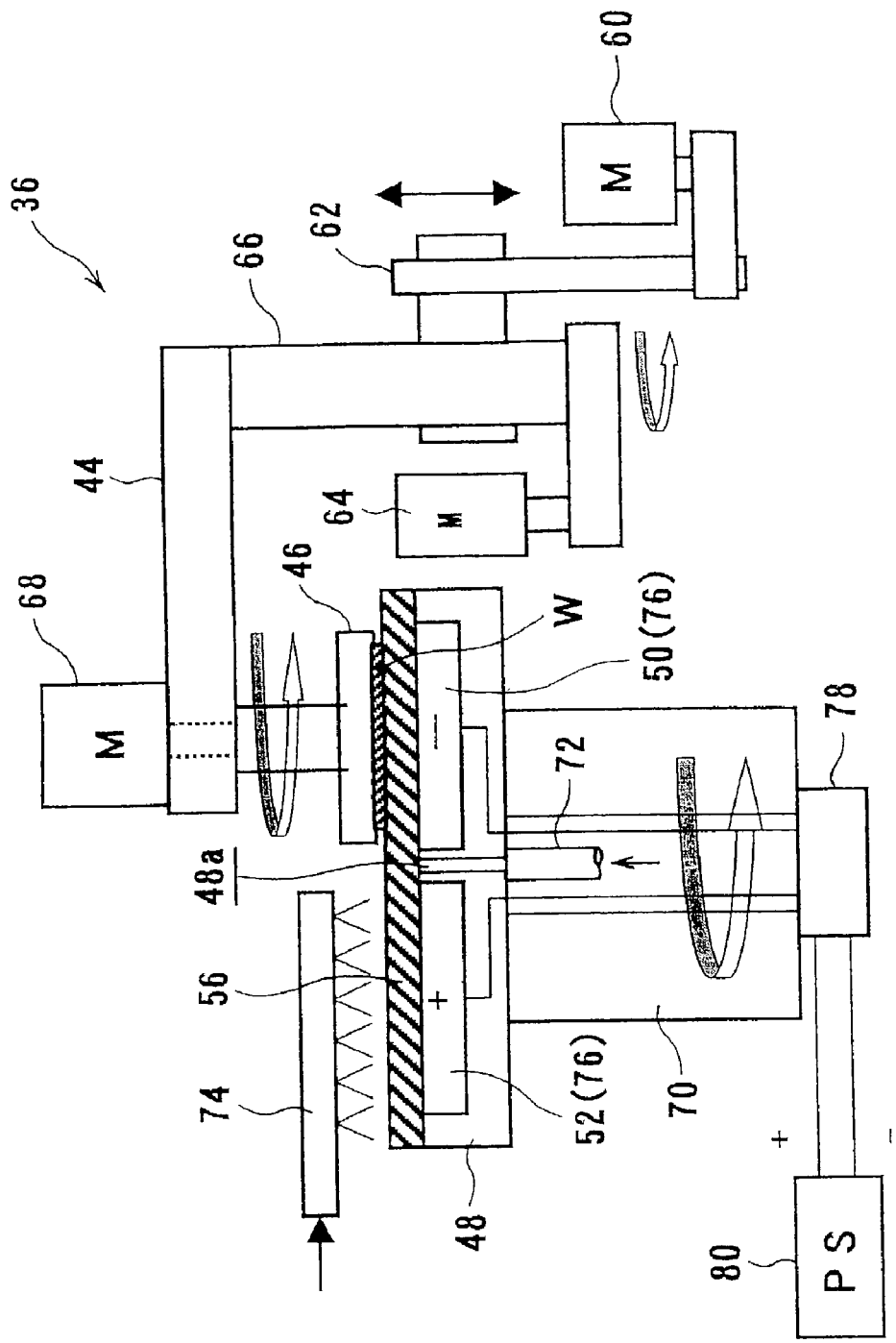

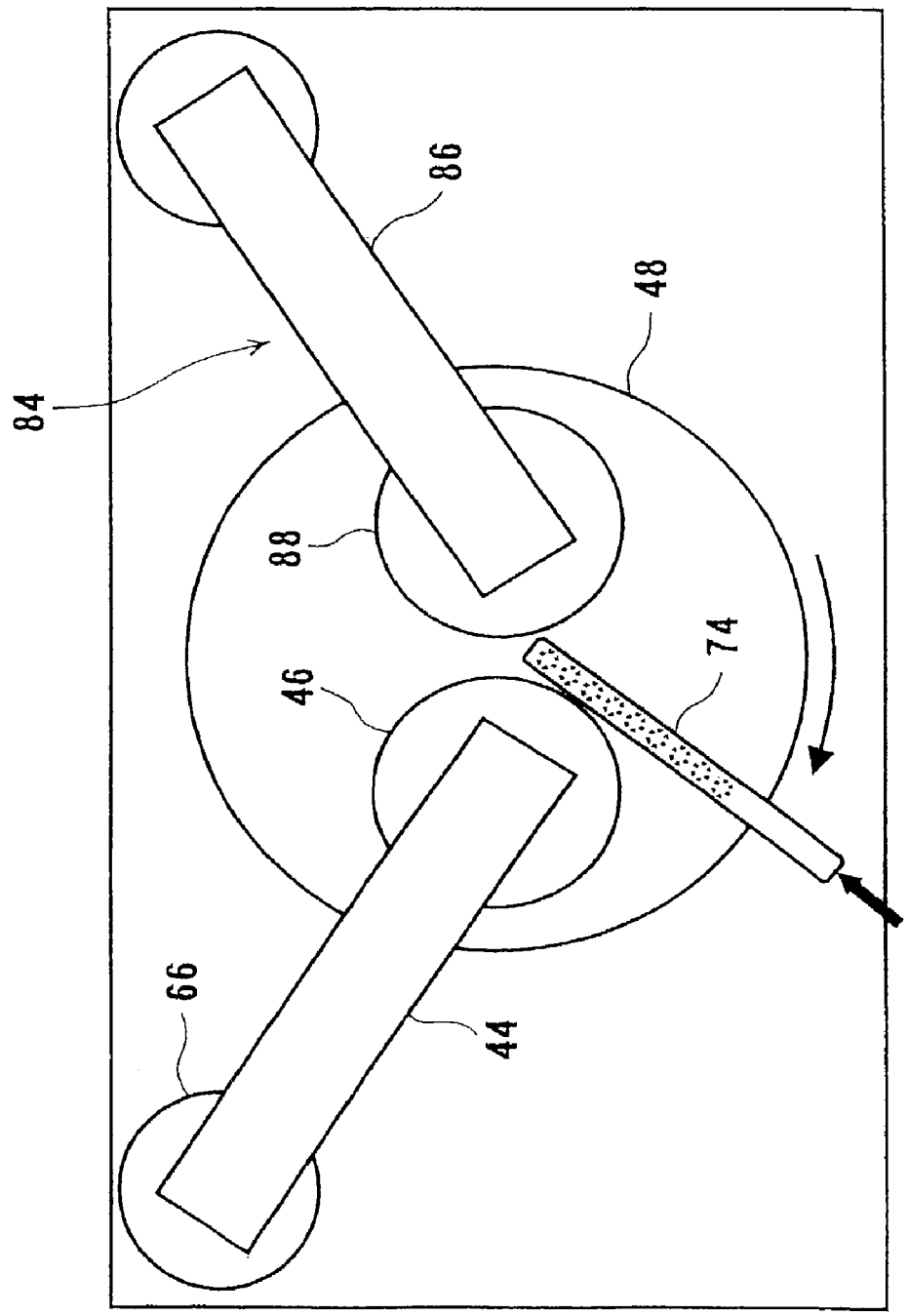

F I G. 1 8
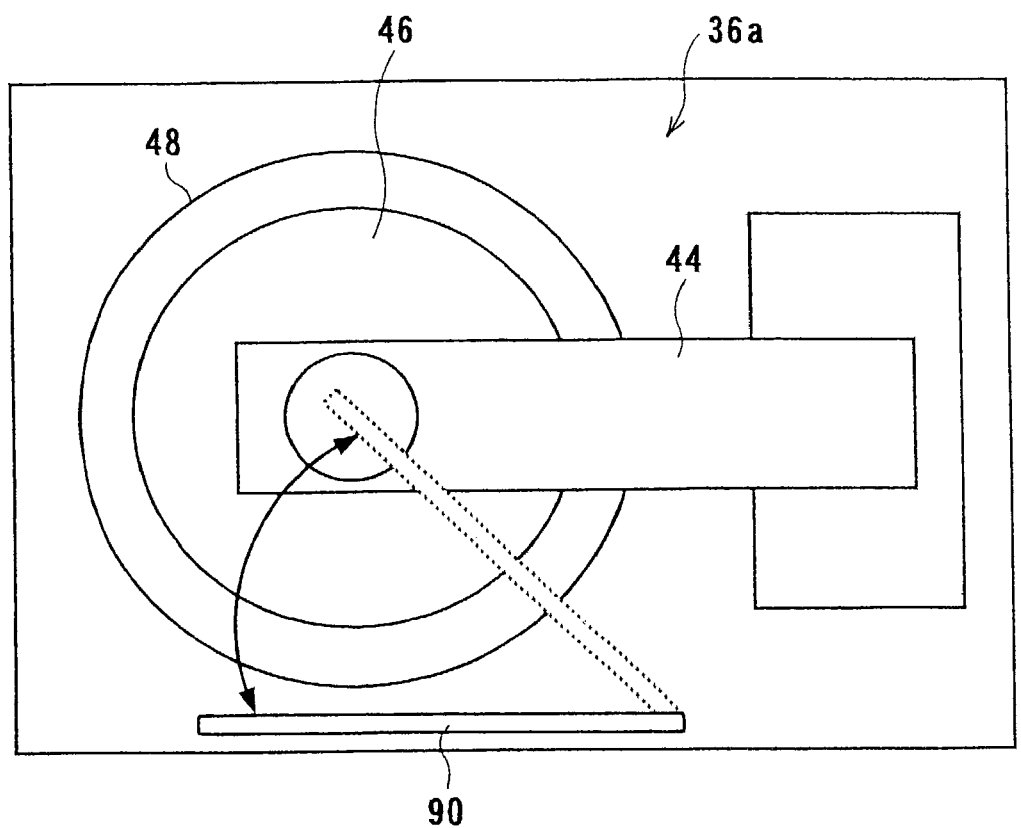

F I G. 19A
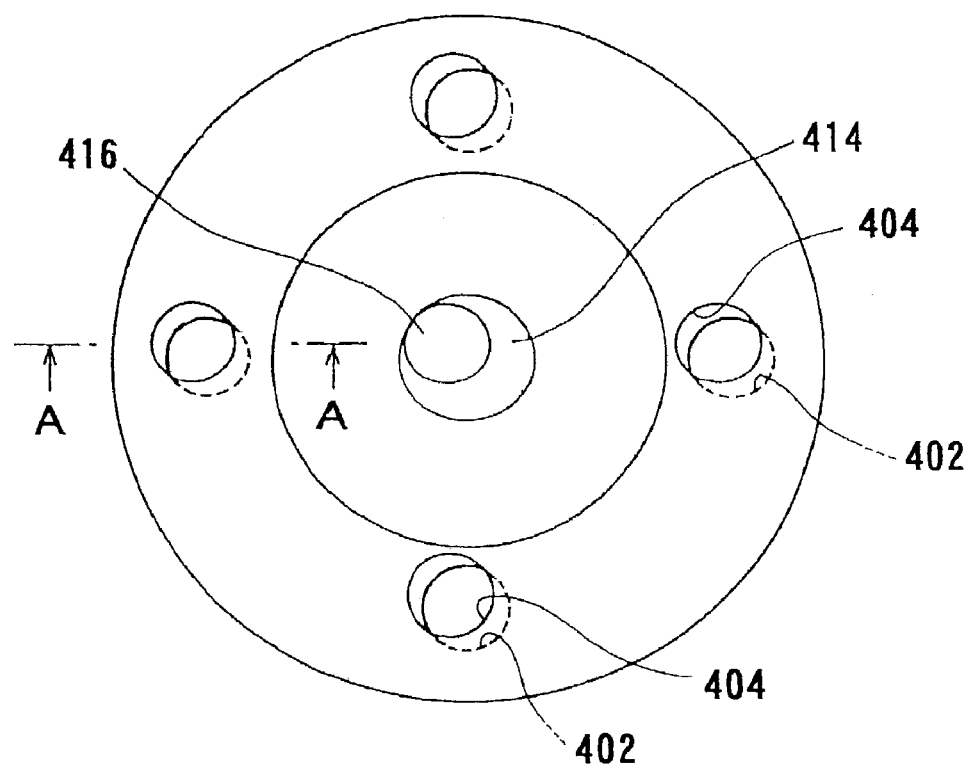
F I G. 19B
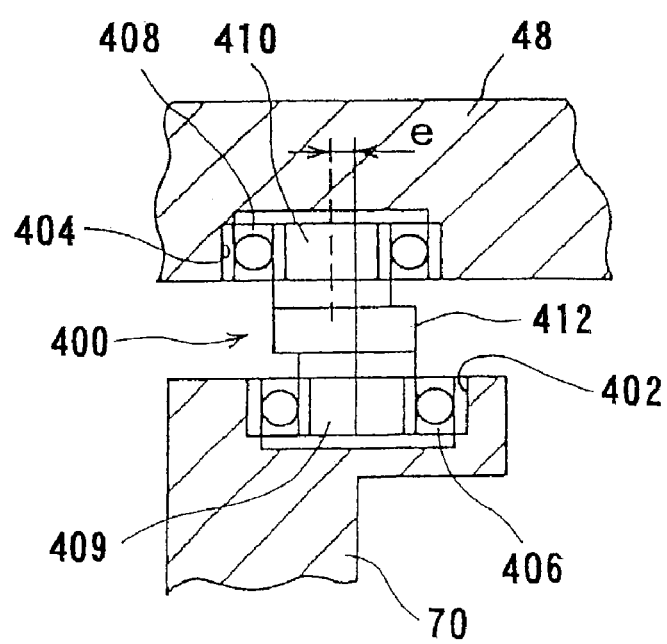

F I G. 2 0
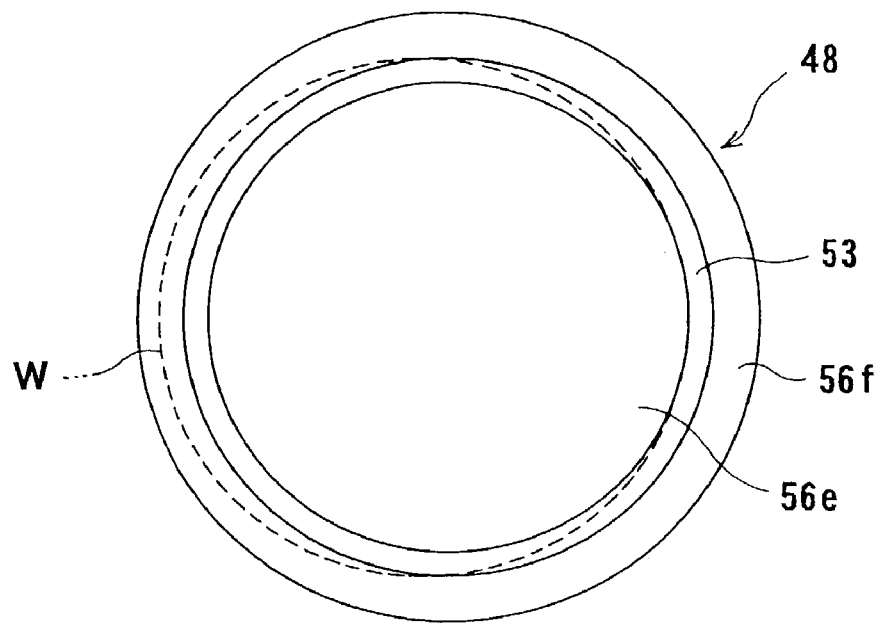
F I G. 2 1
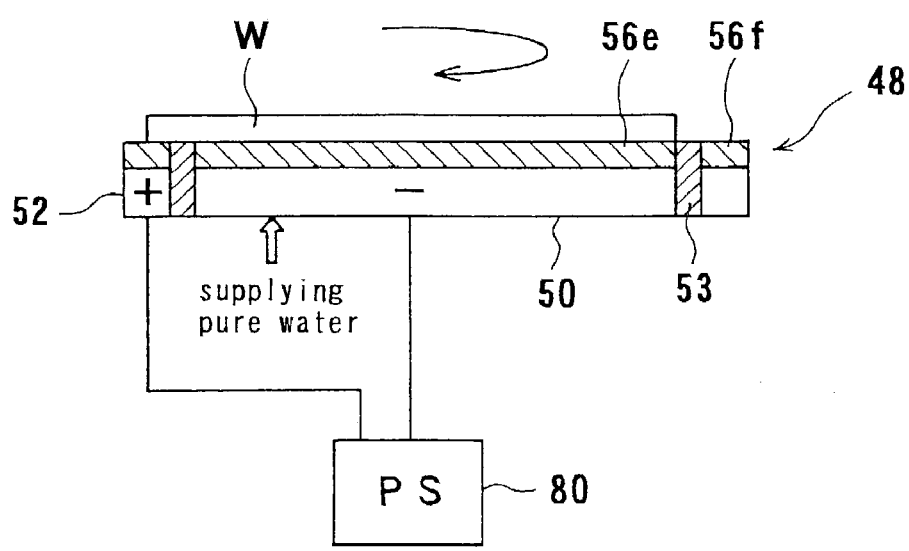

F I G. 23
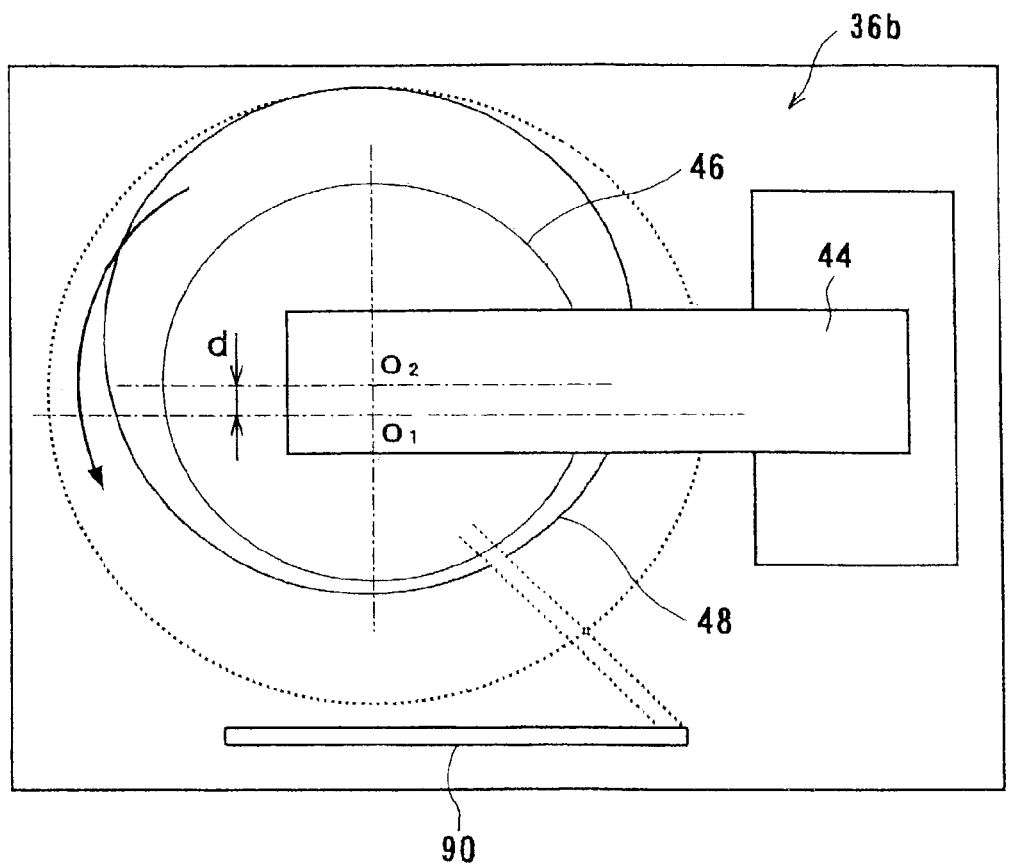

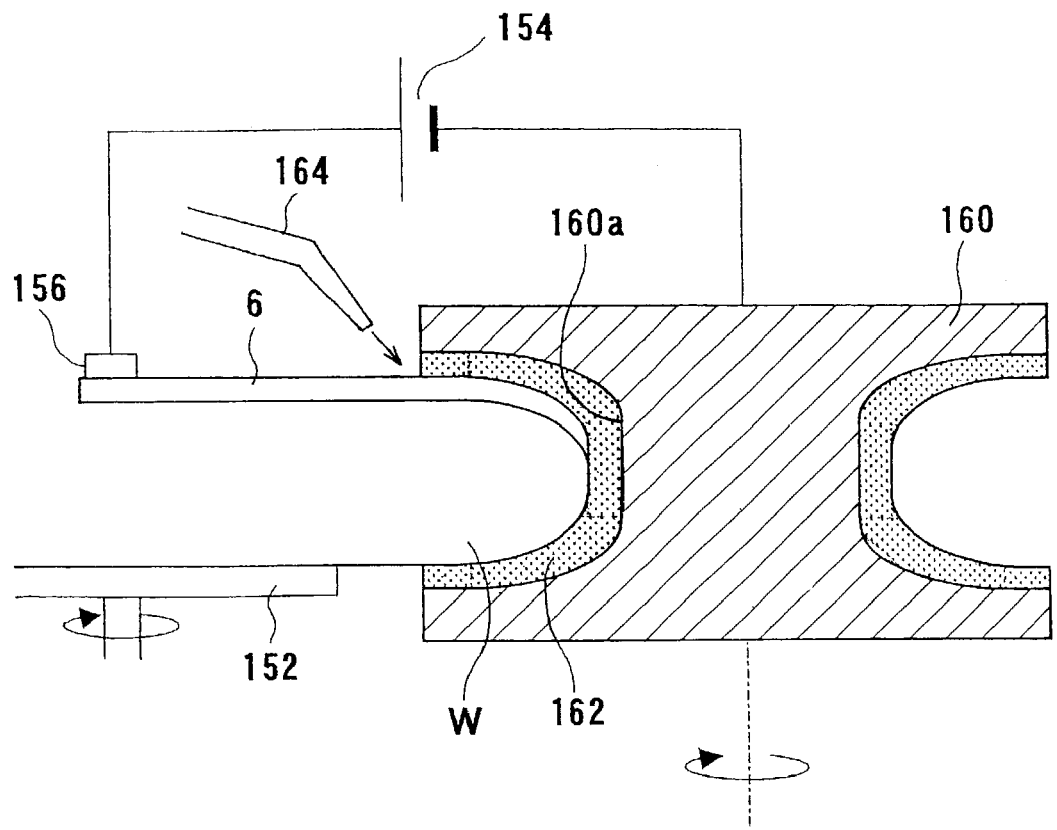
F I G. 41
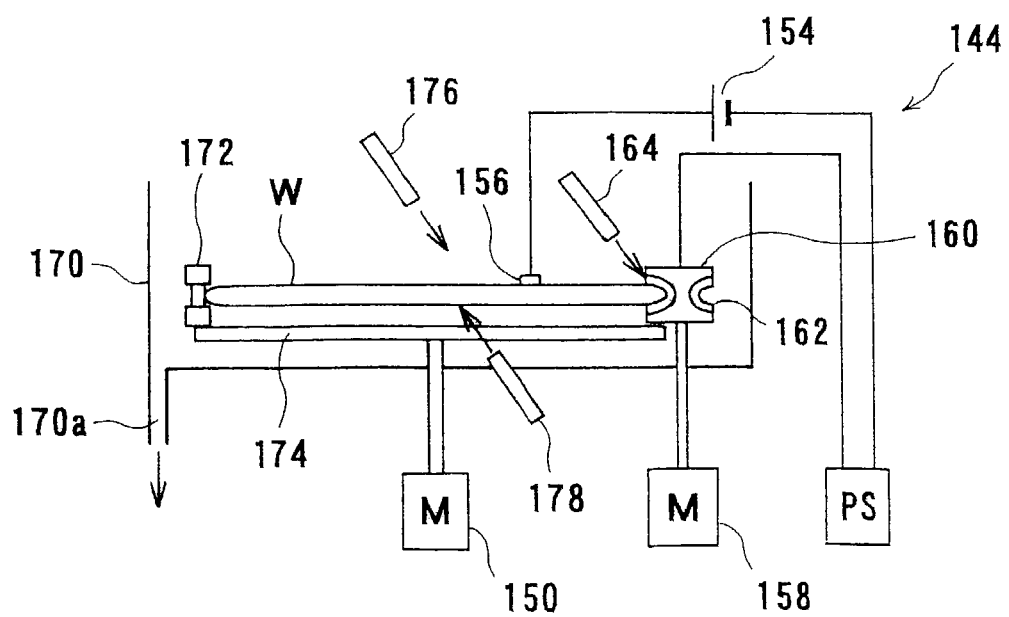
F I G. 42

F I G. 5 0
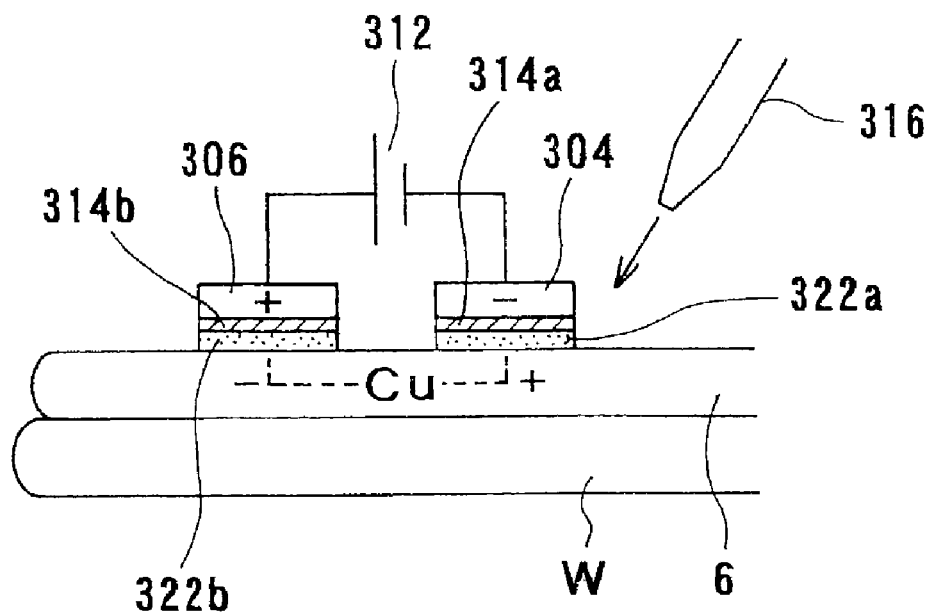
F I G. 5 1
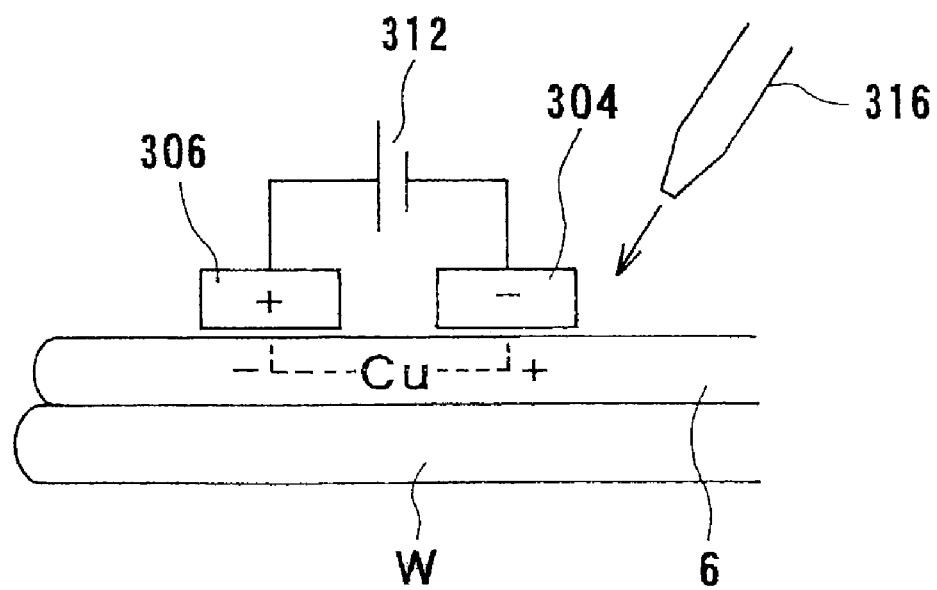

F I G. 6 4
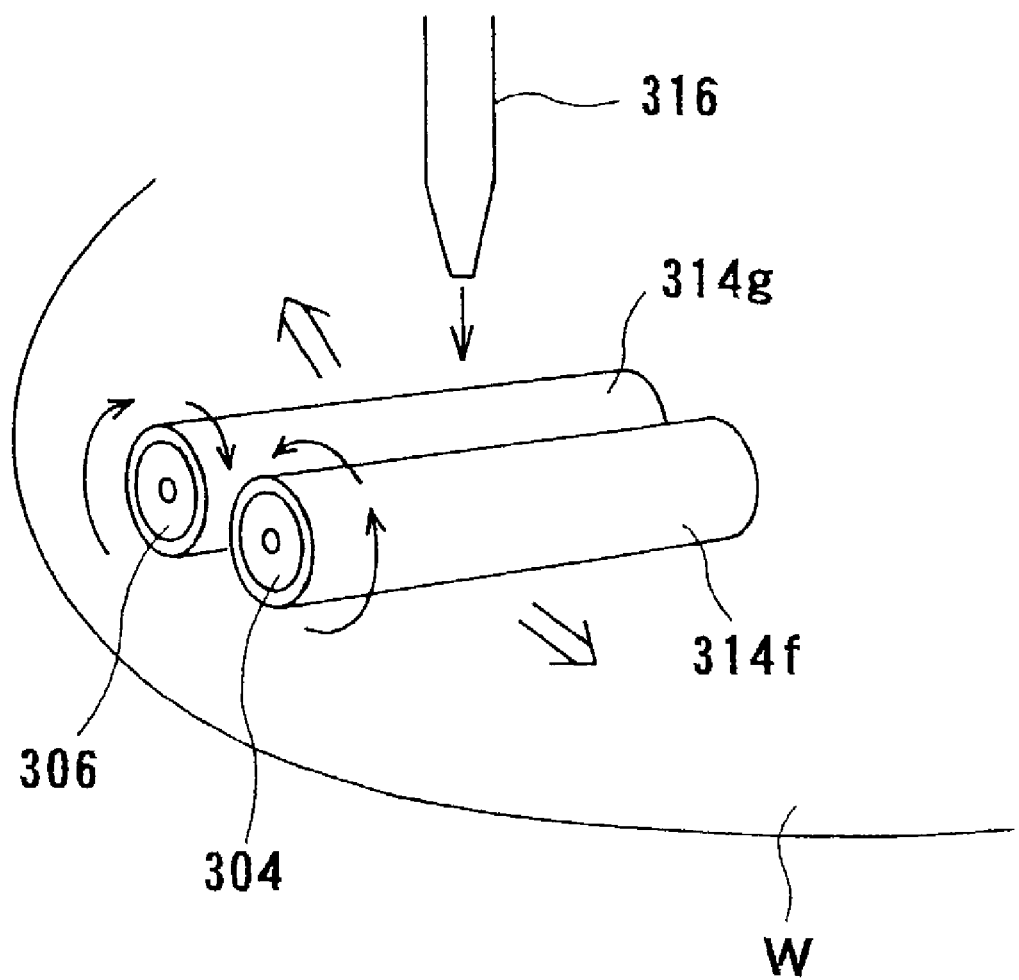

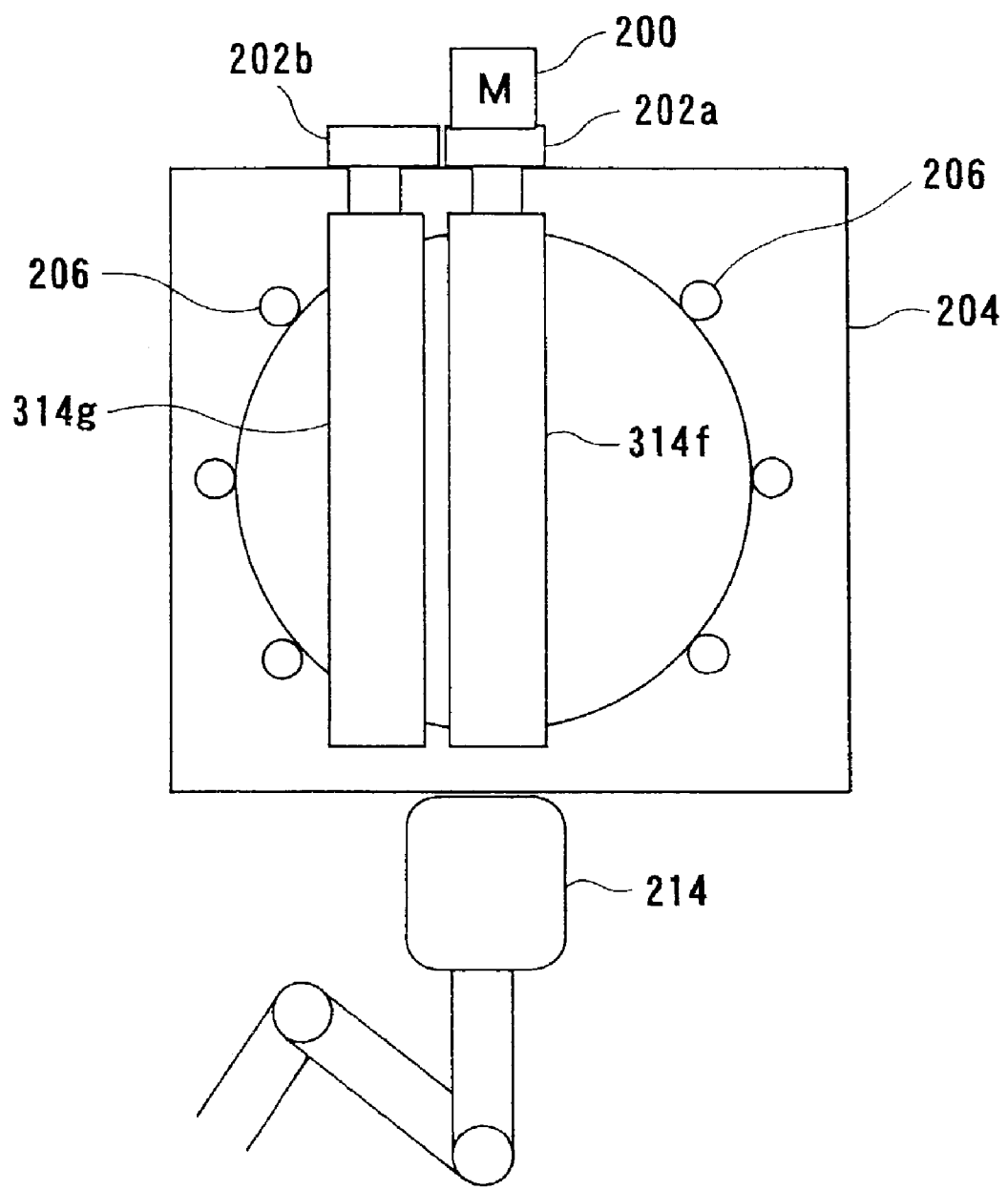
F I G. 67

F I G. 76
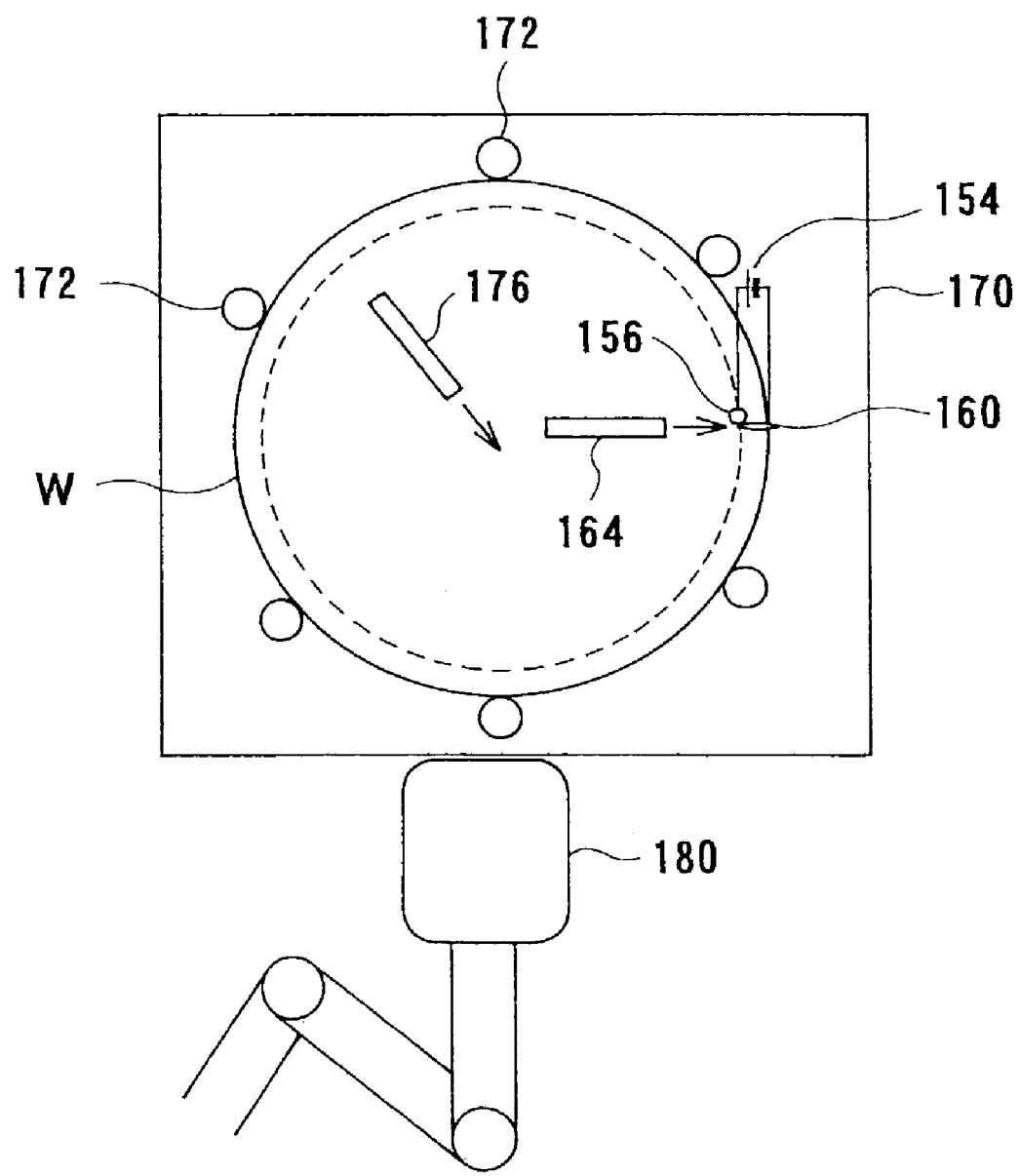

F I G. 86
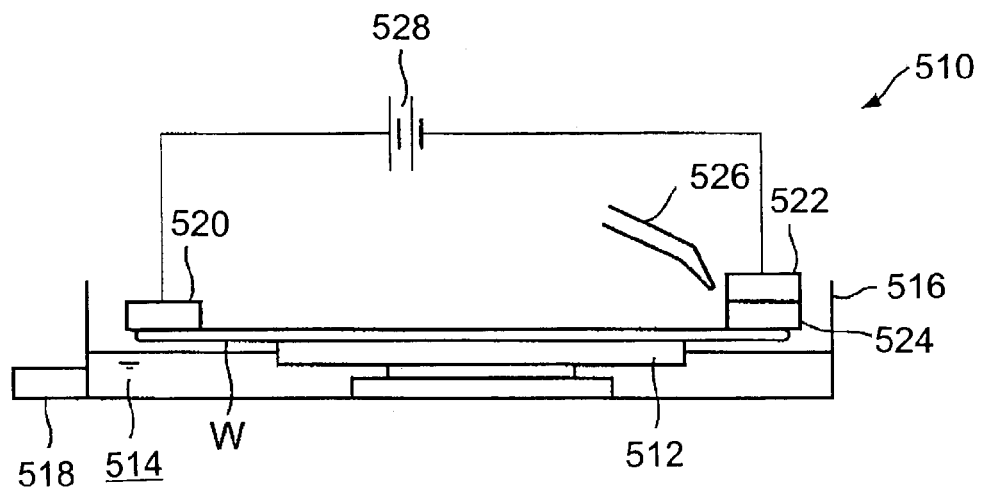
F I G. 87
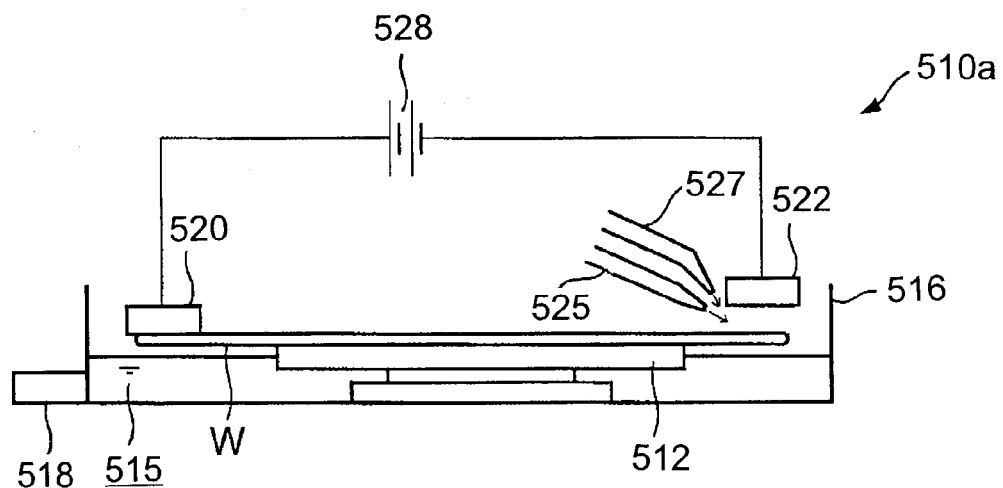

ELECTROLYTIC PROCESSING DEVICE AND SUBSTRATE PROCESSING APPARATUS

This is a continuation-in-part of U.S. patent application Ser. No. 10/296,333, now abandoned, which is a National Stage of PCT/JP02/01545, filed on Feb. 21, 2002.

BACKGROUND OF THE INVENTION

1. Field of the Invention

This invention relates to an electrolytic processing device and a substrate processing apparatus provided with the electrolytic processing device, and more particularly to an electrolytic processing device useful for processing a conductive material present on a surface of a substrate, especially a semiconductor wafer, or for removing impurities adhering to a surface of a substrate, and a substrate processing apparatus provided with the electrolytic processing device.

2. Description of the Related Art

In recent years, instead of using aluminum or aluminum alloys as a material for forming interconnection circuits on a substrate such as a semiconductor wafer, there is an eminent movement towards using copper (Cu) which has a low electric resistance and high electromigration resistance. Copper interconnects are generally formed by filling copper into fine recesses formed in a surface of a substrate. There are known various techniques for forming such copper interconnects, including CVD, sputtering, and plating. According to any such technique, a copper film is formed on substantially an entire surface of a substrate, followed by removal of unnecessary copper by performing chemical mechanical polishing (CMP).

FIGS. 85A through 85C illustrate, in sequence of process steps, an example of forming such a substrate W having copper interconnects. As shown in FIG. 85A, an insulating film 2, such as a silicon oxide film/a film of silicon oxide ($SiO_2$) or a film of low-k material, is deposited on a conductive layer 1a in which electronic devices are formed, which is formed on a semiconductor base 1. A contact hole 3 and a trench 4 for interconnects are formed in the insulating film 2 by performing a lithography and etching technique. Thereafter, a barrier layer 5 of TaN or the like is formed on an entire surface, and a seed layer 7 as an electric supply layer for electroplating is formed on the barrier layer 5.

Then, as shown in FIG. 85B, copper plating is performed onto a surface of the substrate W to fill the contact hole 3 and the trench 4 with copper and, at the same time, deposit a copper film 6 on the insulating film 2. Thereafter, the copper film 6 on the insulating film 2 is removed by performing chemical mechanical polishing (CMP) so as to make a surface of the copper film 6 filled in the contact hole 3 and the trench 4 for interconnects and a surface of the insulating film 2 lie substantially in the same plane. An interconnection composed of the copper film 6 as shown in FIG. 85C is thus formed.

Components in various types of equipment have recently become finer and have required higher accuracy. As submicro manufacturing technology has commonly been used, properties of materials are largely influenced by a processing method. Under these circumstances, in such a conventional machining method that a desired portion in a workpiece is physically destroyed and removed from a surface thereof by a tool, a large number of defects may be produced to deteriorate properties of the workpiece. Therefore, it becomes important to perform processing without deteriorating properties of materials.

Some processing methods, such as chemical polishing, electrolytic processing, and electrolytic polishing, have been developed in order to solve this problem. In contrast with conventional physical processing, these methods perform removal processing or the like through chemical dissolution reaction. Therefore, these methods do not suffer from defects, such as formation of an altered layer and dislocation, due to plastic deformation, so that processing can be performed without deteriorating properties of materials.

Chemical mechanical polishing (CMP), for example, generally necessitates a complicated operation and control, and needs a considerably long processing time. In addition, a sufficient cleaning of a substrate must be conducted after a polishing treatment. This also imposes a considerable load on slurry or cleaning liquid waste disposal. Accordingly, there is a strong demand for omitting CMP entirely or reducing a load upon CMP. Also in this connection, it is to be pointed out that though a low-k material, which has a low dielectric constant, is expected to be predominantly used in the future as a material for an insulating film of a semiconductor substrate, the low-k material has a low mechanical strength and therefore has difficulty in enduring stress applied during CMP processing. Thus, also from this standpoint, there is a demand for a technique that enables flattening of a substrate without applying any stress thereto.

Further, a method has been reported which performs CMP processing simultaneously with plating, viz. chemical mechanical electrolytic polishing. According to this method, mechanical processing is performed to a growing surface of a plating film, causing a problem of denaturing of a resulting film.

In a case of the above-mentioned electrolytic processing or electrolytic polishing, processing proceeds through an electrochemical interaction between a workpiece and an electrolytic solution (aqueous solution of NaCl, $NaNO_3$, HF, HCl, $HNO_3$, NaOH, and the like). Since an electrolytic solution containing such an electrolyte must be used, contamination of a workpiece with the electrolyte cannot be avoided.

In recent years, metals of the platinum group or their oxides have become candidates for an electrode material for use in forming a capacitor, which utilizes a high dielectric or ferroelectric material, on a semiconductor substrate. Among them ruthenium, because of its good film-forming properties and good processibility for patterning, is being progressively studied as a feasible material.

A ruthenium film can be formed on a substrate generally by performing sputtering or CVD. In either method, deposition of the ruthenium film on an entire front surface of a substrate, including a peripheral region, is performed. As a result, a ruthenium film is formed also in the peripheral region of the substrate and, in addition, a back surface of the substrate is unavoidably contaminated with ruthenium.

The ruthenium film formed on or adhering to the peripheral region or back surface of the substrate, i.e. a non-circuit region of the substrate, is not only unnecessary, but can also cause cross-contamination during later transfer, storage and various processing steps of the substrate whereby, for instance, performance of a dielectric material can be lowered. Accordingly, during a process for forming a ruthenium film or after peforming some treatments of a formed ruthenium film, it is necessary to completely remove unnecessary portions of this ruthenium film. Further, in a case of using ruthenium as an electrode material for forming a capacitor, a step for removing part of a ruthenium film formed on a circuit region of a substrate is needed.

SUMMARY OF THE INVENTION

The present invention has been made in view of the above situation in the related art. It is therefore an object of the present invention to provide an electrolytic processing device which, while omitting a CMP treatment entirely or reducing a load upon a CMP treatment to a least possible extent, can process a conductive material formed on a surface of a substrate to flatten material, or can remove (clean) extraneous matter adhering to a surface of a workpiece such as a substrate, and also to provide a substrate processing apparatus in which the electrolytic processing device is incorporated.

In order to achieve the above object, the present invention provides an electrolytic processing device, comprising: a processing electrode to be brought into contact with or close to a workpiece; a feeding electrode for supplying electricity to the workpiece; an ion exchanger disposed in at least one of spaces between the workpiece and the processing electrode, and between the workpiece and the feeding electrode; a power source for applying a voltage between the processing electrode and the feeding electrode; and a liquid supply section for supplying a liquid to the space between the workpiece and at least one of the processing electrode and the feeding electrode, in which the ion exchanger is present.

FIGS. 1 and 2 illustrate a principle of electrolytic processing effected in the above electrolytic processing device. FIG. 1 shows an ionic state in the electrolytic processing device when a ion exchanger 12a mounted on a processing electrode 14 and a ion exchanger 12b mounted on a feeding electrode 16 are brought into contact with or close to a surface of a workpiece 10, while a voltage is applied via a power source 17 between the processing electrode 14 and the feeding electrode 16, and a liquid 18, e.g. ultrapure water, is supplied from a liquid supply section 19 between the processing electrode 14, the feeding electrode 16 and the workpiece 10. FIG. 2 shows an ionic state in the electrolytic processing device when the ion exchanger 12a mounted on the processing electrode 14 is brought into contact with or close to the surface of the workpiece 10 and the feeding electrode 16 is directly contacted with the workpiece 10, while a voltage is applied via the power source 17 between the processing electrode 14 and the feeding electrode 16, and the liquid 18, such as ultrapure water, is supplied from the liquid supply section 19 between the processing electrode 14 and the workpiece 10.

When a liquid like ultrapure water that in itself has a large resistivity is used, it is preferred to bring the ion exchanger 12a into contact with the surface of the workpiece 10. This can lower electric resistance, lower a requisite voltage and reduce power consumption. The "contact" in the present electrolytic processing does not imply "press" for applying a physical energy (stress) to a workpiece as in CMP.

Water molecules 20 in the liquid 18 such as ultrapure water are dissociated by the ion exchangers 12a, 12b into hydroxide ions 22 and hydrogen ions 24. The hydroxide ions 22 thus produced, for example, are carried, by an electric field between the workpiece 10 and the processing electrode 14 and by flow of the liquid 18, to the surface of the workpiece 10 opposite to the processing electrode 14 whereby a density of the hydroxide ions 22 in the vicinity of the workpiece 10 is enhanced, and the hydroxide ions 22 are reacted with atoms 10a of the workpiece 10. A reaction product 26 produced by this reaction is dissolved in the liquid 18, and removed from the workpiece 10 by flow of the liquid 18 along the surface of the workpiece 10. Removal processing of the surface of the workpiece 10 is thus effected.

As will be appreciated from the above, removal processing according to the present invention is effected purely by an electrochemical interaction between reactant ions and the workpiece. The present electrolytic processing thus clearly differs in a processing principle from CMP according to which processing is effected by a combination of a physical interaction between an abrasive and a workpiece, and a chemical interaction between a chemical species in a polishing liquid and the workpiece.

According to the above-described method, a portion of the workpiece 10 facing the processing electrode 14 is processed. Therefore, by moving the processing electrode 14, the workpiece 10 can be processed into a desired surface configuration.

As described above, removal processing of the electrolytic processing device of the present invention is effected solely by a dissolution reaction due to an electrochemical interaction, and is clearly distinct from the processing principle from CMP in which processing is effected by the combination of the physical interaction between an abrasive and a workpiece, and the chemical interaction between a chemical species in a polishing liquid and the workpiece. Accordingly, the electrolytic processing device of the present invention can conduct removal processing of a surface of a workpiece without impairing properties of material of the workpiece. Even when the material of a workpiece is of a low mechanical strength, such as the above-described low-k material, removal processing of the surface of the workpiece can be effected without any physical damage to the workpiece. Further, as compared to conventional electrolytic processing devices, the electrolytic processing device of the present invention, due to use of a processing liquid having an electric conductivity of not more than 500 μS/cm, preferably pure water, more preferably ultrapure water, can remarkably reduce contamination of the surface of a workpiece with impurities and can facilitate disposal of waste liquid after processing.

The liquid may be pure water, a liquid having an electric conductivity (referring herein to that at 25° C., 1 atm) of not more than 500 μS/cm, or an electrolytic solution.

Pure water may be a water having an electric conductivity of not more than 10 μS/cm. Use of pure water in electrolytic processing enables a clean processing without leaving impurities on a processed surface of a workpiece, whereby a cleaning step after the electrolytic processing can be simplified. Specifically, one or two-stages of cleaning may suffice after the electrolytic processing.

It is also possible to use a liquid obtained by adding an additive, such as a surfactant, to pure water or ultrapure water, and having an electric conductivity of not more than 500 μS/cm, preferably not more than 50 μS/cm, more preferably not more than 0.1 μS/cm (resistivity of not less than 10 MΩ·cm). Such a liquid can form a layer, which functions to inhibit ion migration evenly, at an interface between a workpiece (e.g. substrate) and an ion exchanger, thereby moderating concentration of ion exchange (metal dissolution) to enhance flatness of a processed surface.

The additive plays a role to prevent local concentration of ions (e.g. hydroxide ions (OH$^-$)). It is noted in this regard that "an equal processing (removal) rate at various points over the entire processing surface" is an important factor for providing a flat processed surface. When a single electrochemical removal reaction is in progress, a local difference in a processing removal rate may be produced by a local concentration of reactant ions. The local concentration of reactant ions may be caused mainly by a deviation in an electric field intensity between a processing electrode and a feeding electrode, and a deviation in distribution of reactant ions in the vicinity of the surface of a workpiece. The local concentration of reactant ions can be prevented by allowing the additive, which plays a role to prevent local concentration of ions (e.g. hydroxide ions), to exist between a workpiece and an ion exchanger.

An aqueous solution of a neutral salt such as NaCl or $Na_2SO_4$, an acid such as HCl or $H_2SO_4$, or an alkali such as ammonia may be used as the electrolytic solution, and may be properly selected according to properties of a workpiece. When using electrolytic solution, it is better to use a low concentration electrolytic solution for which electric conductivity is not more than 500 µS/cm, to avoid much contamination.

In one embodiment of the electrolytic processing device of the present invention, the ion exchanger is disposed separately in the space between the processing electrode and a workpiece, and in the space between the feeding electrode and a workpiece. This prevents occurrence of "the so-called short circuit" between the processing electrode and the feeding electrode, and ensures a high processing efficiency.

According to another embodiment, the ion exchanger is disposed, as an integrated structure, in both of the spaces between the processing electrode and a workpiece, and between the feeding electrode and a workpiece. This facilitates production of the processing electrode and the feeding electrode, and can further lower electric resistance.

According to still another embodiment, the ion exchanger covers a surface, to be processed, of a workpiece, and is disposed in both of the spaces between the processing electrode and the workpiece, and between the feeding electrode and the workpiece. This makes it possible to easily and quickly change the ion exchanger covering a processing surface of a workpiece when, for example, the ion exchanger is stained.

In the above embodiments, the ion exchanger may be stretched between a supply shaft and a rewind shaft, and taken up sequentially. This makes it possible to change the ion exchanger by taking it up by a one-time use length when, for example, the ion exchanger is stained, whereby this change operation can be conducted in a successive manner.

In the case of the ion exchanger of this embodiment, the processing electrode and the feeding electrode may be mounted alternately on the ion exchanger at a given pitch along a length of the ion exchanger. This eliminates a need to provide electrode sections for supplying electricity separately, and thus can simplify the device.

The ion exchanger may have water-absorbing properties. This allows a liquid such as ultrapure water to flow within the ion exchanger.

The ion exchanger may have one or both of an anion-exchange ability and a cation-exchange ability. An ion exchanger having an anion-exchange ability and an ion exchanger having a cation-exchange ability can be used selectively according to a workpiece. Use of an ion-exchanger having both of anion-and cation-exchange abilities can broaden a range of processible materials and, in addition, can prevent formation of impurities due to polarity.

The ion exchanger may be covered with a porous body. This can provide a workpiece with a flatter processed surface. In this case, the ion exchanger itself may be composed of a porous body.

According to a preferred embodiment, the electrolytic processing device further comprises a regeneration section for regenerating the ion exchanger. By regenerating the ion exchanger during processing or in an interval of processing to remove extraneous matter, such as copper, from the ion exchanger, contamination of a new workpiece with matter coming from the ion exchanger can be prevented, and furthermore, lowering of a processing efficiency and accuracy can be avoided.

The present invention also provides an electrolytic processing device comprising: a processing electrode to be brought into contact with or close to a workpiece; a feeding electrode for supplying electricity to the workpiece; a power source for applying a voltage between the processing electrode and the feeding electrode; and a liquid supply section for supplying pure water or a liquid having an electric conductivity of not more than 500 µS/cm between the workpiece and the processing electrode.

FIG. 3 illustrates a principle of electrolytic processing effected by this electrolytic processing device. FIG. 3 shows an ionic state in the electrolytic processing device when a processing electrode 14 and a feeding electrode 16 are brought close to a surface of a workpiece 10, while a voltage is applied via a power supply source 17 between the processing electrode 14 and the feeding electrode 16, and liquid 18, such as ultrapure water, is supplied from a liquid supply section 19 between the processing electrode 14, the feeding electrode 16 and the workpiece 10.

Water molecules 20 in the liquid 18 such as ultrapure water are dissociated into hydroxide ions 22 and hydrogen ions 24. The hydroxide ions 22 thus produced are carried, by an electric field between the workpiece 10 and the processing electrode 14 and by the flow of the liquid 18, to the surface of the workpiece 10 opposite to the processing electrode 14 whereby a density of the hydroxide ions 22 in the vicinity of the workpiece 10 is enhanced, and the hydroxide ions 22 are reacted with atoms 10a of the workpiece 10. A reaction product 26 is dissolved in the liquid 18, and removed from the workpiece 10 by flow of the liquid 18 along the surface of the workpiece 10. Removal processing of the surface of the workpiece 10 is thus effected.

Ultrapure water is preferably used as the liquid. By "ultrapure water" is herein meant a water having an electric conductivity of not more than 0.1 µS/cm. Use of ultrapure water enables a cleaner processing without leaving impurities on a processed surface of a workpiece.

In the above-described electrolytic processing devices, according to one embodiment of the present invention, at least one of the processing electrode and the feeding electrode is in the shape of a flat rectangular plate.

According to another embodiment, at least one of the processing electrode and the feeding electrode is in the shape of a column, and is disposed such that a central axis thereof is parallel to a surface, to be processed, of a workpiece. This allows at least one of the processing electrode and the feeding electrode to linearly contact or get close to a workpiece, thereby enhancing flatness of a processed surface of the workpiece.

According to still another embodiment, at least one of the processing electrode and the feeding electrode is in a spherical or oval spherical shape. This enables processing at a point and processing of a curved surface.

According to still another embodiment, at least one of the processing electrode and the feeding electrode has a depressed portion or a raised portion conforming to a configuration of a workpiece, and processing of the workpiece is conducted by allowing the workpiece to face the depressed or raised portion. For example, the processing electrode may have a depressed portion conforming to a configuration of a peripheral portion of a substrate. Processing of the substrate can be conducted by allowing the peripheral portion of the substrate to be positioned in the depressed portion, thereby removing a material, to be processed, formed on or adhering to the peripheral portion (bevel portion or edge portion). Thus, in this case, the electrolytic processing device is utilized as a bevel-etching device for the substrate.

The above-described electrolytic processing devices of the present invention may be constructed so that at least between the processing electrodes and the workpiece, or between the feeding electrodes and the workpiece, relative movement is caused. This can produce a flow of the liquid, such as ultrapure water, between a workpiece and at least one of the processing and feeding electrodes, thereby effectively expelling unnecessary products, whereby flatness of a processed surface of the workpiece can be enhanced.

The relative movement may be rotation, reciprocation, eccentric rotation or scroll movement, or a combination thereof.

Further according to the present invention, the processing electrode and the feeding electrode may be disposed such that one of the electrodes surrounds the other. This allows all electric currents to flow from the feeding electrode to the processing electrode through shortest routes, thereby enhancing electric current efficiency and reducing electric power consumption.

According to another embodiment, at least one of the processing electrode and the feeding electrode is in the shape of a fan. This allows the processing electrode to face a workpiece for a constant time in a radial direction, whereby an electrolytic processing rate can be made constant.

According to still another embodiment, at least one of the processing electrode and the feeding electrode is disposed linearly or in a circle.

The present invention provides a substrate processing apparatus, comprising: a substrate carry-in and carry-out section for carrying in and carrying out a substrate; an electrolytic processing device; and a transport device for transporting the substrate between the substrate carry-in and carry-out section and the electrolytic processing device The electrolytic processing device comprises a processing electrode to be brought into contact with or close to a workpiece, a feeding electrode for supplying electricity to the workpiece, an ion exchanger disposed in at least one of spaces between the workpiece and the processing electrode, and between the workpiece and the feeding electrode, a power source for applying a voltage between the processing electrode and the feeding electrode, and a liquid supply section for supplying a liquid to the space between the workpiece and at least one of the processing electrode and the feeding electrode, in which the ion exchanger is present.

The present invention also provides a substrate processing apparatus, comprising: a substrate carry-in and carry-out section for carrying in and carrying out a substrate; an electrolytic processing device; and a transport device for transporting the substrate between the substrate carry-in and carry-out section and the electrolytic processing device. The electrolytic processing device comprises a processing electrode to be brought into contact with or close to a workpiece, a feeding electrode for supplying electricity to the workpiece, a power source for applying a voltage between the processing electrode and the feeding electrode, and a liquid supply section for supplying pure water or a liquid having an electric conductivity of not more than 500 µS/cm between the workpiece and the processing electrode.

In a preferred embodiment, the substrate processing apparatus further comprises a cleaning device for cleaning a substrate processed by the electrolytic processing device.

In another embodiment, the substrate processing apparatus further comprises a CMP device for chemical mechanical polishing a surface of a substrate. In this case, the substrate processing apparatus may further comprise a cleaning device for cleaning a substrate polished by the CMP device.

In still another embodiment, the substrate processing apparatus further comprises a film-forming device for forming a film, as a portion to be processed, on a surface of a substrate. In this case, the substrate processing apparatus may further comprise at least one of a cleaning device for cleaning a portion to be processed having been formed in the film-forming device, and an annealing device for annealing the portion to be processed.

Also in this case, the substrate processing apparatus may further comprise a bevel-etching device for etching a portion to be processed formed in or adhering to a peripheral portion of a substrate. In the bevel-etching device, etching of the portion to be processed may be effected by electrolytic processing.

The substrate processing apparatus may further comprise a film thickness-measuring section for measuring a film thickness of a portion to be processed during or after polishing in the CMP device. Moreover, the substrate processing apparatus may further comprise a film thickness-measuring section for measuring a film thickness of the portion to be processed during or after film formation in the film-forming device.

The film formation in the film-forming device may be conducted by plating.

In still another embodiment, the substrate processing apparatus further comprises a monitor for monitoring at least one of electrolytic current and electrolytic voltage when voltage is applied between the feeding electrode and the processing electrode.

According to still another embodiment, the substrate processing apparatus further comprises a drying device for finally drying a processed substrate. This can realize the so-called "dry-in, dry-out".

According to still another embodiment, the substrate processing apparatus monitors a change in a state of a substrate being processed and detects an end point of processing. By the "endpoint of processing" is herein meant a point at which a desired processing amount is attained for a specified region in a surface to be processed, or a point at which an amount corresponding to a desired processing amount is attained in terms of a parameter correlated with a processing amount for a specified region in a surface to be processed. By thus arbitrarily setting and detecting the end point of processing even during processing, it becomes possible to conduct multi-step electrolytic processing.

According to still another embodiment, the substrate processing apparatus further comprises a film-thickness detection section for detecting an end point of processing.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWINGS

FIG. 2 is a diagram illustrating a principle of electrolytic processing effected in an electrolytic processing device in accordance with the present invention when an ion exchanger is mounted only on a processing electrode, and a liquid is supplied between the processing electrode and a substrate (workpiece);

FIG. 5 is a vertical sectional front view of an electrolytic processing device according to one embodiment of the present invention, which is provided in the substrate processing apparatus of FIG. 4;

FIG. 15 is a plan view showing a variation of the electrolytic processing device of FIG. 5;

FIG. 18 is a plan view of the electrolytic processing device of FIG. 17;

FIG. 19A is a plan view showing a relationship between a substrate holder and an electrode section of the electrolytic processing device of FIG. 17, and FIG. 19B is a cross-sectional view taken along line A—A of FIG. 19A;

FIG. 20 is a plan view of an electrode plate used in a variation of the electrolytic processing device of FIG. 17;

FIG. 21 is a vertical sectional front view of the electrode plate of FIG. 20;

FIG. 23 is a plan view of the electrolytic processing device of FIG. 22;

FIG. 41 is an enlarged sectional view of a main portion of an electrolytic processing device according to still another embodiment of the present invention, which is utilized as a bevel-etching device;

FIG. 42 is a cross-sectional view of an electrolytic processing device according to still another embodiment of the present invention, which is utilized as a bevel-etching device;

FIG. 50 is a schematic front view of other processing and feeding electrodes;

FIG. 51 is a schematic front view of still other processing and feeding electrodes;

FIG. 64 is a schematic perspective view of an electrolytic processing device according to still another embodiment of the present invention;

FIG. 67 is a plan view of the electrolytic processing device of FIG. 66;

FIG. 76 is a plan view of the electrolytic processing device of FIG. 75;

FIG. 86 is a schematic view of an electrolytic processing device according to still another embodiment of the present invention; and FIG. 87 is a schematic view of an electrolytic processing device according to still another embodiment of the present invention.

DETAILED DESCRIPTION OF THE PREFERRED EMBODIMENTS

Preferred embodiments of the present invention will now be described with reference to the drawings.

Figure 1:
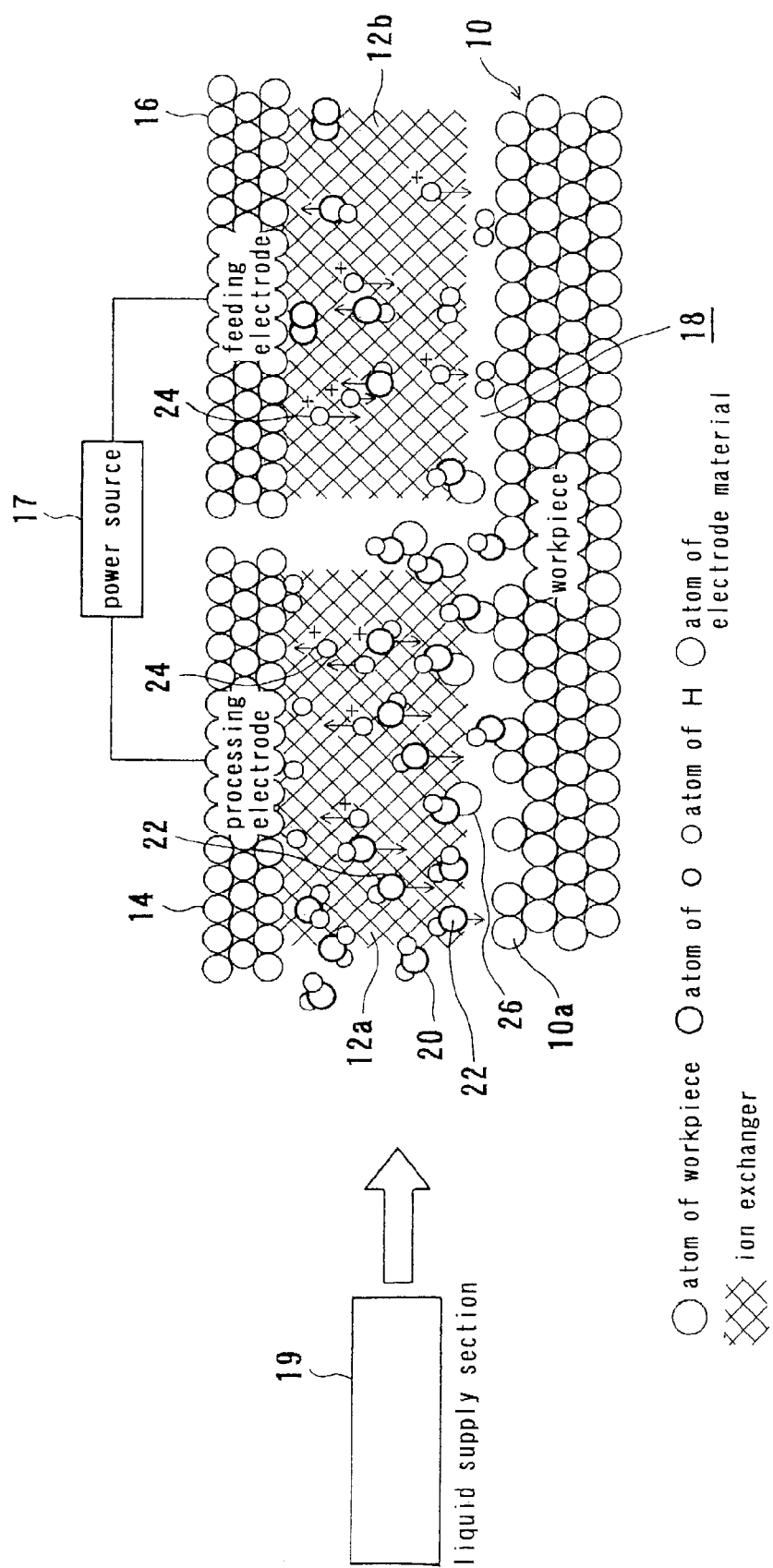
FIG. 1 is a diagram illustrating a principle of electrolytic processing effected in an electrolytic processing device in accordance with the present invention when an ion exchanger is mounted on both of a processing electrode and a feeding electrode, and a liquid is supplied between the processing electrode, the feeding electrode and a substrate (workpiece)
Figure 3:
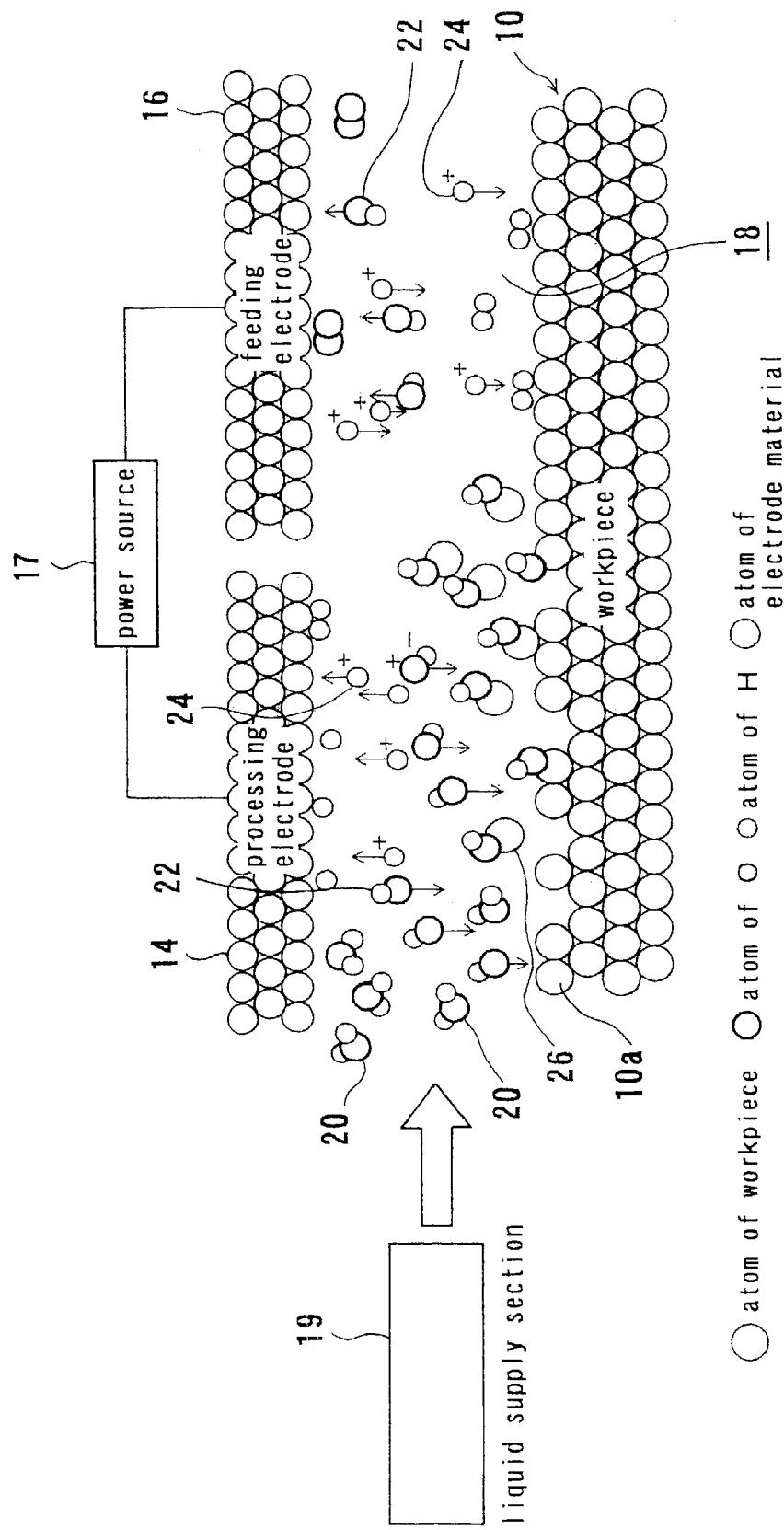
FIG. 3 is a diagram illustrating a principle of electrolytic processing effected in an electrolytic processing device in accordance with the present invention when a processing electrode and a feeding electrode are brought close to a substrate, and pure water or a liquid having electric conductivity of not more than 500 µS/cm is supplied between the processing electrode, the feeding electrode and the substrate (workpiece)
Figure 4A:
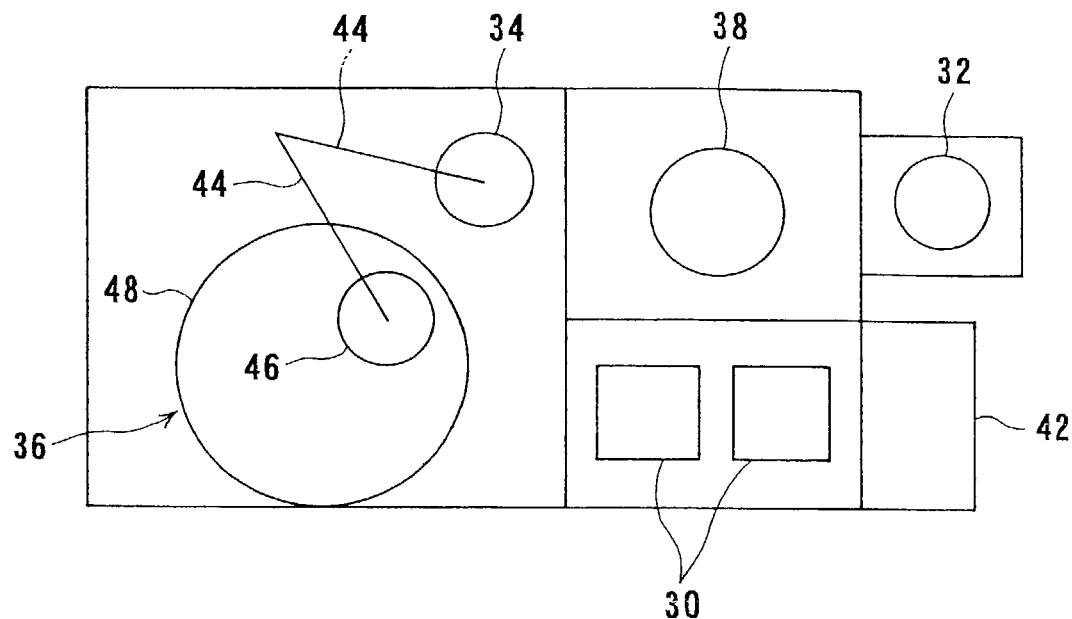
FIGS. 4A and 4B are plan views showing a layout of a substrate processing apparatus according to a first embodiment of the present invention.
Figure 6:
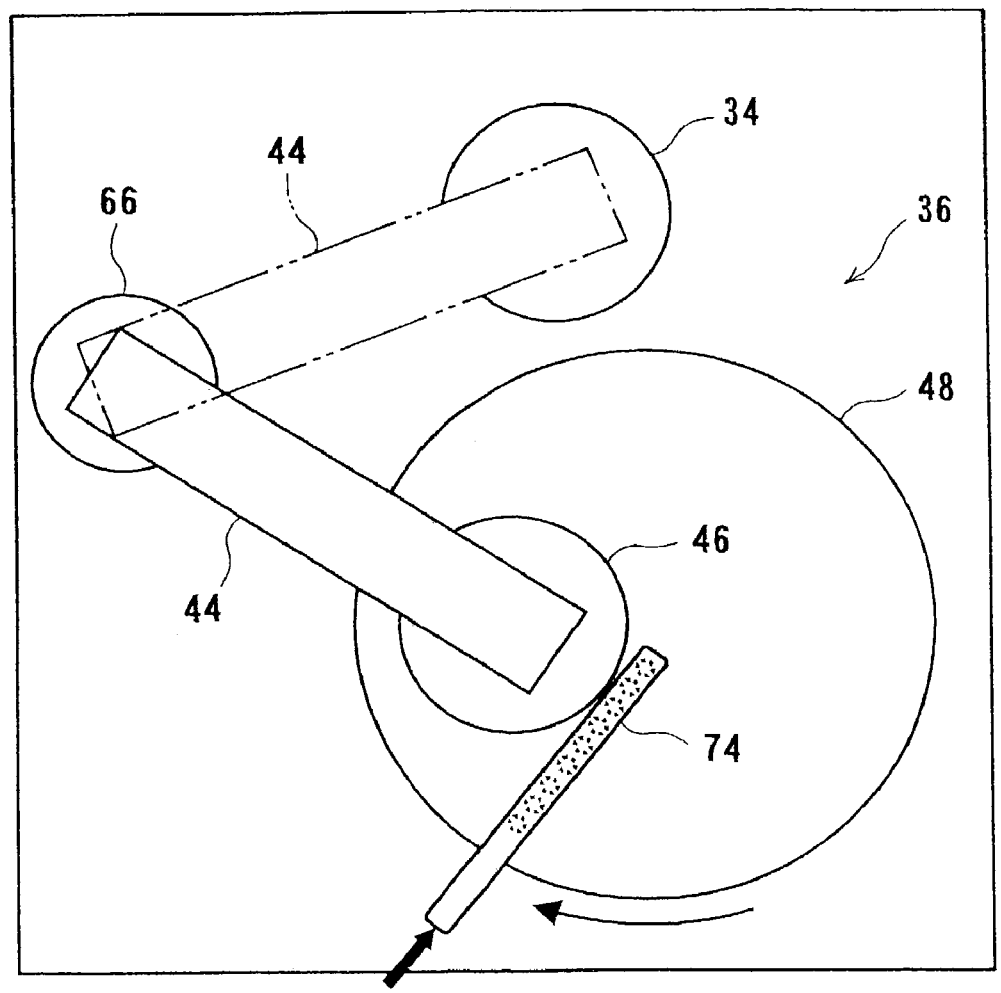
FIG. 6 is a plan view of the electrolytic processing device of FIG. 5.
Figure 7:
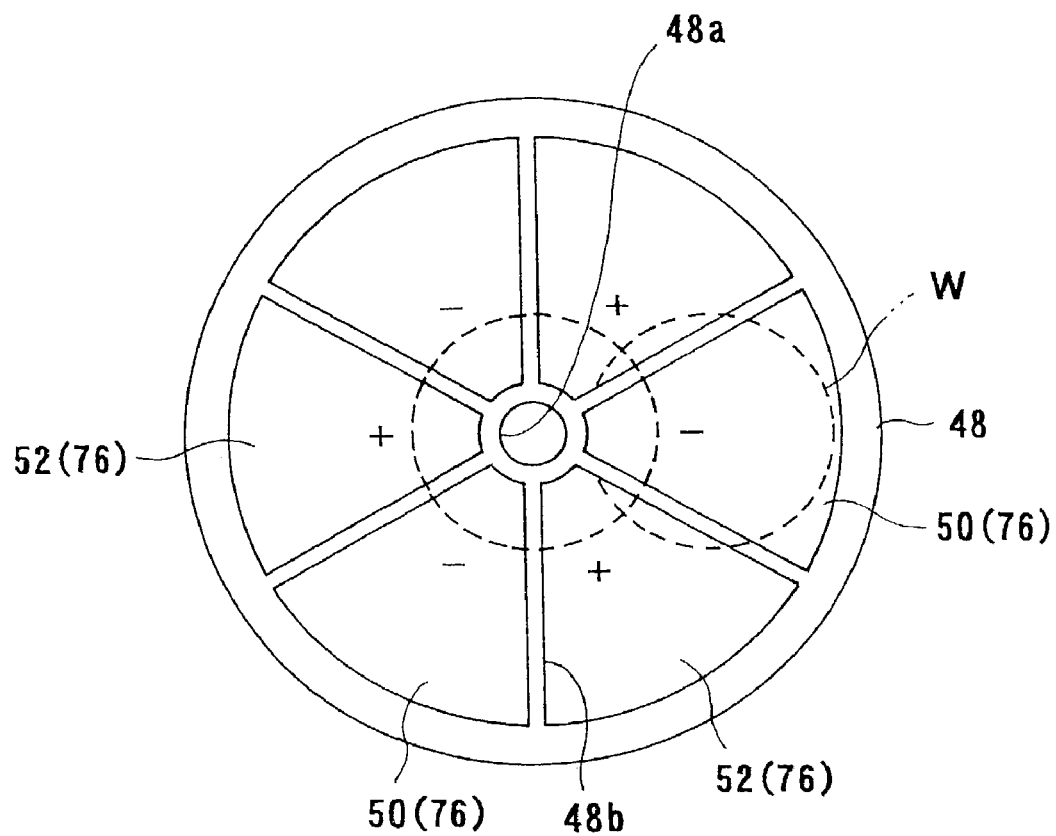
FIG. 7 is a plan view of an electrode plate provided in the electrolytic processing device of FIG. 4.

FIG. 4A shows a plan view of a substrate processing apparatus according to a first embodiment of the present invention. FIGS. 5 through 7 show an electrolytic processing device according to a first embodiment of the present invention which is used in the substrate processing apparatus. Though this embodiment uses a substrate as a workpiece to be processed by the electrolytic processing device, a workpiece other than a substrate can, of course, also be employed.

Figure 85A:
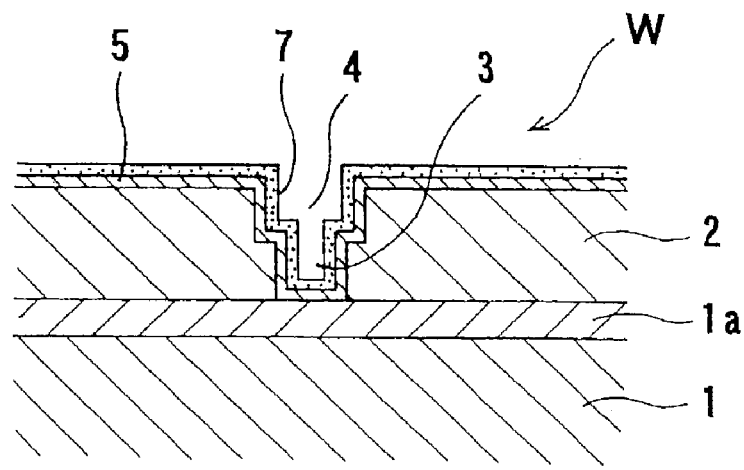
FIGS. 85A through 85C are diagrams illustrating sequence of process step, for forming copper interconnects.
Figure 85B:
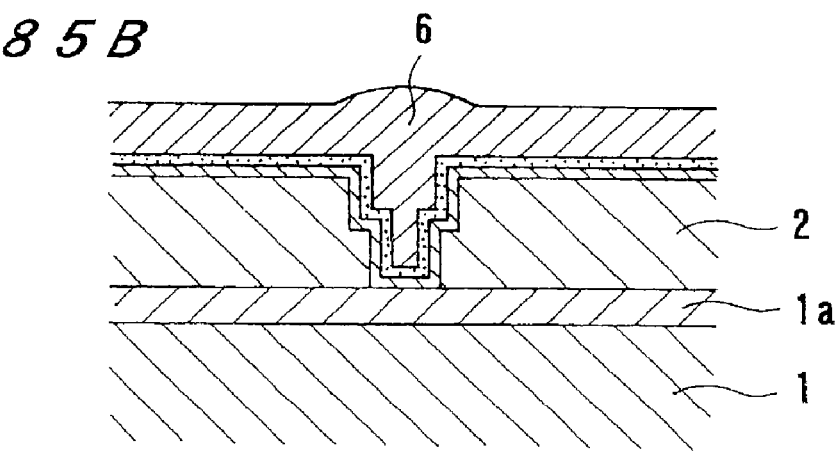

As shown in FIG. 4A, the substrate processing apparatus comprises a pair of loading/unloading units 30 as a carry-in and carry-out section for carrying in and carrying out a cassette housing a substrate W, e.g. a substrate W as shown in FIG. 85B, which has on its surface a copper film 6 as a conductor film (portion to be processed), a reversing machine 32 for reversing the substrate W, a pusher 34 for transferring the substrate W, and an electrolytic processing device 36. A fixed-type transport robot 38 is provided between the loading/unloading units 30, the reversing machine 32 and the pusher 34 as a transport device for transporting the substrate W therebetween. The substrate processing apparatus is also provided with a monitor 42 for monitoring a voltage applied between below-described processing electrodes 50 and feeding electrodes 52 upon electrolytic processing in the electrolytic processing device 36, or an electric current flowing therebetween.

As shown in FIG. 5, the electrolytic processing device 36 includes a substrate holder 46, supported at a free end of a swingable arm 44 that can swing horizontally, for attracting and holding the substrate W with its front surface downward (so-called "face down" manner), and, positioned beneath the substrate holder 46, a disc-shaped electrode section 48 made of an insulating material. As shown in FIG. 7, the electrode section 48 has, embedded therein, fan-shaped processing electrodes 50 and feeding electrodes 52 that are disposed alternately with their surfaces (upper faces) exposed. A film-like ion exchanger 56 is mounted on an upper surface of the electrode section 48 so as to cover the surfaces of the processing electrodes 50 and the feeding electrodes 52.

This embodiment uses, merely as an example of the electrode section 48 having the processing electrodes 50 and the feeding electrodes 52, such one that has a diameter more than twice that of the substrate W so that an entire surface of the substrate W may undergo electrolytic processing.

The ion exchanger 56 may be a nonwoven fabric which has an anion-exchange ability or a cation-exchange ability. A cation exchanger preferably carries a strongly acidic cation-exchange group (sulfonic acid group); however, a cation exchanger carrying a weakly acidic cation-exchange group (carboxyl group) may also be used. Though an anion exchanger preferably carries a strongly basic anion-exchange group (quaternary ammonium group), an anion exchanger carrying a weakly basic anion-exchange group (tertiary or lower amino group) may also be used.

A nonwoven fabric carrying a strongly basic anion-exchange group can be prepared by, for example, the following method: A polyolefin nonwoven fabric having a fiber diameter of 20–50 µm and a porosity of about 90% is subjected to so-called radiation graft polymerization, comprising γ-ray irradiation onto the nonwoven fabric and a subsequent graft polymerization, thereby introducing graft chains; and the graft chains thus introduced are then aminated to introduce quaternary ammonium groups thereinto. A capacity of ion-exchange groups introduced can be determined by an amount of the graft chains introduced. The graft polymerization may be conducted by use of a monomer such as acrylic acid, styrene, glicidyl methacrylate, sodium styrenesulfonate or chloromethylstyrene. The amount of the graft chains can be controlled by adjusting monomer concentration, reaction temperature and reaction time. Thus, a degree of grafting, i.e. a ratio of weight of the nonwoven fabric after graft polymerization to weight of the nonwoven fabric before graft polymerization, can be made 500% at its maximum. Consequently, a capacity of the ion-exchange groups introduced after graft polymerization can be made 5 meq/g at its maximum.

A nonwoven fabric carrying a strongly acidic cation-exchange group can be prepared by the following method: As in the case of the nonwoven fabric carrying a strongly basic anion-exchange group, a polyolefin nonwoven fabric having a fiber diameter of 20–50 µm and a porosity of about 90% is subjected to the so-called radiation graft polymerization comprising γ-ray irradiation onto the nonwoven fabric and subsequent graft polymerization, thereby introducing graft chains; the graft chains thus introduced are then treated with a heated sulfuric acid to introduce sulfonic acid groups thereinto. If the graft chains are treated with a heated phosphoric acid, phosphate groups can be introduced. A degree of grafting can reach 500% at its maximum, and a capacity of ion-exchange groups thus introduced after graft polymerization can reach 5 meq/g at its maximum.

A base material of the ion-exchanger 56 may be a polyolefin such as polyethylene or polypropylene, or any other organic polymer. Further, besides the form of a nonwoven fabric, the ion-exchanger may be in the form of a woven fabric, a sheet, a porous material, short fibers, and the like.

When polyethylene or polypropylene is used as the base material, graft polymerization can be effected by first irradiating radioactive rays (γ-rays or electron beam) onto the base material (pre-irradiation) to thereby generate a radical, and then reacting the radical with a monomer, whereby uniform graft chains with few impurities can be obtained. When an organic polymer other than polyolefin is used as the base material, on the other hand, radical polymerization can be effected by impregnating the base material with a monomer and irradiating radioactive rays (γ-rays, electron beam or UV-rays) onto the base material (simultaneous irradiation). Though this method fails to provide uniform graft chains, it is applicable to a wide variety of base materials.

By using as the ion exchanger 56 a nonwoven fabric having an anion-exchange ability or a cation-exchange ability, it becomes possible that pure water or ultrapure water, or a liquid such as an electrolytic solution can freely move within the nonwoven fabric and easily arrive at active points in the nonwoven fabric having a catalytic activity for water dissociation, so that many water molecules are dissociated into hydrogen ions and hydroxide ions. Further, by movement of pure water or ultrapure water, or a liquid such as an electrolytic solution, the hydroxide ions produced by the water dissociation can be efficiently carried to the surface of the processing electrode 50, whereby a high electric current can be obtained even with a low voltage applied.

Figure 8:
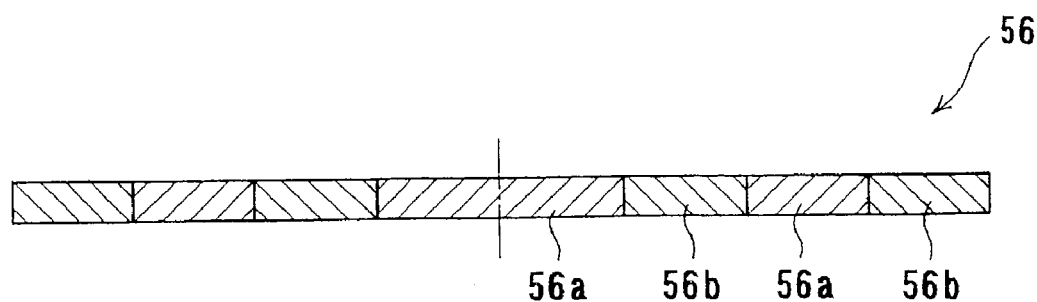
FIG. 8 is a cross-sectional view of another ion exchanger.

When the ion exchanger 56 has only one of anion-exchange ability and cation-exchange ability, a limitation is imposed on electrolytically processible materials and, in addition, impurities are likely to form due to polarity. In order to solve this problem, the ion exchanger 56 may have such a structure as shown in FIG. 8 wherein anion-exchangers 56a having an anion-exchange ability and cation-exchangers 56b having a cation-exchange ability are concentrically disposed to constitute an integral structure. The anion-exchangers and the cation-exchangers may be superimposed on a surface, to be processed, of a substrate. It may also be possible to make the anion-exchangers and the cation-exchangers each in the shape of a fan, and dispose them alternately. Alternatively, the above problem can be solved by using, as the ion exchanger 56, an ion-exchanger which in itself carries both of an anion-exchange group and a cation-exchange group. Such an ion exchanger may include an amphoteric ion exchanger in which anion-exchange groups and cation-exchange groups are distributed randomly, a bipolar ion exchanger in which anion-exchange groups and cation-exchange groups are present in layers, and a mosaic ion exchanger in which portions containing anion-exchange groups and portions containing cation-exchange groups are present in parallel in a thickness direction. Incidentally, it is of course possible to selectively use, as the ion exchanger 56, one having an anion-exchange ability or one having a cation-exchange ability according to material to be processed.

As shown in FIG. 5, the swingable arm 44, which moves up and down via a ball screw 62 by actuation of a motor 60 for vertical movement, is connected to an upper end of a shaft 66 that rotates by actuation of a motor 64 for swinging. The substrate holder 46 is connected to a motor 68 for rotation that is mounted on a free end of the swingable arm 44, and is allowed to rotate by actuation of the motor 68 for rotation.

The electrode section 48 is connected directly to a hollow motor 70, and is allowed to rotate by actuation of the hollow motor 70. A through-hole 48a as a pure water supply section for supplying pure water, preferably ultrapure water, is formed in a central portion of the electrode section 48. The through-hole 48a is connected to a pure water supply pipe 72 that vertically extends inside the hollow motor 70. Pure water or ultrapure water is supplied through the through-hole 48a, and via the ion exchanger 56, is supplied to an entire processing surface of the substrate W. A plurality of through-holes 48a, each communicating with the pure water supply pipe 72, may be provided to facilitate this processing liquid reaching over the entire processing surface of the substrate W.

Further, a pure water nozzle 74 as a pure water supply section for supplying pure water or ultrapure water, extending in a radial direction of the electrode section 48 and having a plurality of supply ports, is disposed above the electrode section 48. Pure water or ultrapure water is thus supplied to the surface of the substrate W from above and beneath the substrate W. Pure water herein refers to a water having an electric conductivity of not more than 10 µS/cm, and ultrapure water refers to a water having an electric conductivity of not more than 0.1 µS/cm. Instead of pure water, a liquid having an electric conductivity of not more than 500 µS/cm or any electrolytic solution may be used. By supplying such a processing liquid during processing, instability factors of processing, such as process products and dissolved gases, can be removed, and processing can be effected uniformly with good reproducibility.

According to this embodiment, as shown in FIG. 5 and FIG. 7, fan-shaped electrode plates 76 are disposed in the electrode section 48, and a cathode and anode of a power source 80 are alternately connected, via a slip ring 78, to the electrode plates 76. The electrode plates 76 connected to the cathode of the power source 80 become the processing electrodes 50 and the electrode plates 76 connected to the anode become the feeding electrodes 52. This applies to processing of e.g. copper, because electrolytic processing of copper proceeds on the cathode side. Depending upon a material to be processed, a cathode side can be a feeding electrode and an anode side can be a processing electrode. More specifically, when the material to be processed is copper, molybdenum, iron or the like, electrolytic processing proceeds on the cathode side, and therefore the electrode plates 76 connected to the cathode of the power source 80 should be the processing electrodes 50 and the electrode plates 76 connected to the anode should be the feeding electrodes 52. In a case of aluminum, silicon or the like, on the other hand, electrolytic processing proceeds on the anode side. Accordingly, the electrode plates connected to the anode of the power source should be the processing electrodes and the electrode plates connected to the cathode should be the feeding electrodes.

In a case where a to-be-processed material is a conductive oxide such as tin oxide or indium tin oxide (ITO), electrolytic processing is performed after reducing the to-be-processed material. More specifically, with reference to FIGS. 5 and 7, the electrode plates connected to the anode of the power source 80 serve as reduction electrodes and the electrode plates connected to the cathode serve as feeding electrodes to effect reduction of the conductive oxide. Subsequently, processing of this reduced conductive material is performed by making previous feeding electrodes serve as processing electrodes. Alternatively, a polarity of the reduction electrodes at a time of reduction of the conductive oxide may be reversed so that the reduction electrodes can serve as processing electrodes. Removal processing of the conductive oxide may also be effected by making the to-be-processed material serve as a cathode and allowing it to face anode electrodes.

Though this embodiment shows a case in which fan-shaped electrode plates 76 are separated from one another by ribs 48b of the electrode section 48 which is composed of an insulating material, the ribs 48b may also be formed as a separate body of another insulating material so that pure water or the like can be supplied through interspaces between the insulating material.

By thus disposing the processing electrodes 50 and the feeding electrodes 52 separately and alternately in a circumferential direction of the electrode section 48, fixed feeding portions to supply electricity to a conductive film (portion to be processed) of the substrate are not needed, and processing can be effected to an entire surface of the substrate. Further, by changing positive and negative in a pulse manner, an electrolysis product can be dissolved and flatness of a processed surface can be enhanced by multiplex repetition of processing.

With respect to processing electrode 50 and feeding electrode 52, oxidation or dissolution thereof due to an electrolytic reaction is generally a problem. In view of this, it is preferred to use, as a base material of the feeding electrode 52, carbon, a noble metal that is relatively inactive, a conductive oxide or a conductive ceramic, rather than a metal or metal compound widely used for electrodes. A noble metal-based electrode may, for example, be one obtained by plating or coating platinum or iridium onto a titanium electrode, and then sintering this coated electrode at a high temperature to stabilize and strengthen the electrode. Ceramic products are generally obtained by heat-treating inorganic raw materials, and ceramic products having various properties are produced from various raw materials including oxides, carbides and nitrides of metals and non-metals. Among them there are ceramics having an electric conductivity. When an electrode is oxidized, a value of electric resistance generally increases to cause an increase of applied voltage. However, by protecting a surface of an electrode with a non-oxidative material such as platinum or with a conductive oxide such as an iridium oxide, decrease of electric conductivity due to oxidation of a base material of an electrode can be prevented.

Figure 9A:
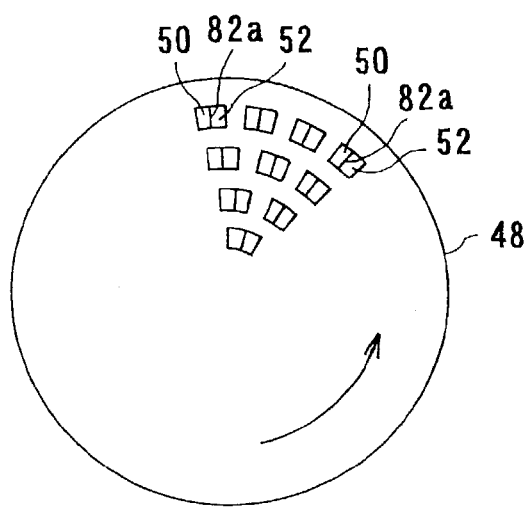
FIGS. 9A and 9B are plan views of other electrode plates.

The processing electrodes 50 and the feeding electrodes 52 may be disposed as shown in FIG. 9A: Pairs of the processing electrodes 50 and the feeding electrodes 52, each pair sandwiching an insulator 82a, are disposed, within the electrode section 48, in a fan-shaped region ranging from a center to a periphery of the electrode section 48 so that the number of the pairs gradually increases from the center to the periphery of the electrode section 48. With this arrangement, the electrode section 48 and the substrate W are rotated, and an electric current per unit area, i.e. current density, becomes even between a central portion of the electrode section 48 where a relative speed to the substrate W is low and a peripheral portion of the electrode section 48 where the relative speed to the substrate W is high, whereby an electrolytic processing rate can be made constant over an entire surface of the substrate W. This arrangement is adapted not only to this embodiment in which the substrate W is positioned on one side across the center of the electrode section 48, but also to a case in which the electrode portion 48, which is slightly larger than the substrate, is allowed to rotate about the center of the substrate W (see FIG. 17 and FIG. 18).

Figure 9B:
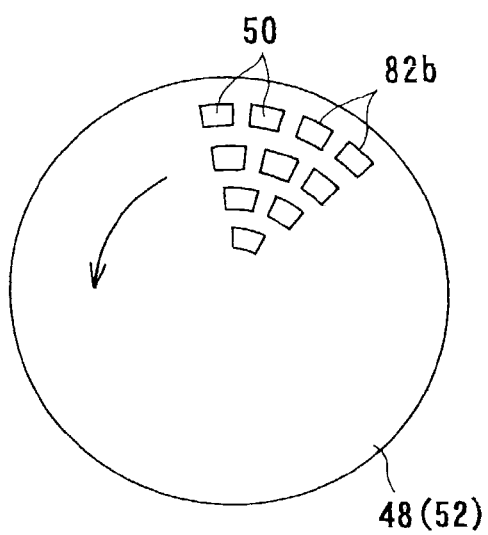

As a modification of the above electrode arrangement, as shown in FIG. 9B, it is possible to make the electrode section 48 of a conductive material so that the electrode section 48 itself can function as the feeding electrode 52 (or the processing electrode 50), and embed the processing electrodes 50 (or the feeding electrodes 52), which are separated by insulator 82b, inside the electrode section 48. This can reduce the number of wires.

Figure 10A:
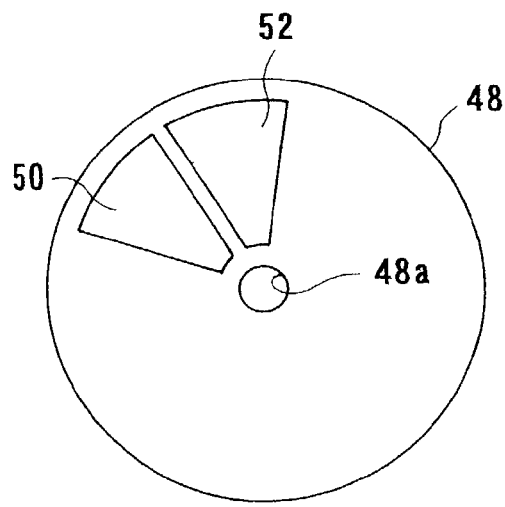
FIGS. 10A and 10B are plan views of still other electrode plates.
Figure 10B:
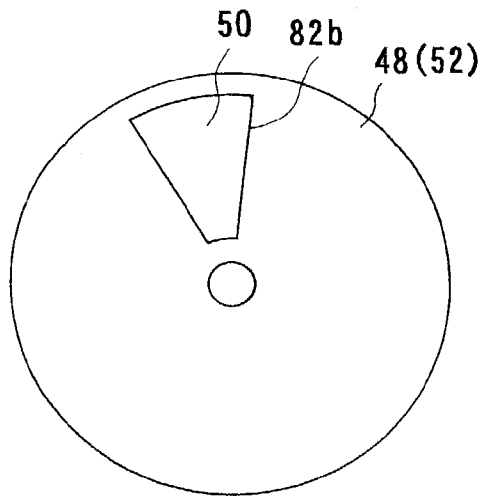

Alternatively, as shown in FIG. 10A, one processing electrode 50 and one feeding electrode 52, adjacent to each other and each in the shape of a fan extending from the center towards the periphery of the electrode section 48, may be disposed inside of the electrode section 48. Also in this case, as shown in FIG. 10B, it is possible to make the electrode section 48 of a conductive material so that the electrode section 48 itself can function as the feeding electrode 52 (or the processing electrode 50), and embed the processing electrode 50 (or the feeding electrode 52), which is separated by the insulator 82b, inside the electrode section 48.

Figure 11A:
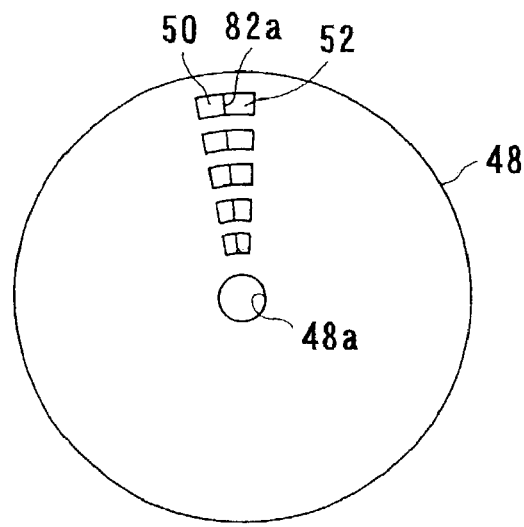
FIGS. 11A and 11B are plan views of still other electrode plates.
Figure 11B:
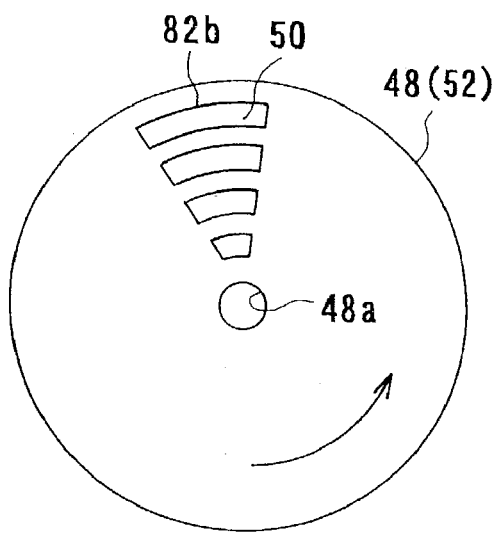

Alternatively, as shown in FIG. 11A, pairs of the processing electrodes 50 and the feeding electrodes 52, each pair sandwiching the insulator 82a, may be disposed inside of the electrode section 48 such that a length of the processing electrode 50 and that of the feeding electrode 52 in a circumferential direction gradually increases from the center to the periphery of the electrode section 48. Also in this case, as shown in FIG. 11B, it is possible to make the electrode section 48 of a conductive material so that the electrode section 48 itself can function as the feeding electrode 52 (or the processing electrode 50), and embed the processing electrodes 50 (or the feeding electrodes 52), which are separated by the insulator 82b, inside the electrode section 48.

Figure 12:
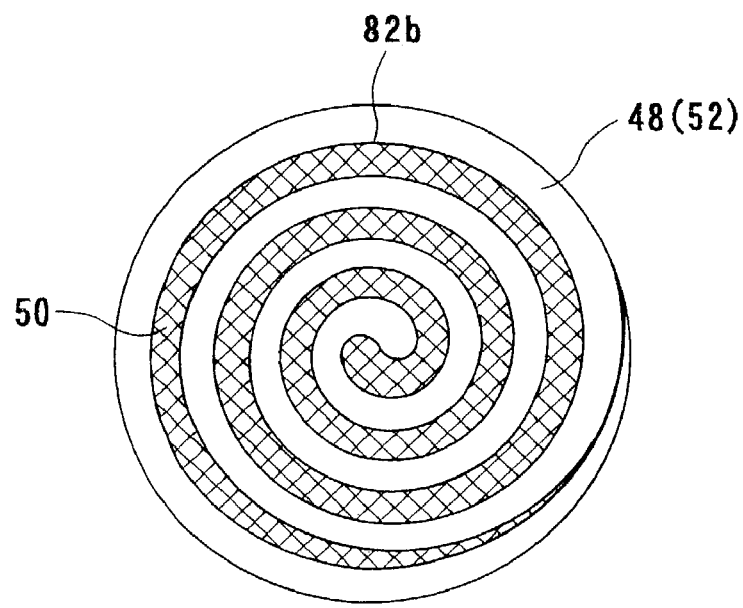
FIG. 12 is a plan view of still another electrode plate.
Figure 13:
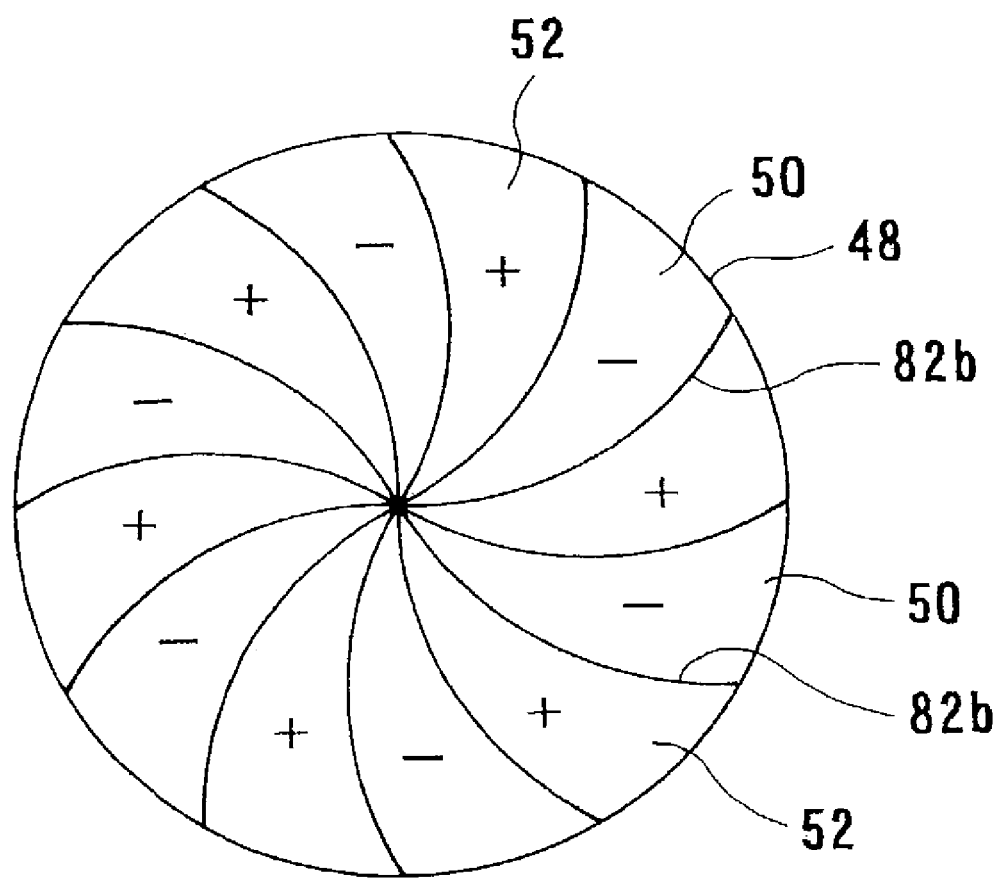
FIG. 13 is a plan view of still another electrode plate.

Alternatively, as shown in FIG. 12, it is possible to make the electrode section 48 of a conductive material so that the electrode section 48 itself can function as the feeding electrode 52 (or the processing electrode 50), and embed the processing electrode 50, which is separated by the insulator 82b and extends spirally continuously, inside the electrode section 48. Further, as shown in FIG. 13, the processing electrodes 50 and the feeding electrodes 52, extending like a screw from the center to the periphery of the electrode section 48, may be disposed inside of the electrode section 48 alternately, with the insulators 82b being sandwiched.

Furthermore, though not shown in the figures, it is of course possible to distribute or dot the processing electrodes and the feeding electrodes uniformly inside of the electrode section 48.

Next, substrate processing (electrolytic processing) by the substrate processing apparatus will be described by referring to FIG. 4A.

First, a substrate W, e.g. a substrate W as shown in FIG. 85B which has on its surface a copper film 6 as a conductor film (portion to be processed), is taken by the transport robot 38 out of the cassette housing substrates and set in the loading/unloading unit 30. If necessary, the substrate W is transported to the reversing machine 32 to reverse the substrate so that the front surface of the substrate W having the conductor film faces downward. The substrate W, with its front surface facing downward, is then transported by the transport robot 38 to the pusher 34 to place the substrate W on the pusher 34.

The substrate W on the pusher 34 is attracted and held by the substrate holder 46 of the electrolytic processing device 36, and the substrate holder 46 is moved by the swingable arm 44 to a processing position right above the electrode section 48. The substrate holder 46 is then lowered by actuation of the motor 60 for vertical movement, so that the substrate W held by the substrate holder 46 contacts or gets close to the surface of the ion exchanger 56 mounted on the upper surface of the electrode section 48.

It is to be noted here that when a liquid like ultrapure water, which itself has a large resistivity, is used, electric resistance can be lowered by bringing the ion exchanger 56 into contact with the substrate W, whereby a requisite voltage can also be lowered and hence power consumption can be reduced. The "contact" does not imply "press" for applying a physical energy (stress) to a workpiece as in CMP. Accordingly, the electrolytic processing device of this embodiment employs the vertical-movement motor 60 for bringing the substrate W into contact with or close to the electrode section 48, and does not have such a press mechanism as usually employed in a CMP device that presses a substrate against a polishing member. This holds also for the below-described embodiments.

In this regard, according to a CMP device, a substrate is pressed against a polishing surface generally at a pressure of about 20–50 kPa, whereas in the electrolytic processing device of this embodiment, the substrate W may be contacted with the ion exchanger 56 at a pressure of less than 20 kPa. Even at a pressure less than 10 kPa, a sufficient removal processing effect can be achieved.

Next, a given voltage is applied from the power source 80 (see FIG. 5) between the processing electrodes 50 and the feeding electrodes 52, while the substrate holder 46 and the electrode section 48 are rotated. At the same time, pure water or ultrapure water is supplied, through the through-hole 48a, from beneath the electrode section 48 to the upper surface thereof, and simultaneously, pure water or ultrapure water is supplied, through the pure water nozzle 74, from above the electrode section 48 to the upper surface thereof, thereby filling pure water or ultrapure water into a space between the processing and feeding electrodes 50, 52 and the substrate W. Thereby, electrolytic processing of a conductor film (copper film 6) formed on the substrate W is effected by hydrogen ions or hydroxide ions produced in the ion exchanger 56. According to the above electrolytic processing device, a large amount of hydrogen ions or hydroxide ions can be produced by allowing pure water or ultrapure water to flow within the ion exchanger 56, and the large amount of such ions can be supplied to the surface of the substrate W, whereby the electrolytic processing can be conducted efficiently.

More specifically, by allowing pure water or ultrapure water to flow within the ion exchanger 56, a sufficient amount of water can be supplied to a functional group (sulfonic acid group in the case of an ion exchanger carrying a strongly acidic cation-exchange group) thereby to increase an amount of dissociated water molecules, and a process product (including a gas) formed by a reaction between the conductor film (copper film 6) and hydroxide ions (or OH radicals) can be removed by flow of water, whereby processing efficiency can be enhanced. Flow of pure water or ultrapure water is thus necessary, and the flow of water should desirably be constant and uniform. This constancy and uniformity of the flow of water leads to constancy and uniformity in supply of ions and removal of the process product, which in turn leads to constancy and uniformity in processing. This embodiment is not a soak type. Compared with a soak type apparatus, this not-soak type apparatus is simple in an arrangement because there isn't a necessity to control contamination of liquid in a container.

Figure 14A:
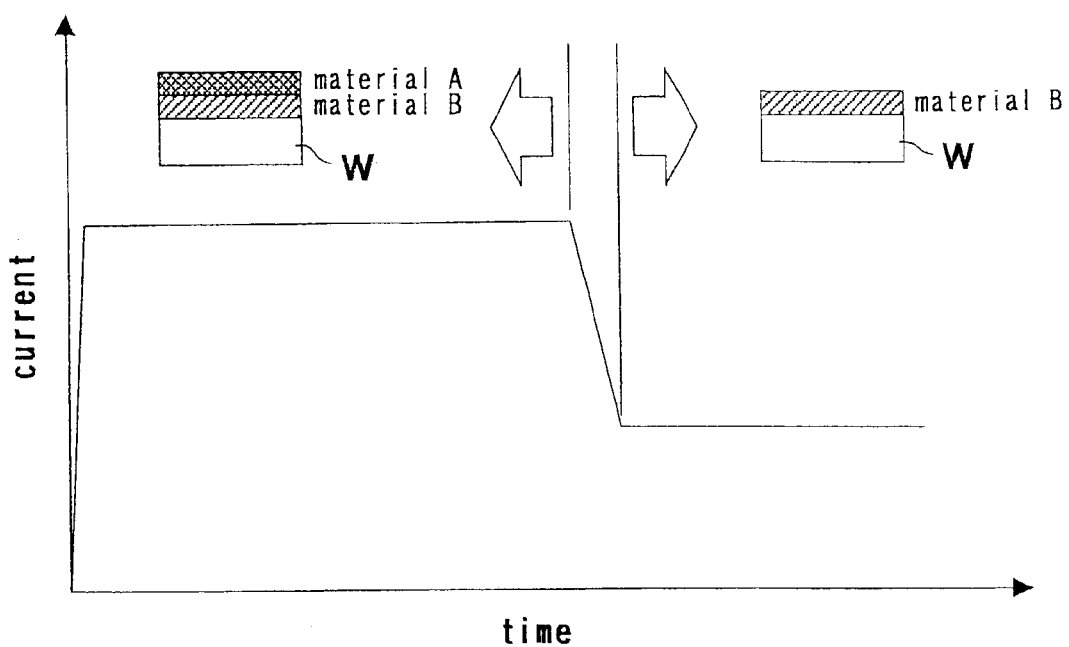
FIGS. 14A and 14B are graphs showing a relationship between electric current and time, and a relationship between voltage applied and time, respectively, in electrolytic processing conducted to a surface of a substrate on which a laminated film of two different materials is formed.
Figure 14B:
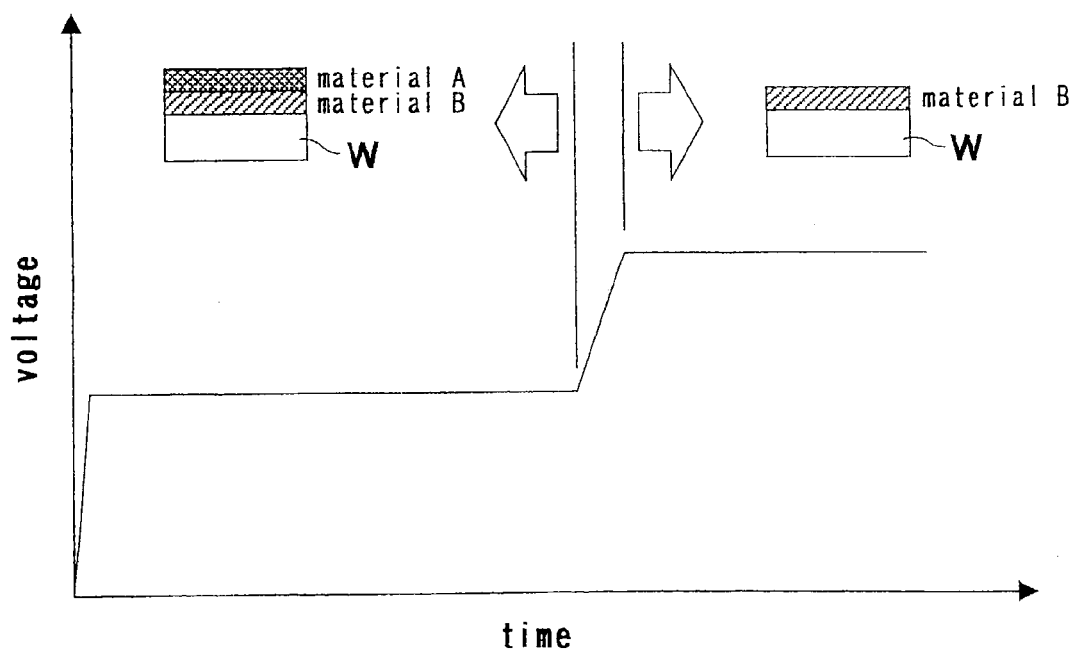

The monitor 42 monitors the voltage applied between the processing electrodes 50 and the feeding electrodes 52 or the electric current flowing therebetween to detect an end point (terminal of processing). It is noted in this connection that in electrolytic processing an electric current (applied voltage) varies, depending upon material to be processed, even with the same voltage (electric current). For example, as shown in FIG. 14A, when an electric current is monitored in electrolytic processing of a surface of a substrate W to which a film of material B and a film of material A are laminated in this order, a constant electric current is observed during processing of material A, but it changes upon shift to processing of different material B. Likewise, as shown in FIG. 14B, though a constant voltage is applied between the processing electrodes 50 and the feeding electrodes 52 during the processing of material A, the voltage applied changes upon shift to the processing of the different material B. FIG. 14A illustrates, by way of example, a case in which an electric current is harder to flow in electrolytic processing of material B compared to electrolytic processing of material A, and FIG. 14B illustrates a case in which the applied voltage becomes higher in electrolytic processing of material B compared to electrolytic processing of material A. As will be appreciated from the above-described example, monitoring of changes in electric current or in voltage can surely detect an end point.

Though this embodiment shows a case where the monitor 42 monitors the voltage applied between the processing electrodes 50 and the feeding electrodes 52, or the electric current flowing therebetween to detect the end point of processing, it is also possible to allow the monitor 42 to monitor a change in a state of a substrate being processed to detect an arbitrarily set end point of processing. In this case, the end point of processing refers to a point at which a desired processing amount is attained for a specified region in a surface to be processed, or a point at which an amount corresponding to a desired processing amount is attained in terms of a parameter correlated with a processing amount for a specified region in a surface to be processed. By thus arbitrarily setting and detecting the end point of processing even during processing, it becomes possible to conduct a multi-step electrolytic processing. This holds also for the below-described embodiments.

Figure 4B:
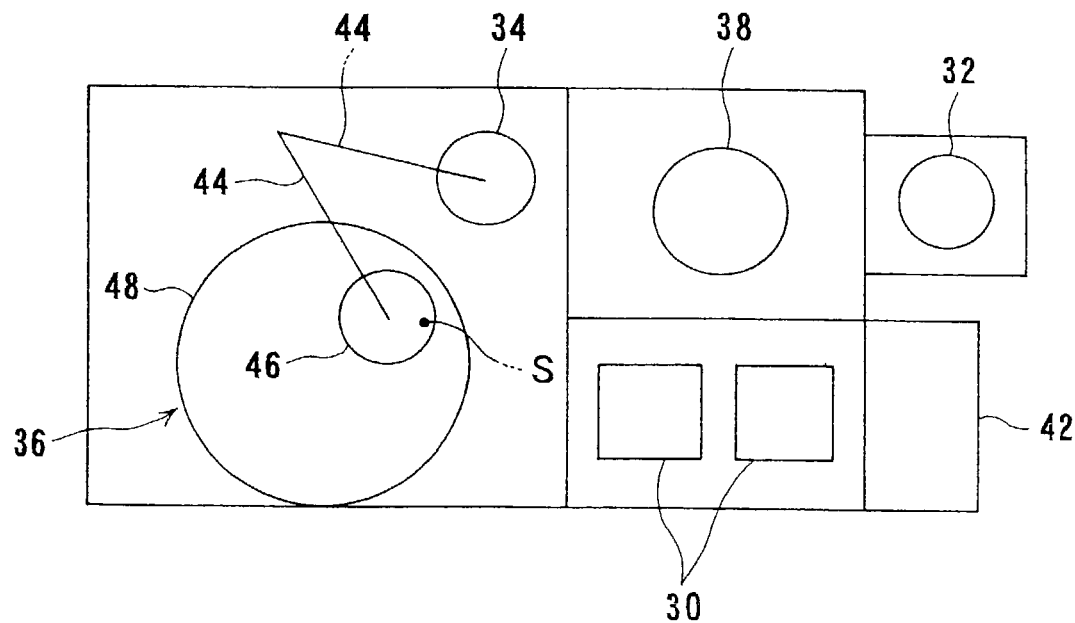

In this connection, as shown in FIG. 4B, it is possible to form a window extending through the electrode section 48 for transmitting a light therethrough and provide beneath the electrode section 48 a film-thickness sensor (film-thickness detection section) S having a light-emitting section for emitting a light and a light-receiving section for receiving a light. The film-thickness sensor S can measure a film thickness of a portion, to be processed, being processed in situ based on a detected change in intensity of reflected light. The end point of processing can be detected based on results of this film-thickness measurement.

After completion of the electrolytic processing, the power source 80 is disconnected, and the rotation of the substrate holder 46 and of the electrode section 48 is stopped. Thereafter, the substrate holder 46 is raised, and is carried to the pusher 34 by the swingable arm 44 to place the substrate W on the pusher 34. The transport robot 38 takes the substrate W from the pusher 34 and, if necessary, transports the substrate to the reversing machine 32 for reversing it, and then returns the substrate W to the cassette in the loading/unloading unit 30.

When electrolytic processing of a workpiece is conducted without interposing an ion exchanger between the processing electrode and the workpiece, the electric resistance is proportional to "the distance between the workpiece and the processing electrode (electrode-to-electrode distance)". This is because as a distance of ion migration becomes smaller, less energy is required for ion migration. In the presence of ultrapure water, for example, the electric resistance is 18.25 MΩ (0.54 µA at a voltage of 10 V) at an electrode-to-electrode distance of 1 cm, and 1.825 KΩ (5.4 mA at a voltage of 10 V) at an electrode-to-electrode distance of 1 µm.

In the case where an ion exchanger is interposed between the processing electrode and the workpiece, when the ion exchanger is brought close to the workpiece, but not into contract with it, the electric resistance is basically proportional to the "distance between the workpiece and the surface of the ion exchanger" as in the above case. When the ion exchanger is contacted with the workpiece, however, the electric resistance decreases to a further degree. This is ascribable to a large difference in ion concentration between an inside and outside of the ion exchanger.

More specifically, inside of the ion exchanger, electrolytic dissociation of ultrapure water is promoted by a catalytic action whereby a concentration of ions ($H^+$ and $OH^-$) increases. Thus, the inside of the ion exchanger, due to the presence of an ion-exchange group, becomes a special field in which a high concentration of ions is (or can be) accumulated. Outside of the ion exchanger, on the other hand, due to the absence of an ion-exchange group, the ions tend to return to an original state ($H_2O$) whereby the ion concentration is remarkably lower.

Accordingly, by bringing the ion exchanger into contact with the workpiece, the electric resistance can be kept at a certain low level irrespective of the distance between the workpiece and the processing electrode when the ion exchanger is in contact with the workpiece.

This embodiment shows a case of supplying pure water, preferably ultrapure water, between the electrode section 48 and the substrate W. Use of pure water or ultrapure water containing no electrolyte upon electrolytic processing can prevent impurities such as an electrolyte from adhering to and remaining on the surface of the substrate W. Further, copper ions or the like dissolved during electrolytic processing are immediately caught by the ion exchanger 56 through an ion-exchange reaction. This can prevent dissolved copper ions or the like from re-precipitating on other portions of the substrate W, or from being oxidized to become fine particles which contaminate the surface of the substrate W.

Ultrapure water has a high resistivity, and therefore an electric current is hard to flow therethrough. A lowering of the electric resistance is caused by making the distance between the electrode and a workpiece as small as possible, or by interposing the ion exchanger between the electrode and a workpiece. Further, an electrolytic solution, when used in combination with ultrapure water, can further lower the electric resistance and reduce power consumption. When electrolytic processing is conducted by using an electrolytic solution, a portion of a workpiece that undergoes processing ranges over a slightly wider area than an area of the processing electrode. In a case of combined use of ultrapure water and the ion exchanger, on the other hand, since almost no electric current flows through ultrapure water, electric processing is effected only within an area of a workpiece that is equal to an area of the processing electrode and the ion exchanger.

It is possible to use, instead of pure water or ultrapure water, an electrolytic solution obtained by adding an electrolyte to pure water or ultrapure water. Use of such an electrolytic solution can further lower the electric resistance and reduce power consumption. A solution of a neutral salt such as NaCl or $Na_2SO_4$, a solution of an acid such as HCl or $H_2SO_4$, or a solution of an alkali such as ammonia, may be used as the electrolytic solution, and these solutions may be selectively used according to properties of a workpiece. When the electrolytic solution is used, it is preferred to provide a slight interspace between the substrate W and the ion exchanger 56 so that they are not in contact with each other. To avoid contamination of the wafer induced by an electrolytic solution, it is better to use a dilute electrolytic solution for which electric conductivity is not more than 500 μs/cm. Therefore, cleanliness of a processed workpiece can be increased.

Further, it is also possible to use, instead of pure water or ultrapure water, a liquid obtained by adding a surfactant to pure water or ultrapure water, and having an electric conductivity of not more than 500 μS/cm, preferably not more than 50 μS/cm, more preferably not more than 0.1 μS/cm (resistivity of not less than 10 MΩ·cm). Due to presence of a surfactant, the liquid can form a layer, which functions to inhibit ion migration evenly, at an interface between the substrate W and the ion exchanger 56, thereby moderating concentration of ion exchange (metal dissolution) to enhance flatness of a processed surface. A surfactant concentration is desirably not more than 100 ppm. When a value of electric conductivity is too high, current efficiency is lowered and a processing rate is decreased. Use of the liquid having an electric conductivity of not more than 500 μS/cm, preferably not more than 50 μS/cm, more preferably not more than 0.1 μS/cm, can attain a desired processing rate.

According to the present invention, the processing rate can be considerably enhanced by interposing the ion exchanger 56 between the substrate W and the processing and feeding electrodes 50, 52. In this regard, electrochemical processing using ultrapure water is effected by a chemical interaction between hydroxide ions in ultrapure water and a material to be processed. However, an amount of the hydroxide ions acting as reactant in ultrapure water is as small as $10^{-7}$ mol/L under normal temperature and pressure conditions, so that a removal processing efficiency can decrease due to reactions (such as an oxide film-forming reaction) other than a reaction for removal processing. It is therefore necessary to increase hydroxide ions in order to conduct removal processing efficiently. A method for increasing hydroxide ions is to promote the dissociation reaction of ultrapure water by using a catalytic material, and an ion exchanger can be effectively used as such a catalytic material. More specifically, activation energy relating to water-molecule dissociation reaction is lowered by an interaction between functional groups in an ion exchanger and water molecules, whereby dissociation of water is promoted to thereby enhance the processing rate.

It may be possible to omit the ion exchanger 56, and supply pure water or ultrapure water between the substrate W and the processing and feeding electrodes 50, 52. Though the processing rate is lowered by omission of the ion exchanger 56, the electrolytic processing is effective especially for removing an extremely thin film. Moreover, this excludes a possibility that extra impurities such as an electrolyte will adhere to and remain on the surface of the substrate W.

Further, according to this embodiment, the ion exchanger 56 is brought into contact with or close to the substrate W upon electrolytic processing. When the ion exchanger 56 is positioned close to the substrate W, though depending on the distance therebetween, the electric resistance is large to some degree and, therefore, a somewhat large voltage is necessary to provide a requisite electric current density. However, on the other hand, because of this non-contact relationship, it is easy to form flow of pure water or ultrapure water along the surface of the substrate W, whereby a reaction product produced on this substrate surface can be efficiently removed. In the case where the ion exchanger 56 is brought into contact with the substrate W, the electric resistance becomes very small and therefore only a small voltage needs to be applied, whereby power consumption can be reduced.

If a voltage is raised to increase a current density in order to enhance the processing rate, an electric discharge can occur when electric resistance between an electrode and a substrate (workpiece) is large. An occurrence of electric discharge causes pitching on a surface of the workpiece, thus failing to forman even and flat processed surface. To the contrary, since the electric resistance is very small when the ion exchanger 56 is in contact with the substrate W, occurrence of an electric discharge can be avoided.

When electrolytic processing of copper is conducted by using, as the ion exchanger 56, an ion exchanger having a cation-exchange group, the ion-exchange group of the ion exchanger (cation exchanger) 56 is saturated with copper after processing, whereby processing efficiency of a next processing is lowered. When electrolytic processing of copper is conducted by using, as the ion exchanger 56, an ion exchanger having an anion-exchange group, fine particles of a copper oxide can be produced and adhere to the surface of the ion exchanger (anion exchanger) 56, which particles can contaminate a surface of a next substrate to be processed.

In order to obviate such drawbacks, as shown in FIG. 15, a regeneration section 84 for regenerating the ion exchanger 56 is provided, and regeneration of the ion exchanger 56 can be effected during electrolytic processing. The regeneration section 84 comprises a swingable arm 86 having a structure similar to the swingable arm 44 that holds the substrate holder 46 and positioned at an opposite side relative to the swingable arm 44 across the electrode section 48, and a regeneration head 88 held by the swingable arm 86 at a free end thereof. In operation, a reverse electric potential to that for processing is given to the ion exchanger 56 from the power source 80, thereby promoting dissolution of extraneous matter such as copper adhering to the ion exchanger 56. The regeneration of the ion exchanger 56 during processing can thus be effected. This regenerated ion exchanger 56 is rinsed by pure water or ultrapure water supplied to the upper surface of the electrode section 48.

Figure 16:
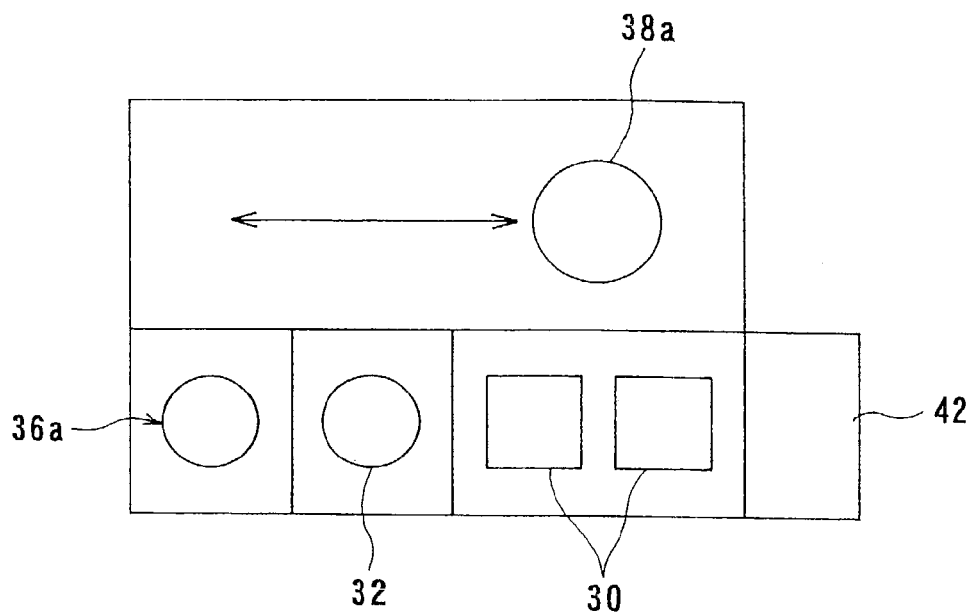
FIG. 16 is a plan view showing a layout of a substrate processing apparatus according to another embodiment of the present invention.
Figure 17:
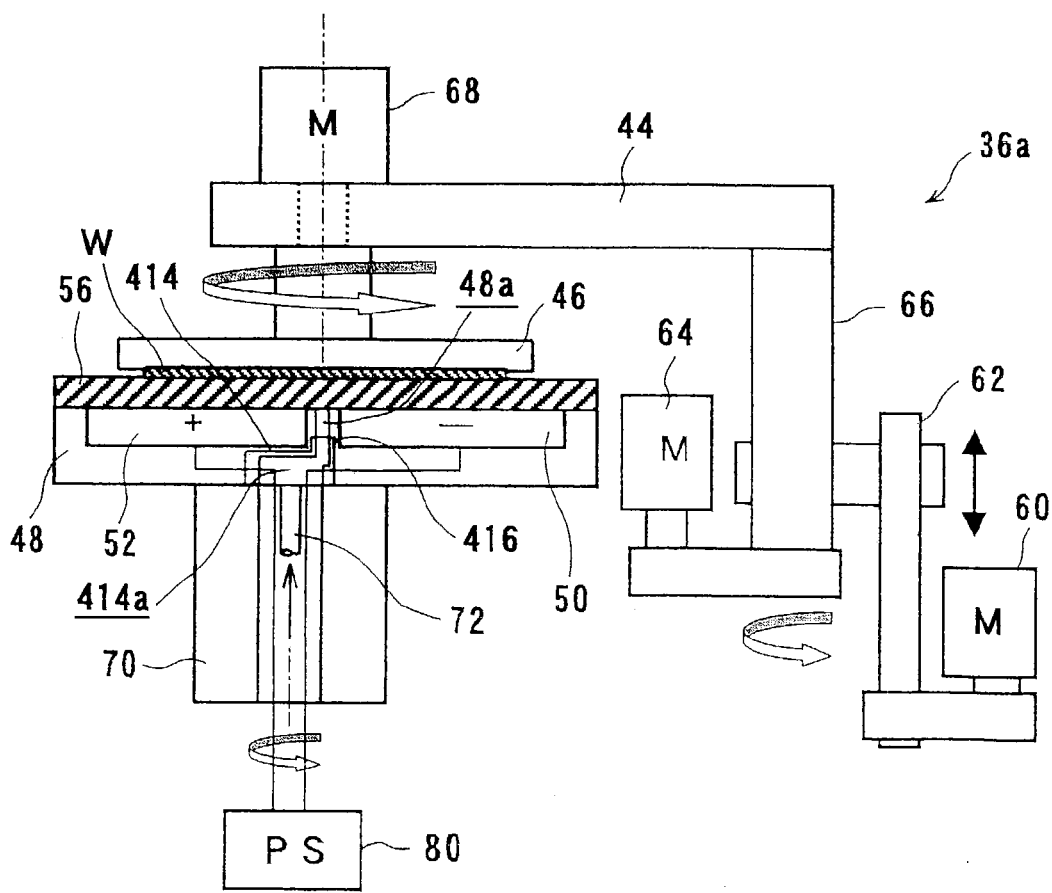
FIG. 17 is a cross-sectional view of an electrolytic processing device according to another embodiment of the present invention, which is provided in the substrate processing apparatus of FIG. 16.

FIG. 16 shows a layout of a substrate processing apparatus according to another embodiment of the present invention. FIGS. 17 through 19 show an electrolytic processing device according to another embodiment of the present invention provided with the substrate processing apparatus. In the description given below, the same members as in the above-described embodiment are given the same reference numerals, and description thereof is partly omitted. This holds for all of the below-described embodiments.

As shown in FIG. 16, the substrate processing apparatus comprises a pair of loading/unloading units 30 as a carry-in and carry-out section for carrying in and carrying out a substrate W, reversing machine 32 for reversing the substrate W, and an electrolytic processing device 36a, which are disposed in series. A transport robot 38a as a transport device is provided which can move parallel to these devices for transporting and transferring the substrate W therebetween. The substrate processing apparatus is also provided with monitor 42 for monitoring a voltage applied between processing electrode 50 and feeding electrode 52 upon electrolytic processing in the electrolytic processing device 36a, or an electric current flowing therebetween.

In the electrolytic processing device 36a, electrode section 48, in which the processing electrodes 50 and the feeding electrodes 52 are embedded, is designed to have a slightly larger diameter than that of the substrate W to be held by the substrate holder 46. By actuation of hollow motor 70, the electrode section 48 makes a revolutionary movement with a distance between a central axis of the hollow motor 70 and a central axis of the electrode section 48 as a radius, without rotation about its own axis, i.e. a so-called scroll movement (translational rotation).

In this regard, as shown in FIGS. 19A and 19B, three or more (four in FIG. 19A) of rotation-prevention mechanisms 400 are provided in a circumferential direction between the electrode section 48 and the hollow motor 70. In particular, a plurality of depressions 402 and 404 are formed at equal intervals in the circumferential direction at corresponding positions in an upper surface of the hollow motor 70 and in a lower surface of the electrode section 48. Bearings 406 and 408 are fixed in each depression 402 and depression 404, respectively. As shown in FIG. 19B, a connecting member 412, which has two shafts 409, 410 that are eccentric relative to each other by eccentricity "e", is coupled to each pair of the bearings 406, 408 by inserting respective ends of the shafts 409, 410 into the bearings 406, 408. Further, a drive end 416, formed at an upper end portion of the main shaft 414 of the hollow motor 70 and arranged eccentrically relative to a center of a main shaft, is rotatably connected, via a bearing (not shown), to a lower central portion of the electrode section 48. This eccentricity is also "e". Accordingly, the electrode section 48 is allowed to make a translational movement along a circle with radius "e".

According to this embodiment, it is not possible to supply pure water or ultrapure water to an upper surface of the electrode section 48 from above the electrode section 48 during electrolytic processing. Thus, as shown in FIG. 17, pure water or ultrapure water is supplied to the upper surface of the electrode section 48 only through a through-hole 414a formed in main shaft 414 and a through-hole 48a formed in the electrode section 48. Further, since the electrode section 48 does not rotate about its own axis, slip ring 78 is omitted. Furthermore, as shown in FIG. 18, an ultrapure water-spray nozzle 90 as a regeneration section is retreatably provided beside the electrode section 48, which sprays ultrapure water onto ion exchanger 56 after electrolytic processing, thereby regenerating the ion exchanger 56. Other construction is the same as the first embodiment.

According to the electrolytic processing device 36a, electrolytic processing of the surface of the substrate W is performed by rotating, via the substrate holder 46, the substrate W which is in contact with or close to the ion exchanger 56, and, at the same time, allowing the electrode section 48 to make a scroll movement by actuation of the hollow motor 70, while supplying pure water or ultrapure water to the upper surface of the electrode section 48 and applying a given voltage between the processing electrodes 50 and the feeding electrodes 52.

Flow of the substrate W in handling thereof in the substrate processing apparatus of this embodiment is the same as in the above-described embodiment shown in FIG. 4, except that the substrate W is transferred directly between the transport robot 38a and the electrolytic processing device 36a (i.e. not via a pusher), and therefore description thereof is omitted here.

FIGS. 20 and 21 show a variation of the electrolytic processing device 36a. In this electrolytic processing device 36a, electrode section 48, which makes a scroll movement, comprises a disc-shaped processing electrode 50 and a ring-shaped feeding electrode 52 that surrounds an outer periphery of the processing electrode 50, which are separated by a ring-shaped insulator 53. Further, an upper surface of the processing electrode 50 is covered with an ion exchanger 56e and an upper surface of the feeding electrode 52 is covered with an ion-exchanger 56f, with these respective ion exchangers 56e, 56f being separated by the insulator 53. When rotating the substrate W, which is in contact with or close to the ion exchangers 56e, 56f, and, at the same time, allowing the electrode section 48 to make a scroll movement as described above, part of substrate W is always positioned above the feeding electrode 52, so that the substrate W can receive electricity therefrom. Other construction is the same as in the electrolytic processing device shown in FIGS. 16 through 19. According to this embodiment, current efficiency is enhanced by surrounding the processing electrode 50 with the feeding electrode 52, and a uniform processing can be conducted over a substantially entire surface of the substrate W.

Figure 22:
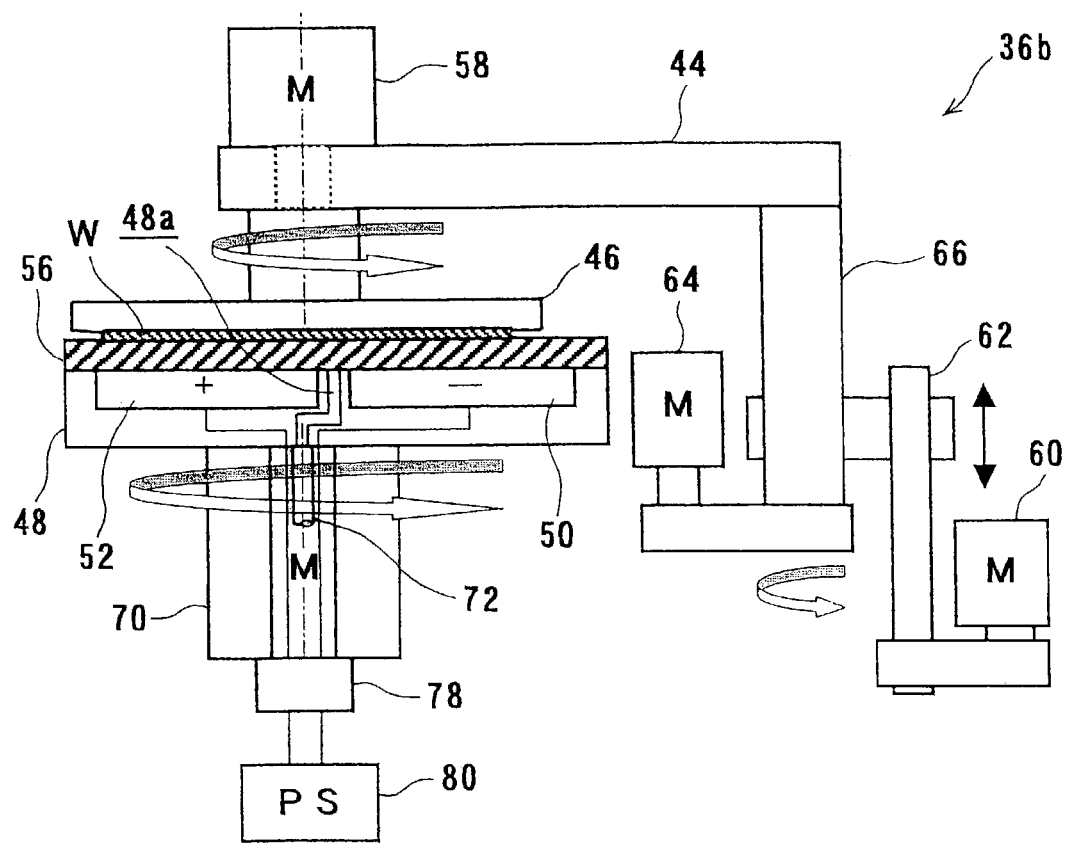
FIG. 22 is a cross-sectional view of an electrolytic processing device according to still another embodiment of the present invention.

FIGS. 22 and 23 show an electrolytic processing device 36b according to another embodiment of the present invention. In this electrolytic processing device 36b, a rotational center $O_1$ of electrode section 48 is distant from a rotational center $O_2$ of substrate holder 46 by a distance d; and the electrode section 48 rotates about the rotational center $O_1$ and the substrate holder 46 rotates about the rotational center $O_2$. Further, processing electrodes 50 and feeding electrodes 52 are connected to power source 80 via slip ring 78. Other construction is the same as in the embodiment shown in FIGS. 18 and 19, and hence description thereof is omitted here.

According to the electrolytic processing device 36b, electrolytic processing of a surface of substrate W is performed by rotating the substrate W via the substrate holder 46 and, at the same, rotating the electrode section 48 by actuation of hollow motor 70, while supplying pure water or ultrapure water to an upper surface of the electrode section 48 and applying a given voltage between the processing electrodes 50 and the feeding electrodes 52.

Figure 24:
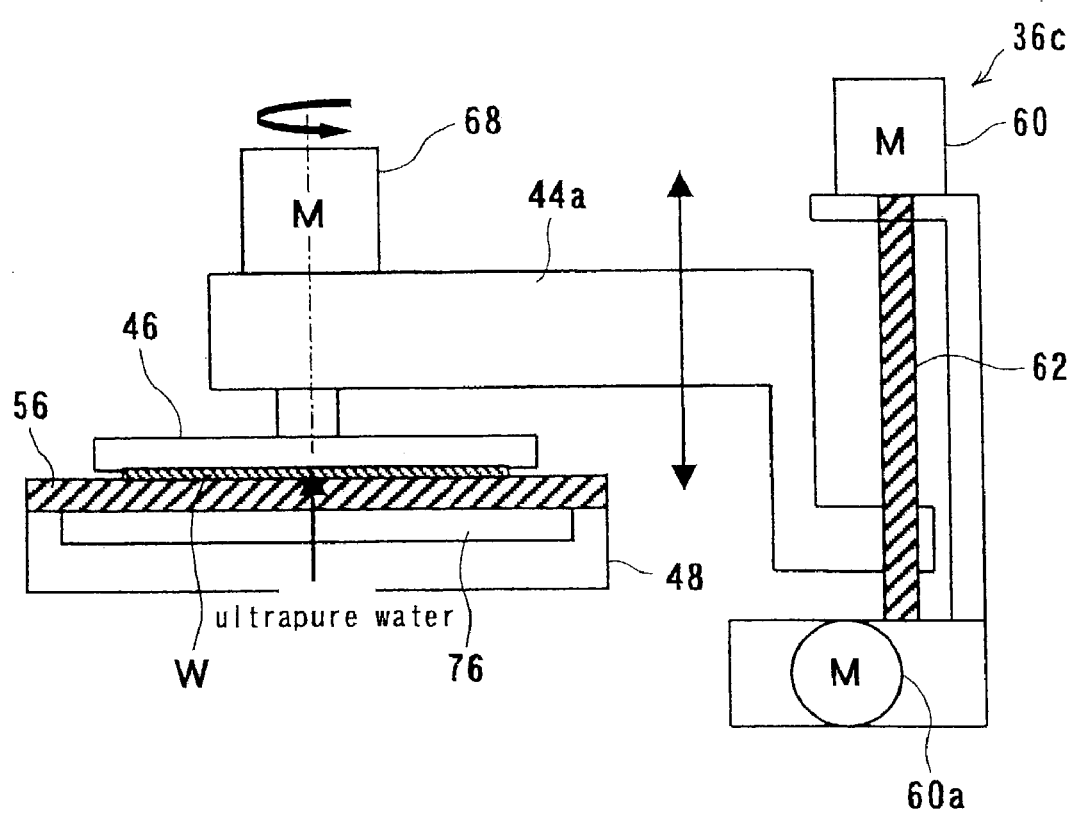
FIG. 24 is a cross-sectional view of an electrolytic processing device according to still another embodiment of the present invention.
Figure 25:
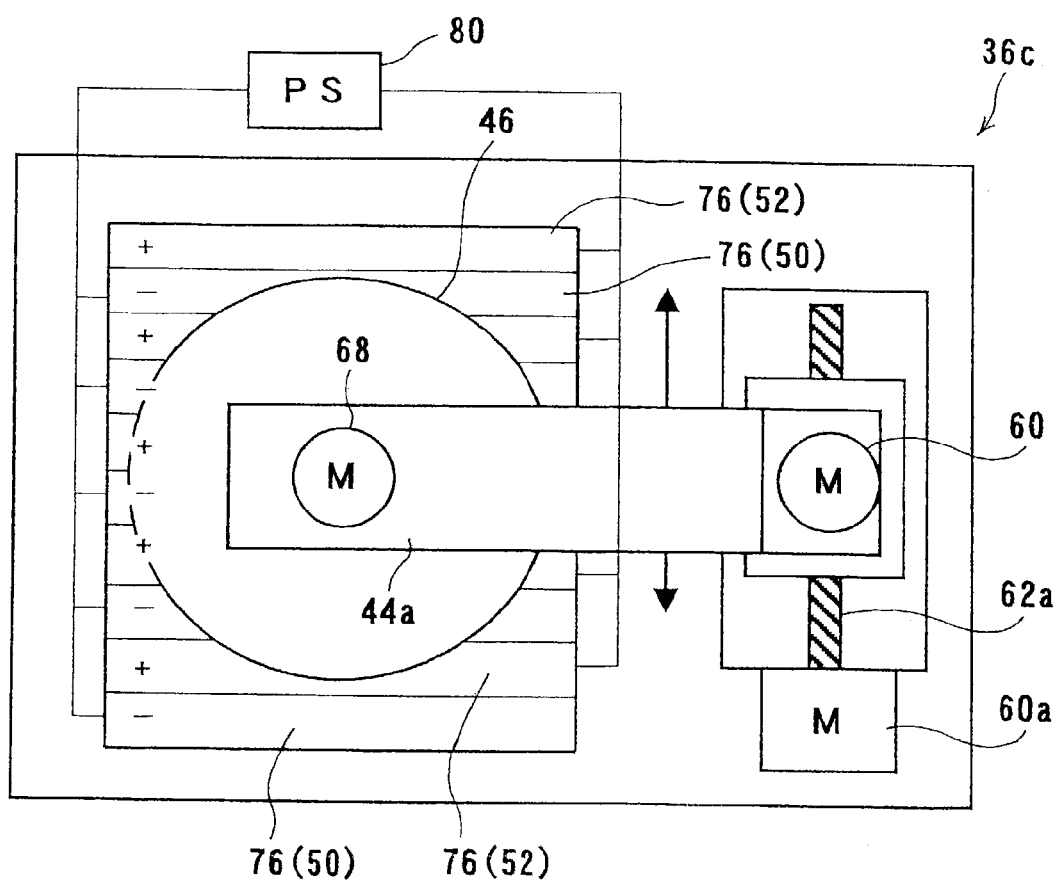
FIG. 25 is a plan view of the electrolytic processing device of FIG. 24.

FIGS. 24 and 25 show an electrolytic processing device 36c according to still another embodiment of the present invention. This electrolytic processing device 36c employs a rectangular fixed-type electrode section 48 and a substrate holder 46 that can move up and down, does not swing, and makes a reciprocating movement in a horizontal direction. More specifically, electrode plates 76, extending in a width direction of the rectangular electrode 48 over an entire length thereof, are disposed in parallel in an upper surface of the electrode section 48, and a cathode and anode of power source 80 are alternately connected to the electrode plates 76, so that the electrode plates 76 connected to the cathode becomes processing electrodes 50 or, adversely, the electrode plates 76 connected to the anode becomes feeding electrodes 52. The substrate holder 46, on the other hand, which is secured to a free end of a lifting arm 44a that moves vertically via ball screw 62 by actuation of motor 60 for vertical movement, is allowed to rotate about its own axis by actuation of motor 68 for rotation, and is also allowed to reciprocate together with the lifting arm 44*a*, via a ball screw 62*a* by actuation of a motor 60*a* for reciprocation, in an orthogonal direction relative to the electrode plates 76.

According to the electrolytic processing device 36*c*, electrolytic processing of a surface of substrate W is performed by rotating, via the substrate holder 46, the substrate W which is in contact with or close to ion exchanger 56 and, at the same time, reciprocating the substrate holder 46 by the actuation of the motor 60*a* for reciprocation, while supplying pure water or ultrapure water to an upper surface of the electrode section 48 and applying a given voltage between the processing electrodes 50 and the feeding electrodes 52.

Figure 26:
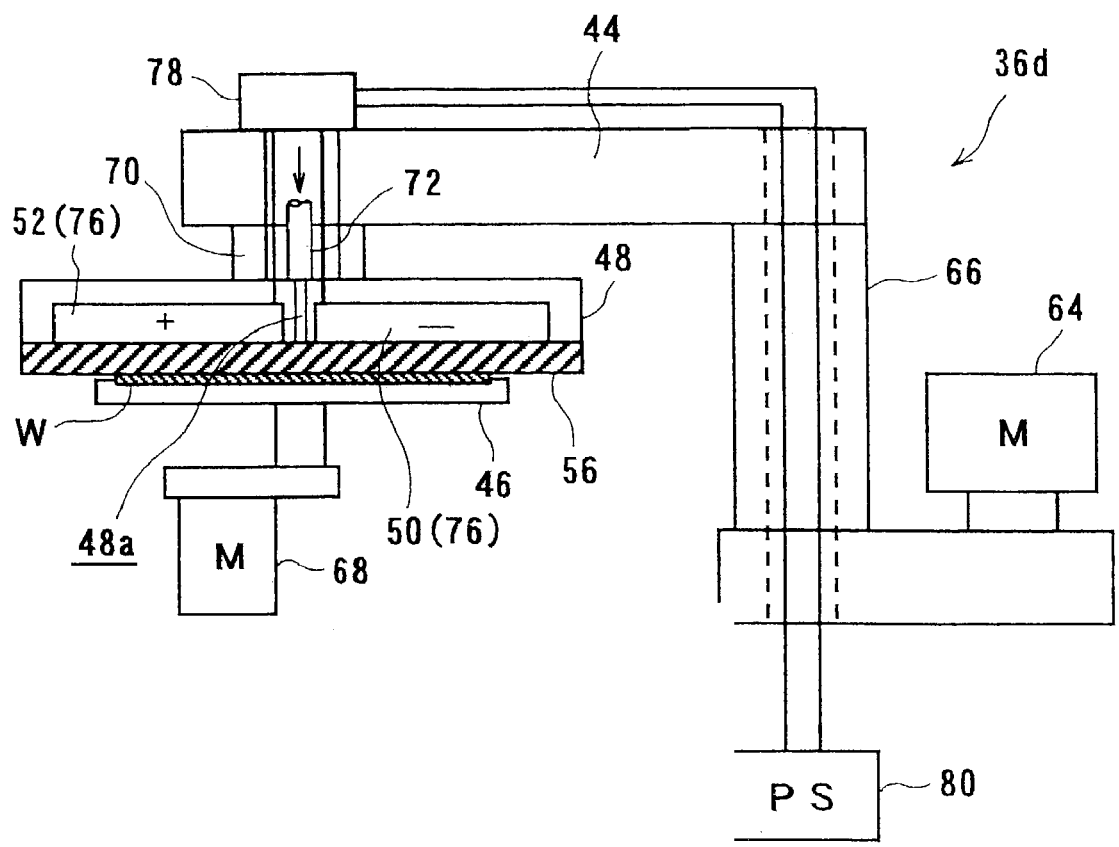
FIG. 26 is a cross-sectional view of an electrolytic processing device according to still another embodiment of the present invention.
Figure 27:
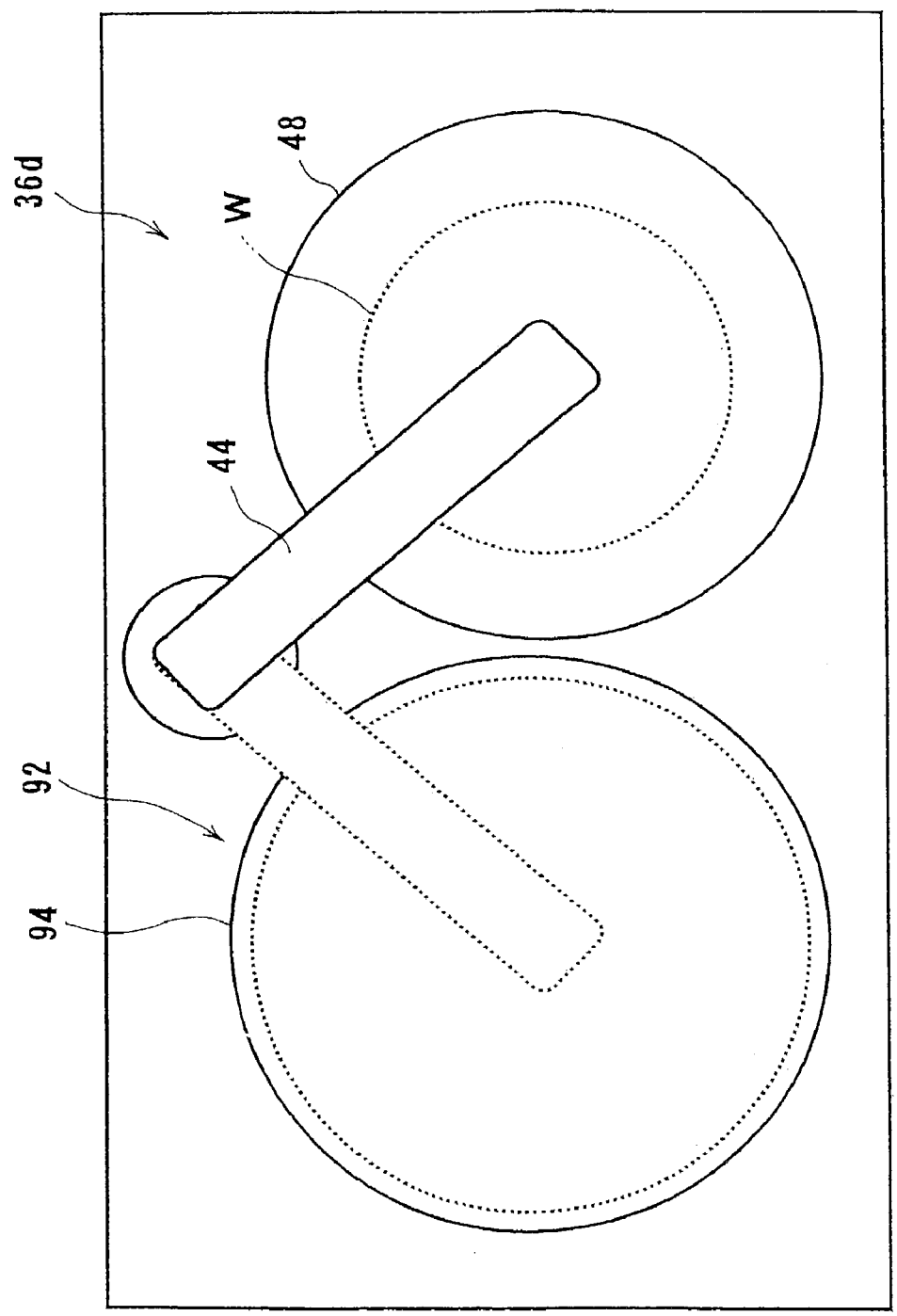
FIG. 27 is a plan view of the electrolytic processing device of FIG. 26.

FIGS. 26 and 27 show an electrolytic processing device 36*d* according to still another embodiment of the present invention. In this electrolytic processing device 36*d*, a positional relationship between the substrate holder 46 and the electrode section 48 in the preceding embodiments is reversed, and substrate W is held with its front surface upward (so-called "face-up" manner) so that electrolytic processing is conducted to an upper surface of the substrate. Thus, substrate holder 46 is disposed beneath electrode section 48, holds the substrate W with its front surface upward, and rotates about its own axis by actuation of motor 68 for rotation. On the other hand, the electrode section 48, which has processing electrodes 50 and feeding electrodes 52 that are covered with ion exchanger 56, is disposed above the substrate holder 46, is held with its front surface downward by swingable arm 44 at a free end thereof, and rotates about its own axis by actuation of hollow motor 70. Further, wires extending from power source 80 pass through a hollow portion formed in shaft 66 for swinging and reach slip ring 78, and further pass through a hollow portion of the hollow motor 70 and reach the processing electrodes 50 and the feeding electrodes 52 to apply a voltage therebetween.

Pure water or ultrapure water is supplied from pure water supply pipe 72, via through-hole 48*a* formed in a central portion of the electrode section 48, to a front surface (upper surface) of the substrate W.

A regeneration section 92 for regenerating the ion exchanger 56 mounted on the electrode section 48 is disposed beside the substrate holder 46. The regeneration section 92 includes a regeneration tank 94 filled with e.g. a dilute acid solution. In operation, the electrode section 48 is moved by the swingable arm 44 to a position right above the regeneration tank 94, and is then lowered so that at least the ion exchanger 56 of the electrode section 48 is immersed in the acid solution in the regeneration tank 94. Thereafter, a reverse electric potential to that for processing is given to the electrode plates 76, i.e. by connecting the processing electrodes 50 to an anode of the power source 80 and connecting the feeding electrodes 52 to a cathode, thereby promoting dissolution of extraneous matter such as copper adhering to the ion exchanger 56 to thereby regenerate the ion exchanger 56. This regenerated ion exchanger 56 is rinsed by e.g. ultrapure water.

Further, according to this embodiment, the electrode section 48 is designed to have a sufficiently larger diameter than the substrate W held by the substrate holder 48. Electrolytic processing of the surface of the substrate W is conducted by lowering the electrode section 48 so that the ion exchanger 56 contacts or gets close to the substrate W held by the substrate holder 46, then rotating the substrate holder 46 and the electrode section 48 and, at the same time, swinging the swingable arm 44 to move the electrode section 48 along the upper surface of the substrate W, while supplying pure water or ultrapure water to the upper surface of the substrate and applying a given voltage between the processing electrode 50 and the feeding electrode 52.

Figure 28:
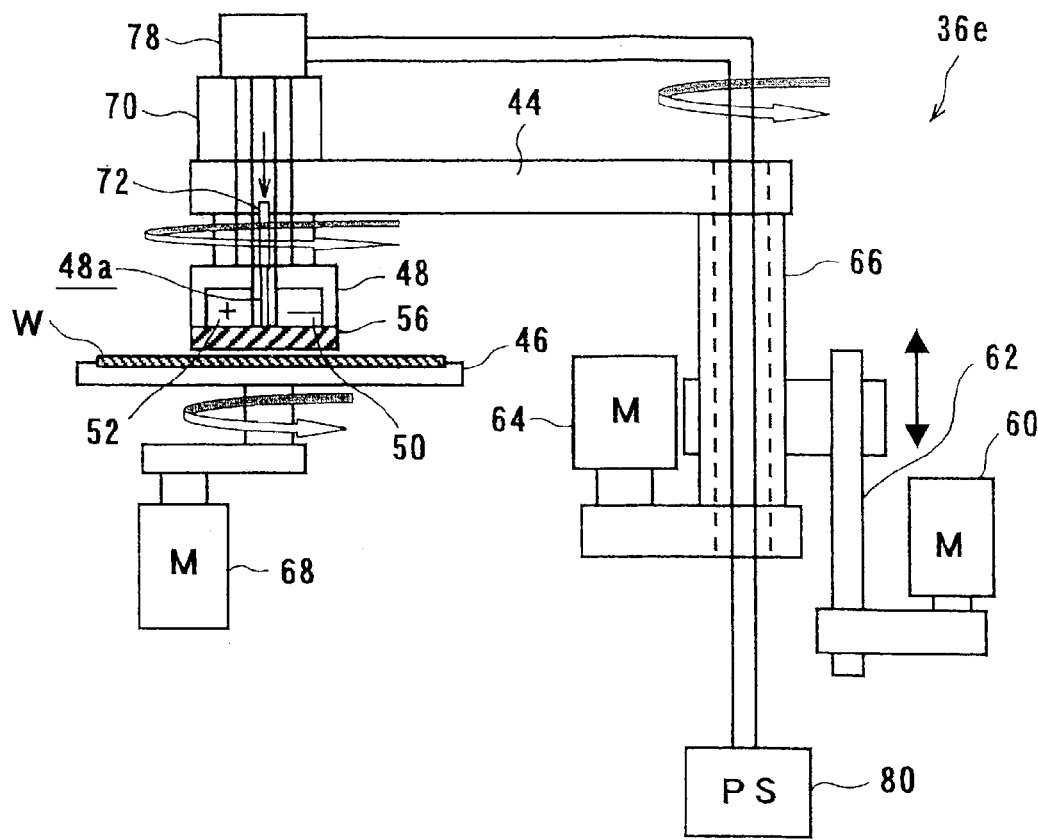
FIG. 28 is a cross-sectional view of an electrolytic processing device according to still another embodiment of the present invention.
Figure 29:
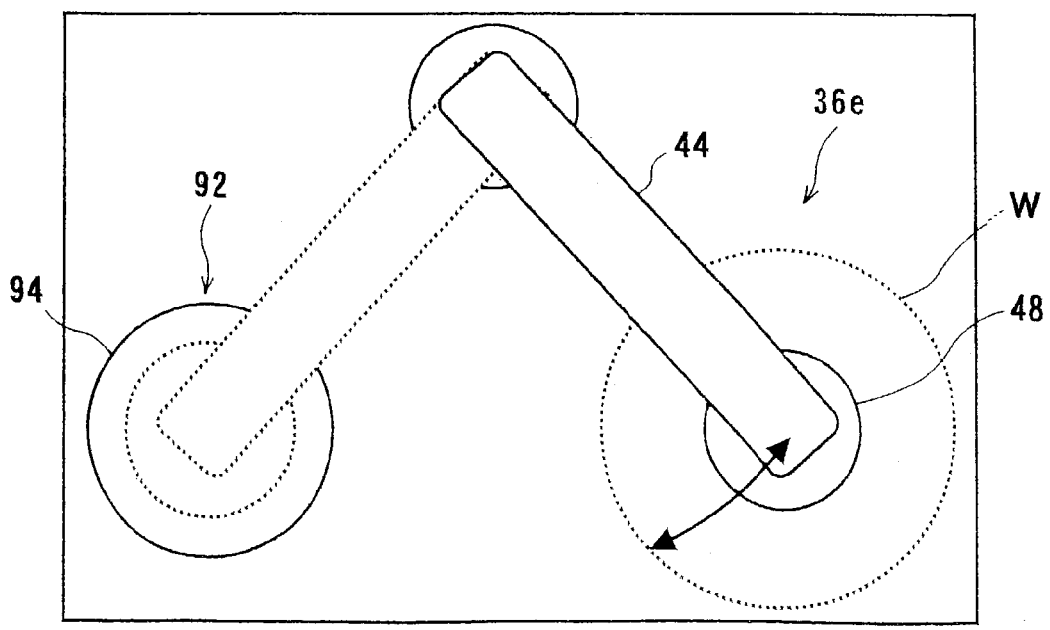
FIG. 29 is a plan view of the electrolytic processing device of FIG. 28.

FIGS. 28 and 29 show an electrolytic processing device 36*e* according to still another embodiment of the present invention. This electrolytic processing device 36*e* employs, as electrode section 48, one that has a sufficiently smaller diameter than that of substrate W held by substrate holder 46 so that a surface of the substrate may not be entirely covered with the electrode section 48 Other construction is the same as in the embodiment shown in FIGS. 26 and 27. The above construction can make an electrode section small and compact, and, in addition, can prevent a generated gas from adhering to the substrate.

Figure 30:
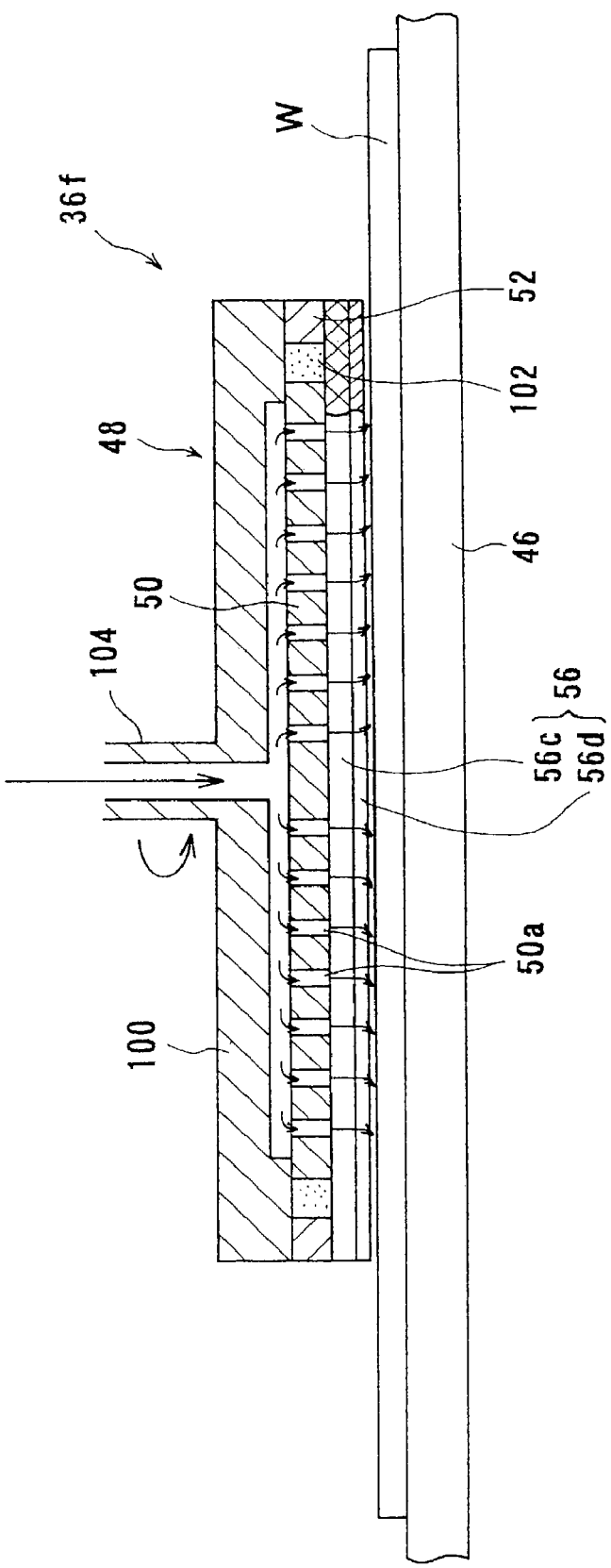
FIG. 30 is a cross-sectional view of an electrolytic processing device according to still another embodiment of the present invention.

FIG. 30 shows an electrolytic processing device 36*f* according to still another embodiment of the present invention. In this electrolytic processing device 36*f*, electrode section 48 is disposed above substrate holder 46 that holds substrate W with its front surface upward. The electrode section 48 comprises a disk-shaped base 100 composed of insulating material, a disc-shaped processing electrode 50 having through-holes 50*a* for supplying pure water or ultrapure water, and a ring-shaped feeding electrode 52, which are separated by a ring-shaped insulator 102. The processing electrode 50 and the feeding electrode 52 are mounted on a lower surface of the base 100 in the same plane. Further, on a lower surface of the processing electrode 50 and the feeding electrode 52 is mounted an ion exchanger 56 which is composed of e.g. fibers containing a strongly acidic cation-exchange group and promotes a dissociation reaction of pure water or ultrapure water. The base 100 is rotatable, and is connected to a lower end of a hollow rotating shaft 104. Pure water or ultrapure water is supplied through a hollow portion of the rotating shaft 104 to an inside of the base 100. Further in this embodiment, an ion exchanger having a two-layer structure of a soft exchanger 56*c* and a hard exchanger 56*d*, both having the same level of resistivity, is employed as the ion exchanger 56.

By thus making the ion exchanger 56 a multi-layer structure consisting of laminated layers of ion-exchange materials, such as a nonwoven fabric, a woven fabric and a porous membrane, it is possible to increase a total ion exchange capacity whereby formation of an oxide, for example in removal (polishing) processing of copper, can be restrained to thereby avoid an oxide adversely affecting a processing rate. In this regard, when the total ion exchange capacity of an ion exchanger is smaller than an amount of copper ions taken in the ion exchanger during removal processing, an oxide should inevitably be formed on the surface or inside of the ion exchanger, which adversely affects the processing rate. Thus, formation of the oxide is governed by the ion exchange capacity of an ion exchanger, and copper ions exceeding the capacity should become the oxide. The formation of an oxide can thus be effectively restrained by using, as the ion exchanger 56, a multi-layer ion exchanger composed of laminated layers of ion-exchange materials which has enhanced total ion exchange capacity. Incidentally, the formation of an oxide can also be restrained by regenerating an ion exchanger so as to suppress accumulation of copper ions within the ion exchanger.

Further, when an interconnect pattern, for example an interconnect pattern composed of copper film 6 as shown in FIG. 85, is formed by removal (polishing) processing, the copper film 6 filled into a trench is likely to be hollowed out or peeled off after the processing. This may be influenced by hardness and form of an outermost ion exchanger (ion-exchange material) to be contacted with the copper film 6.

It is then considered that the above defects may be obviated by making the ion exchanger 56 a multi-layer structure, as in this embodiment, and using the ion exchanger (ion-exchange material) which meets requirements of ① good surface smoothness, ② hard material and ③ water-permeable, such as a porous membrane or a woven fabric, as the outermost ion exchanger.

According to this embodiment, pure water or ultrapure water fed through a feed line into the rotating shaft 104 is allowed to flow, under centrifugal force due to rotation of the base 100, through the through-holes 50a formed in the processing electrode 50 and supplied to the ion exchanger 56. The pure water or ultrapure water supplied dissociates by catalytic action of the ion exchanger 56 to produce hydroxide ions. Since the processing electrode 50 and the feeding electrode 52 are separated by the insulator 102, migration of the hydroxide ions is intercepted by the insulator 102. Further, when the substrate W is in an electrically insulated state, a portion of the substrate W facing the processing electrode (e.g. cathode) 50 functions as an anode, and a portion of the substrate W facing the feeding electrode (e.g. anode) 52 functions as a cathode. Accordingly, electrochemical dissolution occurs in this anode portion of the substrate W facing the processing electrode 50.

In a case where an ion exchanger is contacted with the substrate W, the ion exchanger can deteriorate due to a sliding movement. Such deterioration can, however, be avoided by making the ion exchanger a two-layer structure in which an outer layer to be contacted with the substrate W is composed of e.g. a woven fabric or a porous membrane, as described above, or by using such material as a pad having an ion-exchange ability to enhance mechanical strength.

Figure 31:
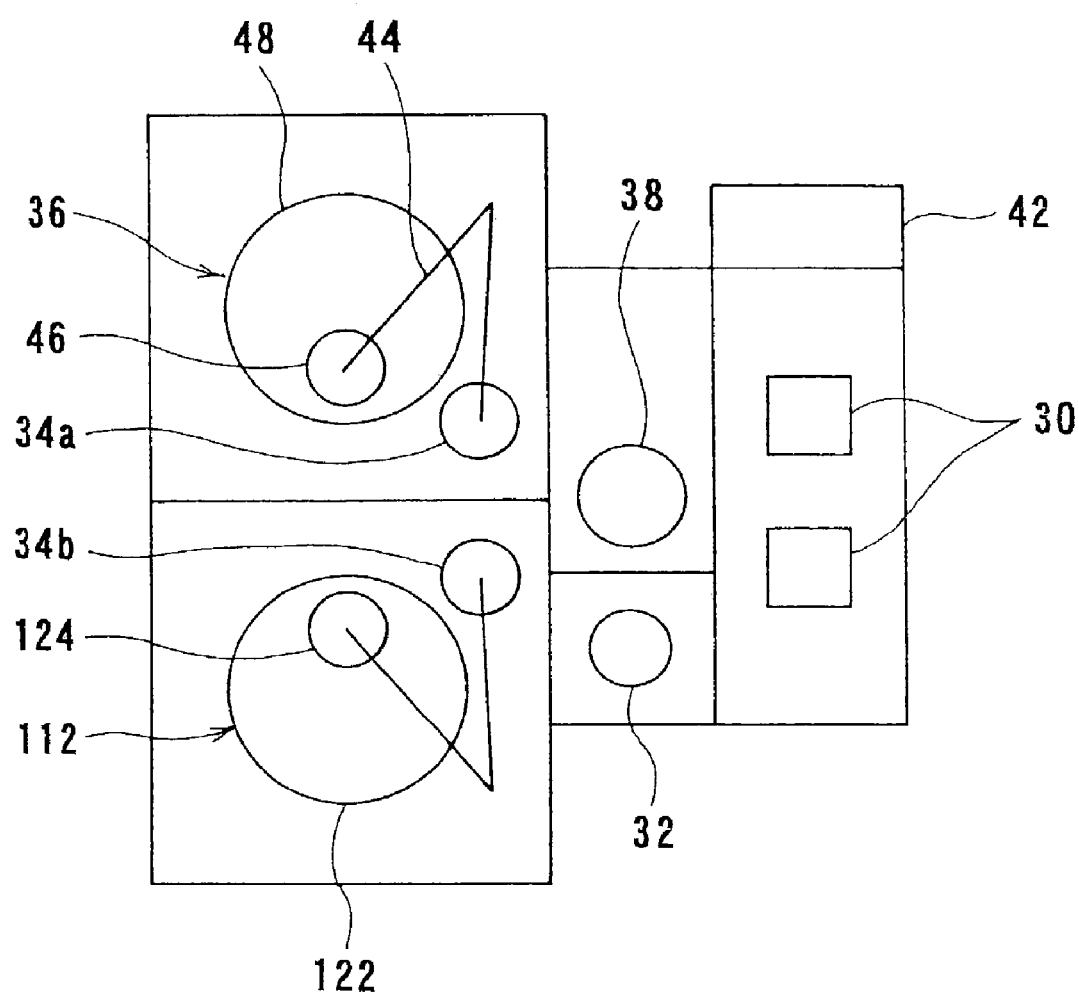
FIG. 31 is a plan view showing a layout of a substrate processing apparatus according to still another embodiment of the present invention.

FIG. 31 shows a substrate processing apparatus according to still another embodiment of the present invention provided with electrolytic processing device 36. This substrate processing apparatus comprises a pair of loading/unloading units 30 as a carry-in and carry-out section for carrying in and carrying out a cassette housing a substrate W, reversing machine 32, pushers 34a, 34b for transferring the substrate W, the electrolytic processing device 36, and a CMP device 112. Fixed-type transport robot 38 is provided between the loading/unloading units 30, the reversing machine 32 and the pushers 34a, 34b as a transport device for transporting and transferring the substrate W therebetween. The substrate processing apparatus is also provided with monitor 42 for monitoring a voltage applied between processing electrode 50 and feeding electrode 52 upon electrolytic processing in the electrolytic processing device 36, or an electric current flowing therebetween.

Figure 32:
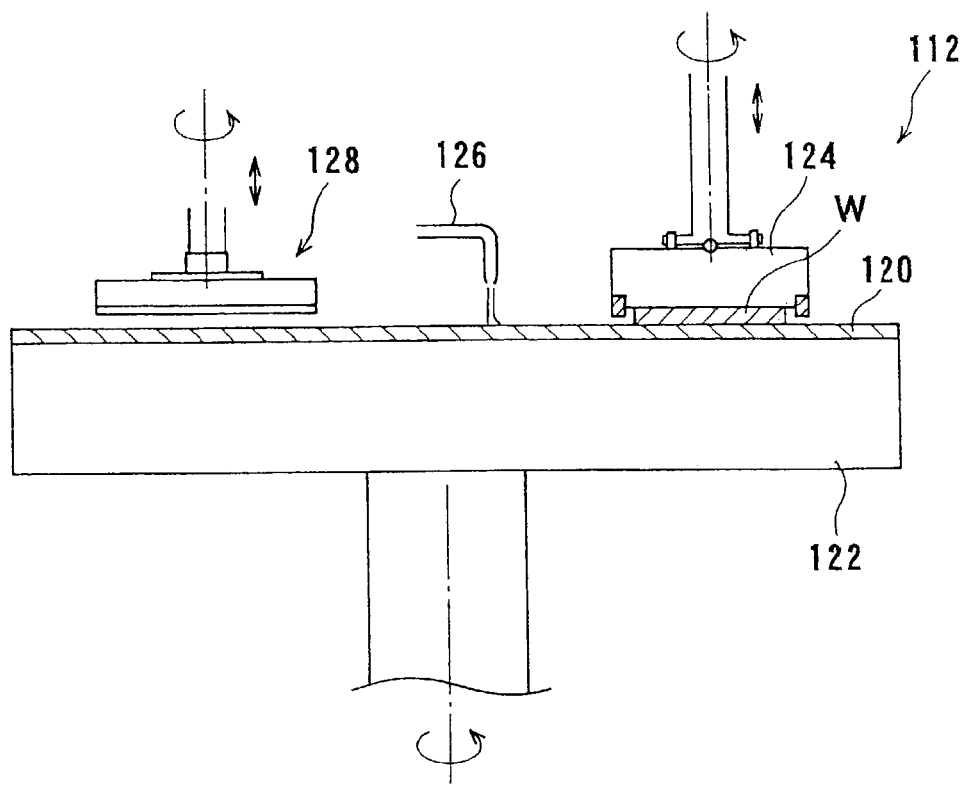
FIG. 32 is a schematic sectional view of a CMP device.

FIG. 32 shows an example of the CMP device 112. The CMP device 112 comprises a polishing table 122 having a polishing surface composed of a polishing cloth 120 (polishing pad) which is attached to an upper surface of the polishing table 122, and a top ring 124 for holding a substrate W with its surface to be polished facing the polishing table 122. Polishing of the surface of the substrate W is performed by rotating the polishing table 122 and the top ring 124 respectively, and supplying an abrasive liquid from an abrasive liquid nozzle 126 disposed above the polishing table 122, while pressing the substrate W against the polishing cloth 120 of the polishing table 122 at a given pressure by the top ring 124. As the abrasive liquid supplied from the abrasive liquid nozzle 126, a suspension of abrasive particles, such as fine particles of silica, in an alkali solution may be used. By combination of chemical polishing by an alkali and mechanical polishing by abrasive particles, i.e. chemical mechanical polishing, the substrate W can be polished into a flat mirror surface.

Polishing power of a polishing surface of the polishing cloth 120 decreases with a continuous polishing operation. In order to restore the polishing power, a dresser 128 is provided to conduct dressing of the polishing cloth 120, for example at the time of changing the substrate W. In a dressing treatment, while rotating the dresser 128 and the polishing table 122 respectively, a dressing surface (dressing member) of the dresser 128 is pressed against the polishing cloth 120 of the polishing table 122, thereby removing abrasive liquid and chips adhering to the polishing surface and, at the same time, flattening and dressing the polishing surface, whereby the polishing surface is regenerated.

According to this substrate processing apparatus, a substrate W is taken by the transport robot 38 out of the cassette set in the loading/unloading unit 30. The substrate W is transported to the reversing machine 32, according to necessity, to reverse the substrate W, and is then transported by the transport robot 38 to the pusher 34a beside the electrolytic processing device 36. The substrate W is transferred from the pusher 34a to substrate holder 46 of the electrolytic processing device 36. Rough cutting (etching) by electrolytic processing of a surface of the substrate W is conducted in the electrolytic processing device 36. After completion of this processing, the substrate W is returned to the pusher 34a. Thereafter, the substrate W on the pusher 34a is transported by the transport robot 38 to the pusher 34b beside the CMP device 112, and is then transferred to the top ring 124 of the CMP device 112. Finishing by CMP polishing of the substrate W is conducted in the CMP device 112. After completion of the CMP polishing, the substrate W is returned to the pusher 34b. Thereafter, the transport robot 38 takes the substrate W from the pusher 34b and, after transporting the substrate W to the reversing machine 32, according to necessity, to reverse the substrate, returns the substrate W to the cassette in the loading/unloading unit 30.

Though in this embodiment rough cutting of the substrate W is conducted by electrolytic processing in the electrolytic processing device 36 and finishing of the substrate W is conducted by CMP polishing in the CMP device 112, it is possible to conduct rough cutting of the substrate W by CMP polishing in the CMP device 112 and conduct finishing of the substrate W by electrolytic processing in the electrolytic processing device 36. A load upon CMP processing can thus be reduced.

Figure 33:
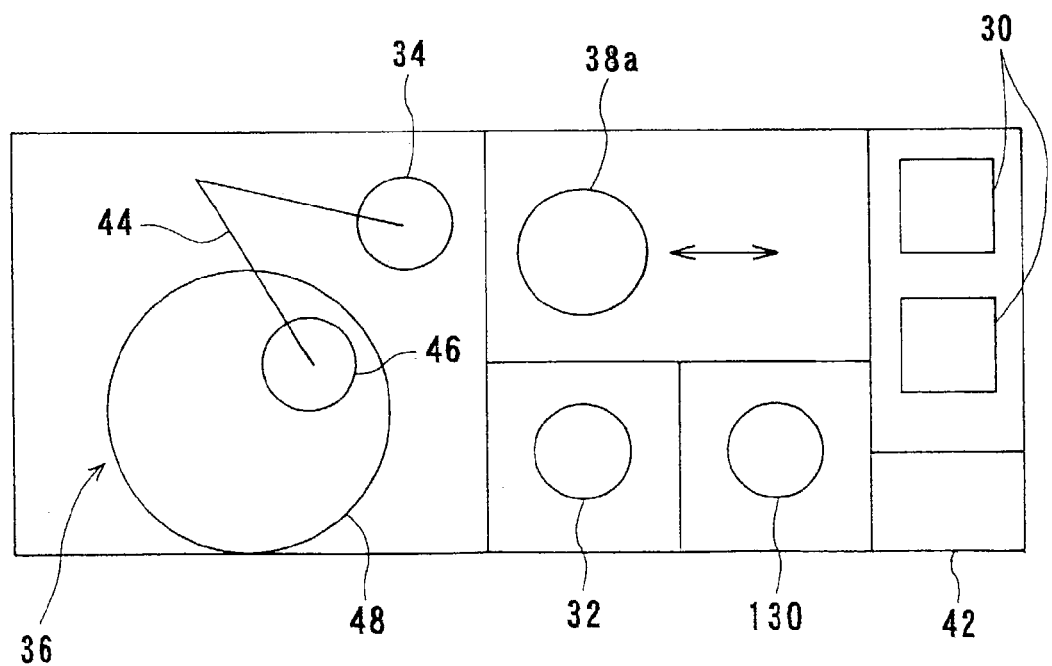
FIG. 33 is a plan view showing a layout of a substrate processing apparatus according to still another embodiment of the present invention.

FIG. 33 shows a substrate processing apparatus according to still another embodiment of the present invention provided with electrolytic processing device 36. This substrate processing apparatus comprises a pair of loading/unloading units 30 as a carry-in and carry-out section for carrying in and carrying out a cassette housing a substrate W, reversing machine 32, pusher 34 for transferring the substrate W, the electrolytic processing device 36, and a cleaning device 130 for cleaning and drying a processed substrate W. A movable transport robot 38a is provided in a region between the loading/unloading units 30, the reversing machine 32 and the pusher 34 as a transport device for transporting and transferring the substrate W therebetween. The substrate processing apparatus is also provided with monitor 42 for monitoring a voltage applied between processing electrode 50 and feeding electrode 52 upon electrolytic processing in the electrolytic processing device 36, or an electric current flowing therebetween.

According to this substrate processing apparatus, the substrate W having been carried in a dry state and undergone electrolytic processing in the electrolytic processing device 36 is reversed, according to necessity, and transported to the cleaning device 130 where the substrate is cleaned and dried, and the substrate can then be returned, in a dry state, to the cassette in the loading/unloading unit 30 (dry-in/dry-out).

Figure 34:
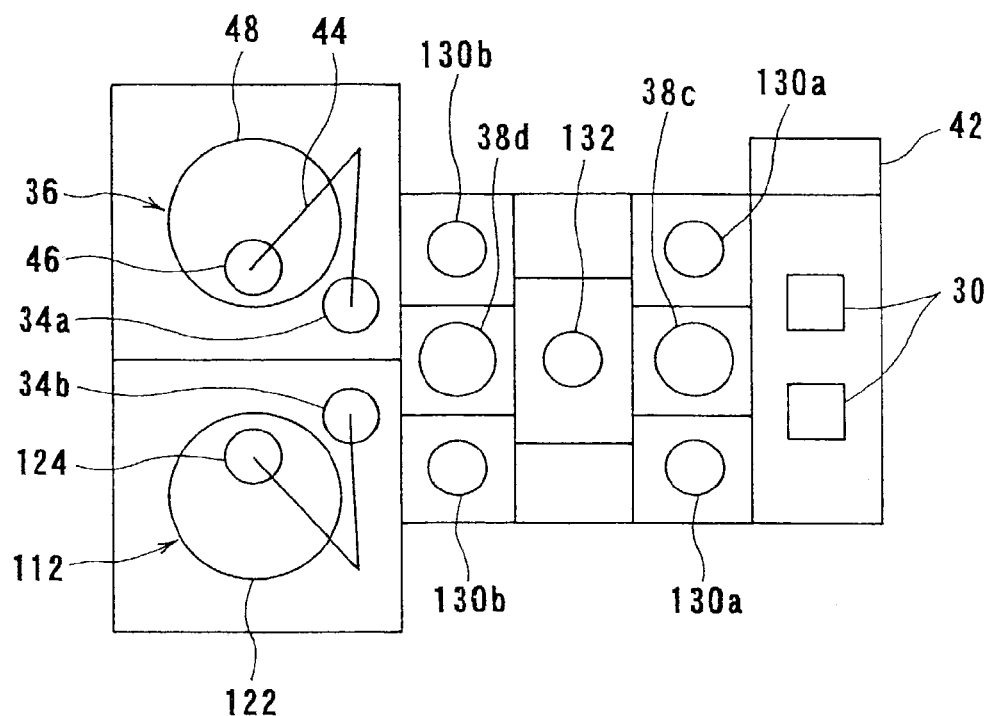
FIG. 34 is a plan view showing a layout of a substrate processing apparatus according to still another embodiment of the present invention.

FIG. 34 shows a substrate processing apparatus according to still another embodiment of the present invention provided with electrolytic processing device 36. This substrate processing apparatus comprises, as the same in the above-described embodiment shown in FIG. 31, a pair of loading/unloading units 30 as a carry-in and carry-out section for carrying in and carrying out a cassette housing a substrate W, pushers 34a and 34b, the electrolytic processing device 36 and CMP device 112, and further comprises a couple of first cleaning devices 130a and a couple of second cleaning devices 130b. Further, a temporary storage table 132 that has a function of traversing a substrate is provided between the first cleaning devices 130a and the second cleaning devices 130b. A first transport robot 38c is provided at a certain place between the loading/unloading units 30, the first cleaning devices 130a and the temporary storage table 132 as a transport device for transporting and transferring the substrate W therebetween; and a second transport robot 38d is provided at a certain place between the temporary storage table 132, the second cleaning devices 130b and the pushers 34a, 34b as a transport device for transporting and transferring the substrate W therebetween. The substrate processing apparatus is also provided with monitor 42 for monitoring a voltage applied between processing electrodes 50 and feeding electrodes 52 upon electrolytic processing in the electrolytic processing device 36.

According to this substrate processing apparatus, the substrate W which has undergone rough cutting, for example, by electrolytic processing in the electrolytic processing device 36 and finishing by CMP polishing in the CMP device 112, as in the above-described embodiment shown in FIG. 31, is transported to second cleaning device 130b for rough cleaning and is then temporarily stored on the temporary storage table 132 where the substrate is reversed, if necessary. Thereafter, the substrate W is transported to first cleaning device 130a for finish cleaning and drying, and then can be returned, in a dry state, to the cassette in the loading/unloading section 30.

Figure 35:
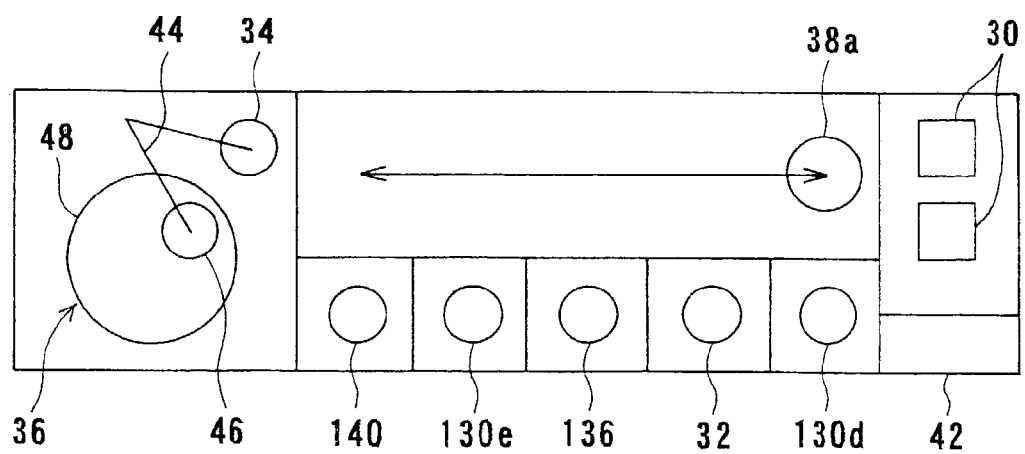
FIG. 35 is a plan view showing a layout of a substrate processing apparatus according to still another embodiment of the present invention.

FIG. 35 shows a substrate processing apparatus according to still another embodiment of the present invention provided with electrolytic processing device 36. This substrate processing apparatus comprises a pair of loading/unloading units 30 as a carry-in and carry-out section for carrying in and carrying out a cassette housing a substrate W, pusher 34, and the electrolytic processing device 36. The substrate processing apparatus also comprises a cleaning device 130d for cleaning a processed substrate, reversing machine 32, a plating device 136 for plating a surface of the substrate W, a cleaning device 130e for cleaning a plated substrate, and an annealing device 140 for annealing the plated substrate, which are disposed in series. A transport robot 38a as a transport device is provided which can move parallel to these devices for transporting and transferring the substrate W therebetween. The substrate processing apparatus is also provided with monitor 42 for monitoring a voltage applied between processing electrodes 50 and feeding electrodes 52 upon electrolytic processing in the electrolytic processing device 36.

Figure 36:
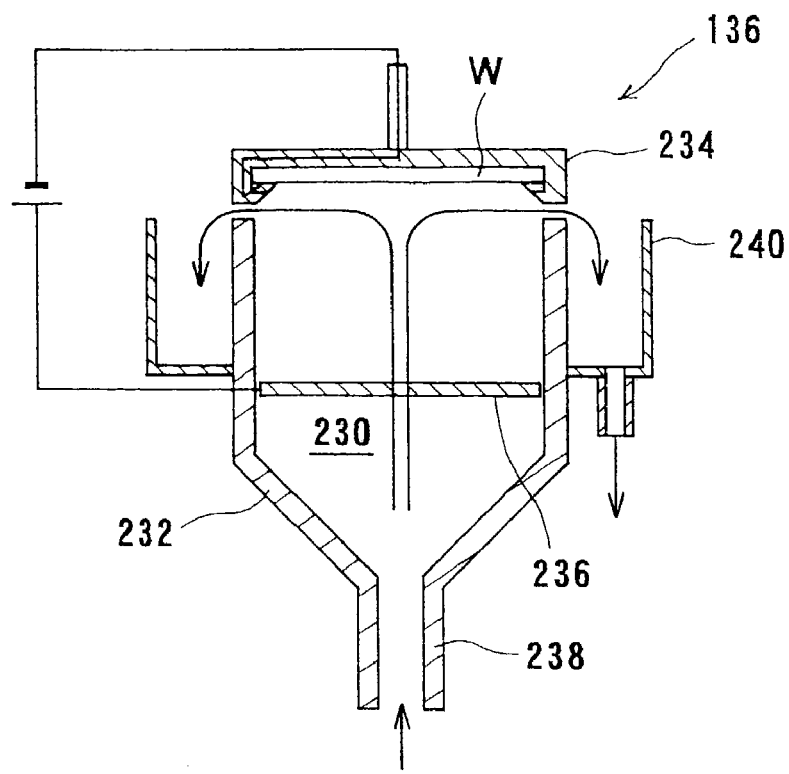
FIG. 36 is a schematic sectional view of a plating device.

FIG. 36 shows an example of the plating device 136. The plating device 136 includes a top-opened cylindrical plating tank 232 for containing a plating liquid 230, and a substrate holder 234 for detachably holding the substrate W with its front surface downward in such a position that the substrate W covers a top opening of the plating tank 232. Inside of the plating tank 232, an anode plate 236 in a flat plate shape, which becomes an anode electrode when immersed in the plating liquid 230 with the substrate as a cathode, is disposed horizontally. A central portion of a bottom of the plating tank 232 communicates with a plating liquid injecting pipe 238 for forming an injecting flow of the plating liquid upwardly. Further, a plating liquid receiver 240 is provided around an upper outer periphery of the plating tank 232.

In operation, the substrate W held with its front surface downward by the substrate holder 234 is positioned above the plating tank 232 and a given voltage is applied between the anode plate 236 (anode) and the substrate W (cathode) while the plating liquid 230 is injected upwardly from the plating liquid injecting pipe 238 so that an injecting flow of the plating liquid 230 hits against a lower surface (surface to be plated) of the substrate W, whereby a plating current is allowed to flow between the anode plate 236 and the substrate W, and a plated film is thus formed on the lower surface of the substrate W.

Figure 37:
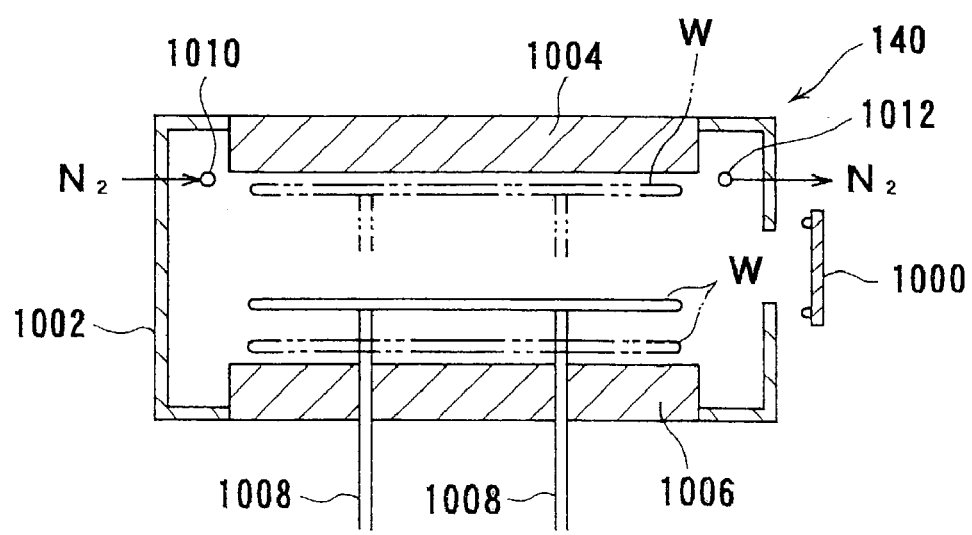
FIG. 37 is a vertical sectional view of an annealing device.
Figure 38:
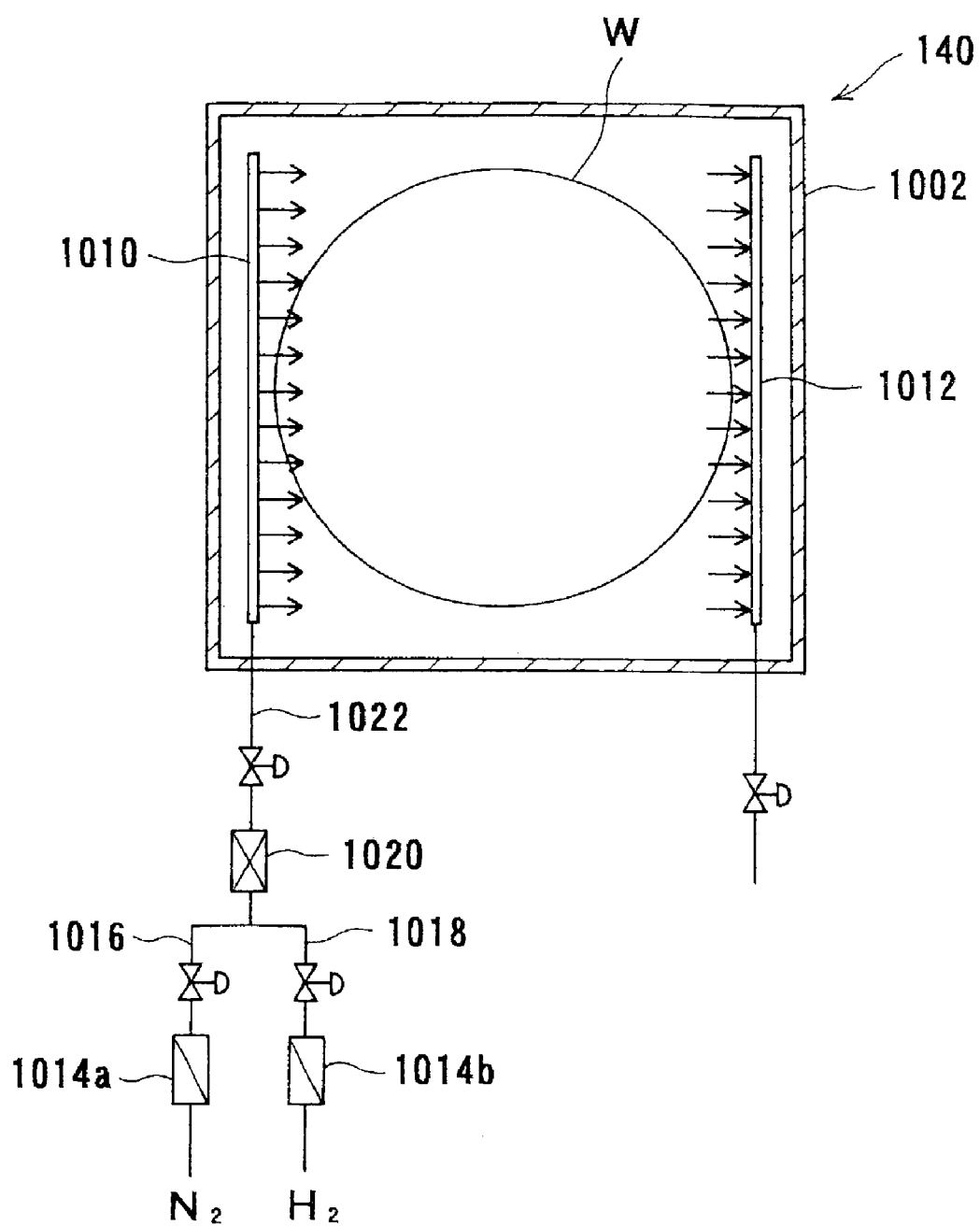
FIG. 38 is a horizontal sectional view of the annealing device.

FIGS. 37 and 38 show an example of the annealing device 140. The annealing device 140 comprises a chamber 1002 having a gate 1000 for carrying in and carrying out the substrate W, a hot plate 1004 disposed in the chamber 1002 for heating the substrate W to e.g. 400° C., and a cool plate 1006 disposed beneath the hot plate 1004 in the chamber 1002 for cooling the substrate W by, for example, flowing a cooling water inside the cool plate 1006. The annealing device 140 also has a plurality of vertically movable elevating pins 1008 penetrating the cool plate 1006 and extending upward and downward therefrom for placing and holding the substrate W on upper ends thereof. The annealing device 140 further includes a gas introduction pipe 1010 for introducing an antioxidant gas between the substrate W and the hot plate 1004 during annealing, and a gas discharge pipe 1012 for discharging the gas that has been introduced from the gas introduction pipe 1010 and flowed between the substrate W and the hot plate 1004. The pipes 1010 and 1012 are disposed on opposite sides across the hot plate 1004.

The gas introduction pipe 1010 is connected to a mixed gas introduction line 1022 which in turn is connected to a mixer 1020 where an $N_2$ gas introduced through an $N_2$ gas introduction line 1016 containing a filter 1014a, and an $H_2$ gas introduced through an $H_2$ gas introduction line 1018 containing a filter 1014b, are mixed to form a mixed gas which flows through the mixed gas introduction line 1022 into the gas introduction pipe 1010.

In operation, the substrate W, which has been carried in the chamber 1002 through the gate 1000, is held on the lifting pins 1008 and the lifting pins 1008 are raised up to a position at which a distance between the substrate W held on the lifting pins 1008 and the hot plate 1004 becomes e.g. 0.1–1.0 mm. The substrate W is then heated to e.g. 400° C. through the hot plate 1004 and, at the same time, the antioxidant gas is introduced from the gas introduction pipe 1010 and the gas is allowed to flow between the substrate W and the hot plate 1004 while the gas is discharged from the gas discharge pipe 1012, thereby annealing the substrate W while preventing its oxidation. This annealing treatment may be completed in about several tens of seconds to 60 seconds. A heating temperature of the substrate W may arbitrarily be selected in the range of 100–600° C.

After completion of annealing, the lifting pins 1008 are lowered down to a position at which a distance between the substrate W held on the lifting pins 1008 and the cool plate 1006 becomes e.g. 0–0.5 mm. By introducing a cooling water into the cool plate 1006, the substrate W is cooled by the cool plate 1006 to a temperature of 100° C. or lower in e.g. 10–60 seconds. This cooled substrate W is sent to a next step.

Though in this embodiment a mixed gas of $N_2$ gas with several % of $H_2$ gas is used as the above antioxidant gas, $N_2$ gas may be used singly.

According to the substrate processing apparatus of this embodiment, a substrate W, for example, having a seed layer 7 formed in a surface (see FIG. 85A) is taken, one at a time, by the transport robot 38*a* out of a cassette set in the loading/unloading section 30 and, after reversing the substrate W by the reversing machine 32 according to necessity, is carried into the plating device 136. Electrolytic copper plating, for example, is performed in the plating device 136 to form a copper film 6 (see FIG. 85B) as a conductor film (portion to be processed) on the surface of the substrate W. The substrate W after this plating treatment (the substrate having a conductor film such as the copper film) is transported to the cleaning device 130*e* for cleaning and drying, and is then transported to the annealing device 140, where the substrate W is annealed by heat treatment, and this annealed substrate is transported to the electrolytic processing device 36. Electrolytic processing of the surface (plated surface) of the substrate W is conducted in the electrolytic processing device 36 to remove unnecessary copper film 6 formed in the surface of the substrate, thereby forming copper interconnects composed of copper film 6 (see FIG. 85C). The substrate W after this electrolytic processing is reversed by the reversing machine 32, according to necessity, and is transported to the cleaning device 130*d* for cleaning and drying. Cleaned substrate W is reversed by the reversing machine 32, according to necessity, and returned to the cassette in the loading/unloading unit 30.

Figure 39:
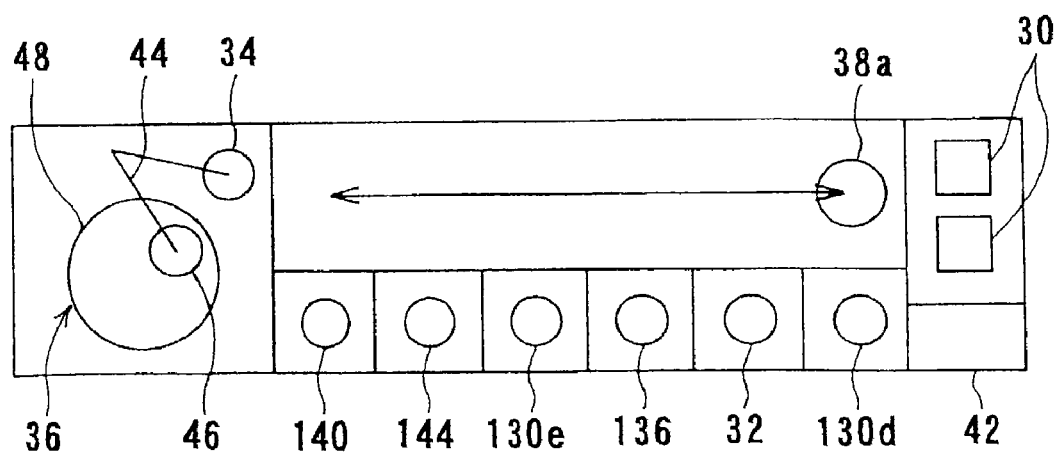
FIG. 39 is a plan view showing a layout of a substrate processing apparatus according to still another embodiment of the present invention in which a bevel-etching device is incorporated.

FIG. 39 shows a substrate processing apparatus according to still another embodiment of the present invention provided with electrolytic processing device 36. According to this embodiment, between cleaning device 130*e* and annealing device 140, both used also in the above-described embodiment shown in FIG. 35, is provided a bevel-etching device 144 for removing a material, to be processed, formed in or adhering to a peripheral portion (bevel portion and edge portion) of a substrate. Other construction is the same as in the embodiment shown in FIG. 35.

Figure 40:
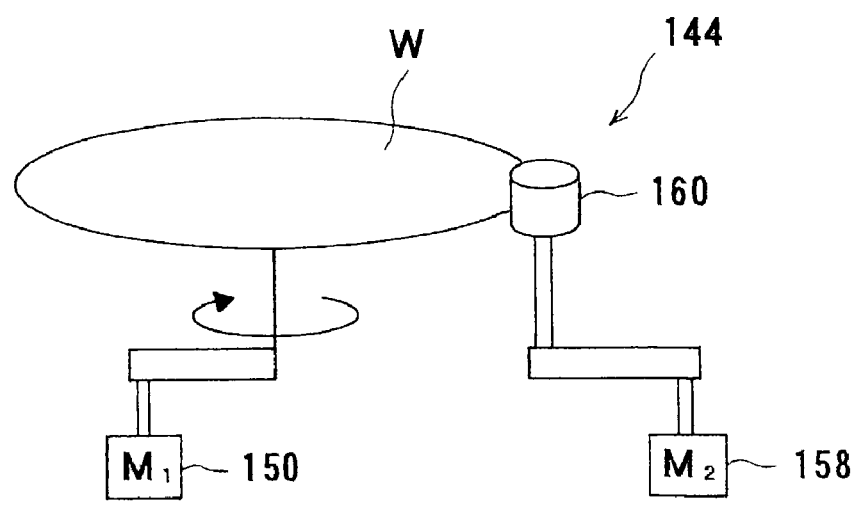
FIG. 40 is a schematic view of an electrolytic processing device according to still another embodiment of the present invention, which is utilized as a bevel-etching device.

FIGS. 40 and 41 show an example of the bevel-etching device 144. The bevel-etching device 144 comprises a substrate holder 152 which attracts and holds substrate W with its front surface upward and rotates by actuation of a motor 150, a feeding electrode 156 which is connected to an anode of a power source 154, and contacts a conductor film (portion to be processed) such as the copper film 6 formed in the surface of the substrate W to pass electricity thereto, and a column-shaped processing electrode 160 which is connected to a cathode of the power source 154, and rotates by actuation of a motor 158. The processing electrode 160 is disposed beside the substrate W held by the substrate holder 152, and can contact and be removed from the substrate W. Further, a groove 160*a* generally in the shape of a half circle in cross section, conforming to a peripheral configuration of the substrate W, is formed in the processing electrode 160, and an ion exchanger 162, as described above, is mounted on a surface of the groove 160*a* so that a surface of the ion exchanger 162 contacts or gets close to a peripheral portion of the substrate W. Furthermore, a pure water nozzle 164 is disposed near the processing electrode 160 as a pure water supply section for supplying pure water or ultrapure water between the processing electrode 160 and the peripheral portion of the substrate W.

Removal by electrolytic processing of a material to be processed, such as copper, formed in or adhering to the peripheral portion (bevel portion and edge portion) of the substrate W is effected by bringing the ion exchanger 162 mounted on the processing electrode 160 into contact with or close to the peripheral portion of the substrate W held by the substrate holder 152, and rotating the substrate holder 152 to thereby rotate the substrate W and, at the same time, rotating the processing electrode 160, while supplying pure water or ultrapure water from the pure water nozzle 164 between the processing electrode 160 and the peripheral portion of the substrate W, and applying a given voltage between the processing electrode 160 and the feeding electrode 156.

According to this substrate processing apparatus, immediately after a plating treatment is conducted on the surface of the substrate W in the plating device 136, material, to be processed, such as copper formed in or adhering to the peripheral portion (bevel portion and edge portion) of the substrate W, in which a conductor film (portion to be processed) such as the copper film 6 (see FIG. 85B) has been formed, can be removed in the bevel-etching device 144, and this bevel-etched substrate W can then be transported to the electrolytic processing device 36.

Figure 43:
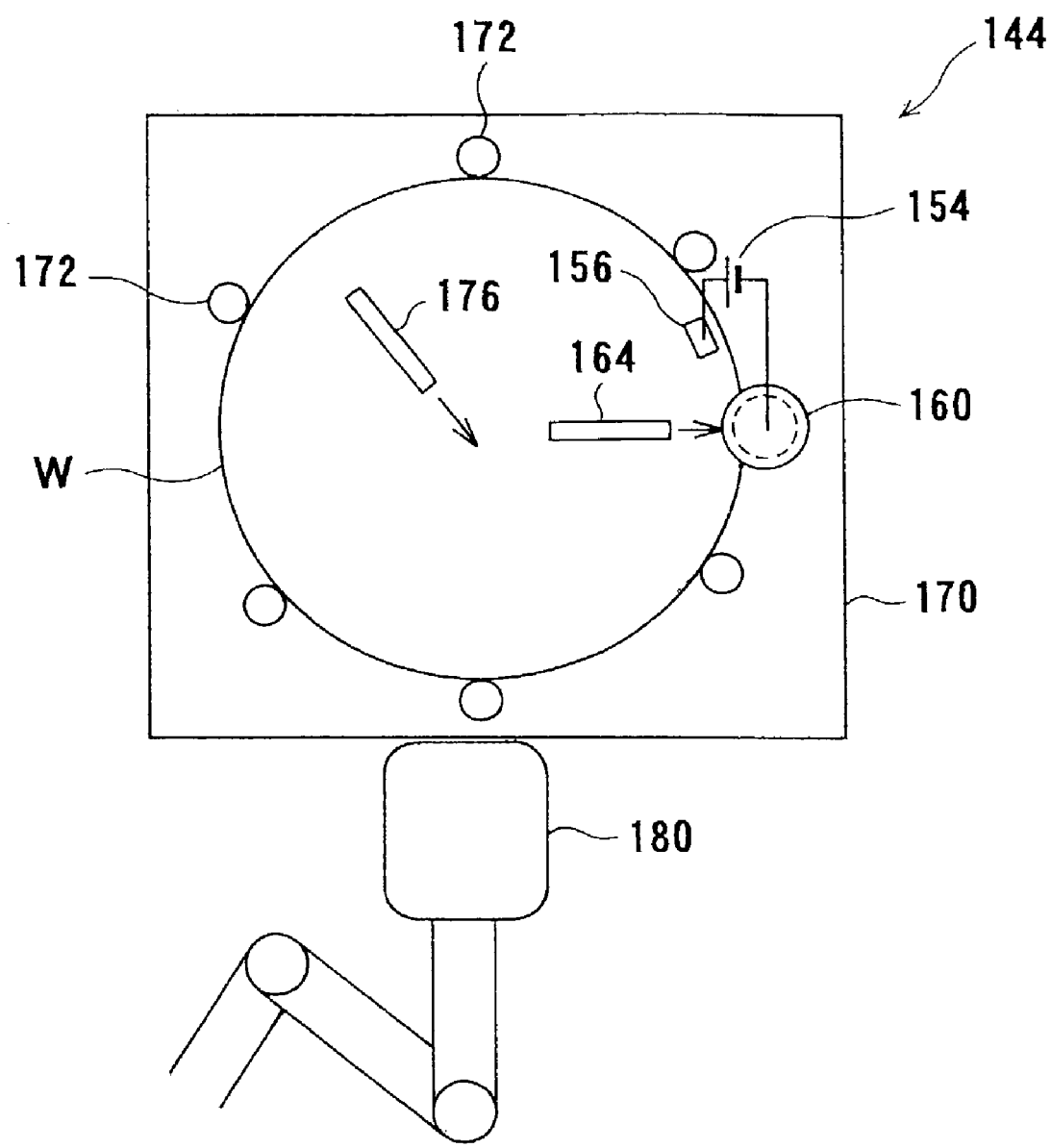
FIG. 43 is a plan view of the bevel-etching device of FIG. 42.

FIGS. 42 and 43 show another example of the bevel-etching device 144, which can remove by electrolytic processing a material, to be processed, such as copper formed in or adhering to a peripheral portion (bevel portion and edge portion) of the substrate W and, at the same time, can rinse (clean) front and back surfaces of the substrate W with pure water. This bevel-etching device 144 comprises a bottomed, cylindrical waterproof cover 170 having a drain 170*a* and, provided in its interior with a substrate holder 174 for holding the substrate W by spin chucks 172 which engage the substrate W at certain points in a peripheral region of the substrate and rotating the substrate W horizontally with its front surface upward, a front surface nozzle 176 which is oriented towards almost a center of the front surface of the substrate W held by the substrate holder 174, and a back surface nozzle 178 which is oriented towards almost a center of the back surface of the substrate W. According to this embodiment, the substrate holder 174 is connected directly to motor 150, and processing electrode 160 is connected directly to motor 158. Further, the substrate W is loaded and unloaded by a substrate transport arm 180. Other construction is the same as in the above-described embodiment shown in FIGS. 40 and 41.

According to this embodiment, removal by electrolytic processing of a material, to be processed, such as copper formed in or adhering to a peripheral portion (bevel portion and edge portion) of the substrate W is effected by rotating the substrate holder 174 to thereby rotate the substrate W and, at the same, rotating the processing electrode 160, while supplying pure water or ultrapure water from the pure water nozzle 164 between the processing electrode 160 and the peripheral portion of the substrate W, and applying a given voltage between the processing electrode 160 and the feeding electrode 156; and simultaneously therewith, rinsing (cleaning) of the front and back surfaces of the substrate W can be conducted by supplying pure water from the front surface nozzle 176 to the front surface of the substrate, and from the back surface nozzle 178 to the back surface.

Figure 44:
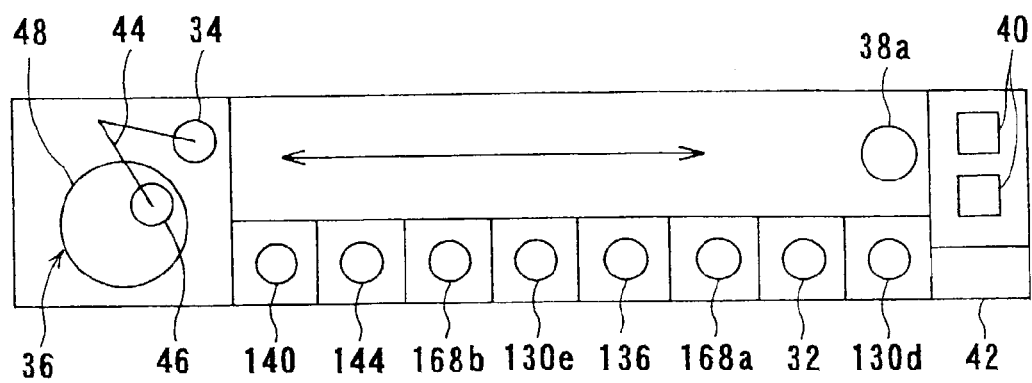
FIG. 44 is a plan view showing a layout of a substrate processing apparatus according to still another embodiment of the present invention.

FIG. 44 shows a substrate processing apparatus according to still another embodiment of the present invention provided with electrolytic processing device 36. In this substrate processing apparatus, a first film thickness-measuring section 168*a* for measuring a film thickness of a conductor film (portion to be processed) after processing is provided between reversing machine 32 and plating device 136, both used also in the embodiment shown in FIG. 39, and a second film thickness-measuring section 168b for measuring a film thickness of the conductor film (portion to be processed) such as copper film 6 (see FIG. 85B) after plating is provided between cleaning device 130e and bevel-etching device 144. Other construction is the same as shown in FIG. 39.

According to this substrate processing apparatus, a film thickness of a conductor film such as the copper film 6 (see FIG. 85B), which has been deposited on a surface of substrate W by a plating treatment in the plating device 136, is measured with the second film thickness-measuring section 168b, and a film thickness of the conductor film after electrolytic processing in the electrolytic processing device 36 is measured with the first film thickness-measuring section 168a. By feeding back results of these measurements, it becomes possible to adjust a plating time and processing time, or conduct an additional plating or electrolytic processing, whereby the film thickness of the conductor film such as copper film 6 can be made more uniform.

Figure 45:
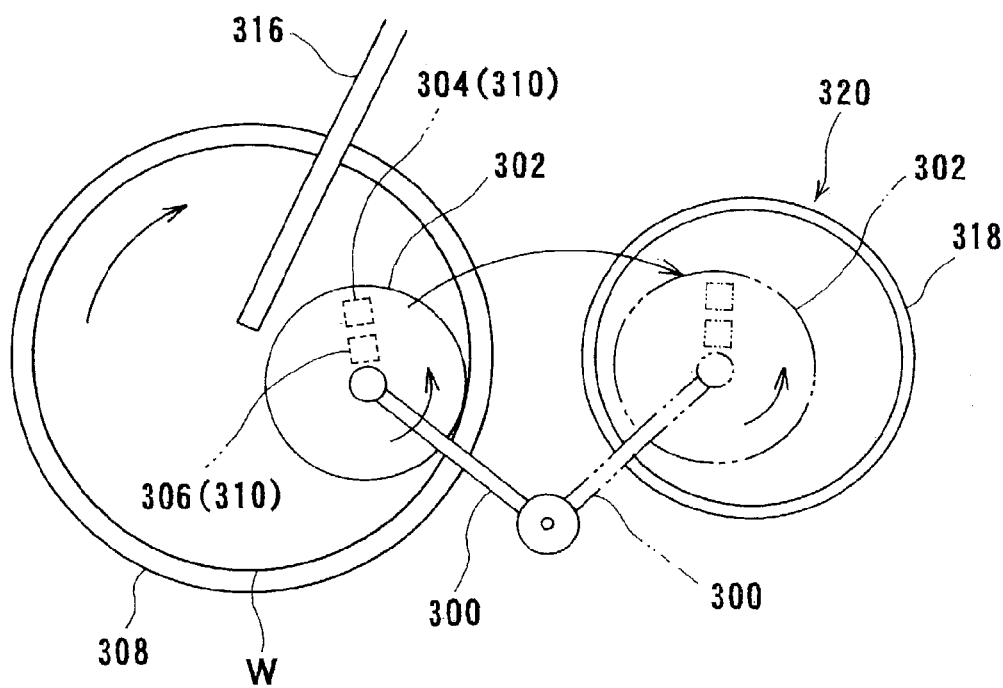
FIG. 45 is a schematic plan view of an electrolytic processing device according to still another embodiment of the present invention.
Figure 46:
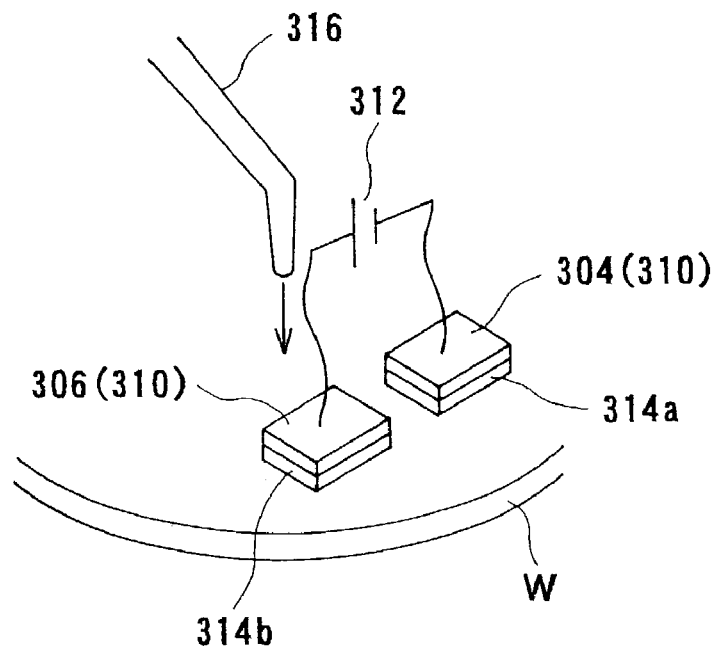
FIG. 46 is a schematic perspective view showing a processing electrode and a feeding electrode of the electrolytic processing device of FIG. 45.
Figure 47:
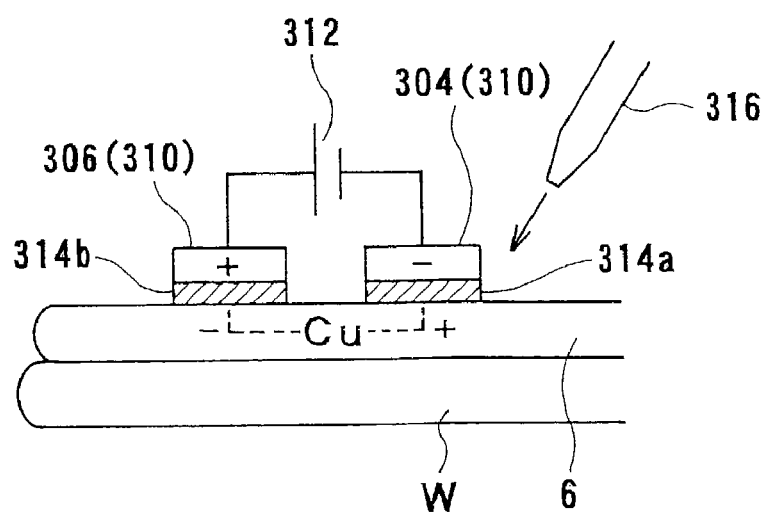
FIG. 47 is a schematic front view showing the processing electrode and the feeding electrode of the electrolytic processing device of FIG. 45.

FIGS. 45 through 47 show an electrolytic processing device according to still another embodiment of the present invention. In this electrolytic processing device, an electrode section 302 is rotatably held to an end of a swingable arm 300 which is swingable and vertically movable. Electrolytic processing of a surface of a substrate W, which is held on an upper surface of a substrate holder 308, is effected by a processing electrode 304 and a feeding electrode 306, both disposed inside the electrode section 302. Also in this embodiment, a workpiece to be processed is of course not limited to a substrate.

In this electrolytic processing device, a pair of electrodes 310, both in the shape of a rectangular flat plate, is fixed in the electrode section 302 so that the electrodes 310 face, in parallel, the substrate W held by the substrate holder 308. One electrode plate 310 connected to a cathode of a power source 312 becomes the processing electrode 304, and the other electrode plate 310 connected to an anode of the power source becomes the feeding electrode 306. This applies to processing of e.g. copper, because electrolytic processing of copper proceeds on a cathode side. As described above, depending upon a material to be processed, the cathode side can be a feeding electrode and an anode side can be a processing electrode. Surfaces of the processing electrode (cathode) 304 and the feeding electrode (anode) 306 are respectively covered with an ion exchanger 314a, 314b both as described above. Further, a pure water nozzle 316 is provided as a liquid supply section for supplying pure water or ultrapure water between the substrate W held by the substrate holder 308 and the processing and feeding electrodes 304, 306.

According to this embodiment, the ion exchanger 314a on a processing electrode side and the ion exchanger 314b on a feeding electrode side are spaced, and contact the substrate W respectively. By thus disposing the ion exchangers 314a, 314b separately in a space between the processing electrode 304 and the substrate (workpiece) W and between the feeding electrode 306 and the substrate (workpiece) W, and using ultrapure water as a processing liquid, processing efficiency can be best enhanced.

In this connection, when an ion exchanger of an integral type, i.e. a processing electrode 304 and a feeding electrode 306 are mounted to one ion exchanger, is used in electrolytic processing, a so-called short (virtually a flow of ions) between the processing electrode 304 and the feeding electrode 306 will occur, resulting in a decrease in an amount of ions that act on the surface of a workpiece, thereby lowering processing efficiency. In using such an integral type of ion exchanger, the "short" may be reduced by making a distance between the processing electrode and the feeding electrode larger. However, a portion of the ion exchanger not participating in processing becomes larger, whereby a uniform processing rate over an entire processing surface area is obtained with difficulty.

Figure 48A:
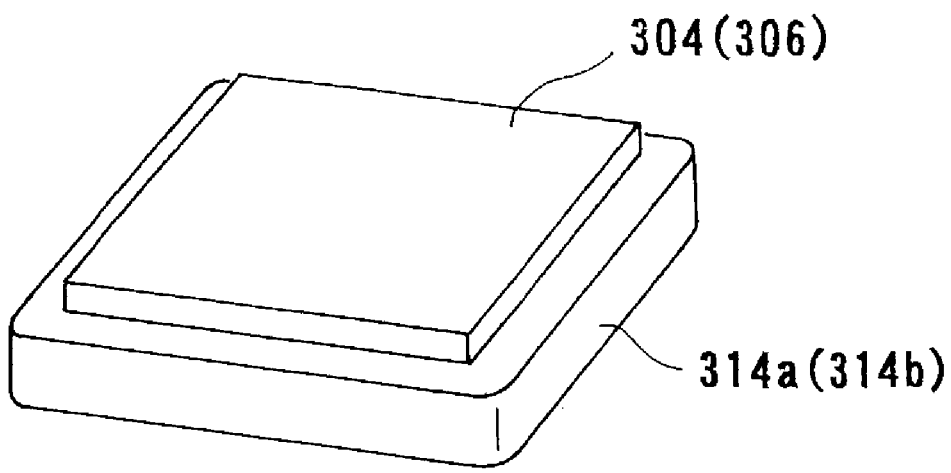
FIGS. 48A and 48B are respectively perspective and front views illustrating a case of mounting an ion exchanger on a rectangular electrode.
Figure 48B:
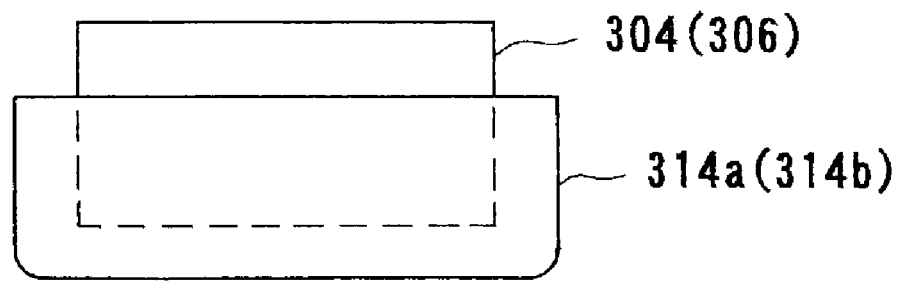
Figure 49A:
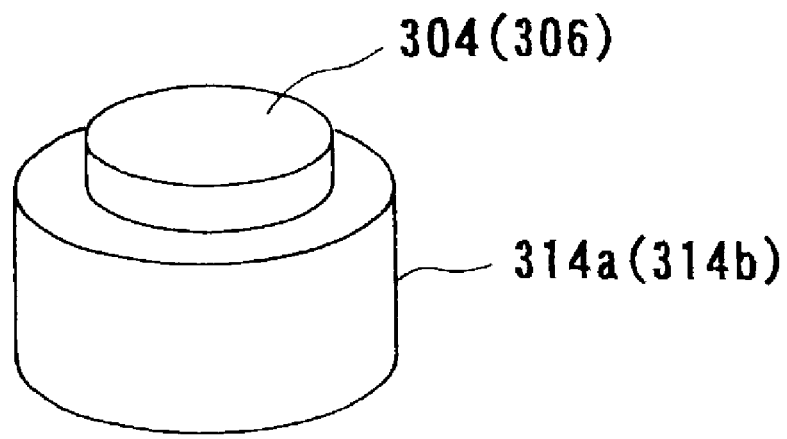
FIGS. 49A and 49B are respectively perspective and front views illustrating a case of mounting an ion exchanger on a column-shaped electrode.
Figure 49B:
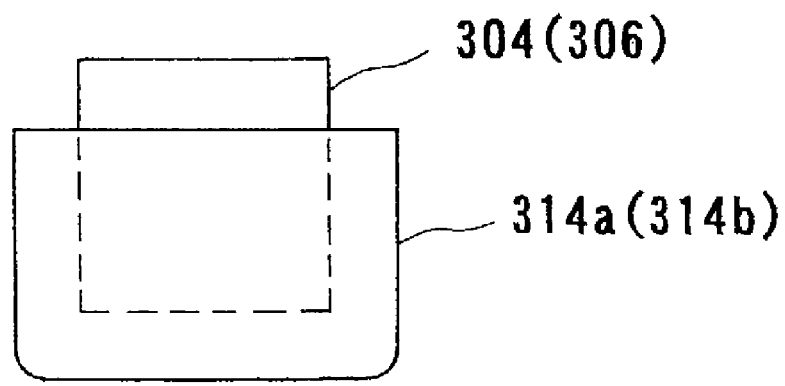

A base material of the ion exchangers 314a, 314b may be a nonwoven fabric, a woven fabric, a sheet or a porous material. As shown in FIGS. 48A and 48B, the ion exchanger 314a or the ion exchanger 314b may be mounted on the rectangular processing electrode 304 or feeding electrode 306 by wrapping the ion exchanger around a lower portion of the electrode. Also in a case where the processing electrode 304 and feeding electrode 306 are in a column shape, as shown in FIG. 49, the ion exchangers 314a, 314b, which are composed of e.g. a nonwoven fabric, a woven fabric, a sheet or a porous material, may be each mounted on respective electrodes by wrapping the ion exchanger around the electrode.

It is preferred to supply ultrapure water from the pure water nozzle 316 rather than pure water. Further, as described above, use may be made of an electrolytic solution obtained by adding an electrolyte to pure water or ultrapure water, or a liquid having an electric conductivity of not more than 500 μS/cm obtained by adding an additive such as a surfactant to pure water or ultrapure water.

According to this embodiment, a substrate W, e.g. a substrate having on its surface a conductor film (portion to be processed) such as the copper film 6 shown in FIG. 85B, is held with its front surface upward by the substrate holder 308, and the ion exchangers 314a, 314b, respectively covering the surface of the processing electrode 304 and the surface of the feeding electrode 306 of the electrode section 302, are brought into contact with or close to the surface of the substrate W. While rotating the substrate W via the substrate holder 308 and, at the same time, rotating the electrode section 302, pure water or ultrapure water is supplied between the substrate W and the processing and feeding electrodes 304, 306, and a given voltage is applied between the processing electrode 304 and the feeding electrode 306, thereby conducting electrolytic processing of the conductor film such as copper film 6 just under the processing electrode (cathode) 304.

In the electrolytic processing device of this embodiment, as in the above-described embodiment shown in FIGS. 28 and 29, a regeneration section 320 is provided beside the substrate holder 308, which includes a regeneration tank 318 filled with e.g. a dilute acid solution, and regenerates the ion exchangers 314a, 314b mounted on a lower surface of the electrode section 302 such that they respectively cover the surface of the processing electrode 304 and the surface of the feeding electrode 306.

As shown in FIG. 50, it is possible to adhere or laminate porous bodies 322a, 322b, which are in the form of e.g. a film and excellent in terms of flatness, to respective surfaces (lower surfaces) of the ion exchangers 314a, 314b. A woven fabric may be used instead of the porous bodies 322a, 322b. Lamination of such a material can further enhance flatness of a processed surface of the substrate W. The porous bodies 322a, 322b and the woven fabric may be ion exchangers.

As shown in FIG. 51, it is possible to conduct electrolytic processing by bringing processing electrode 304 and the feeding electrode 306, which are not covered with the ion exchangers 314a, 314b, close to the substrate W, and supplying pure water or ultrapure water, or a liquid having an electric conductivity of not more than 500 μS/cm between the processing and feeding electrodes 304, 306 and the substrate W.

Figure 52:
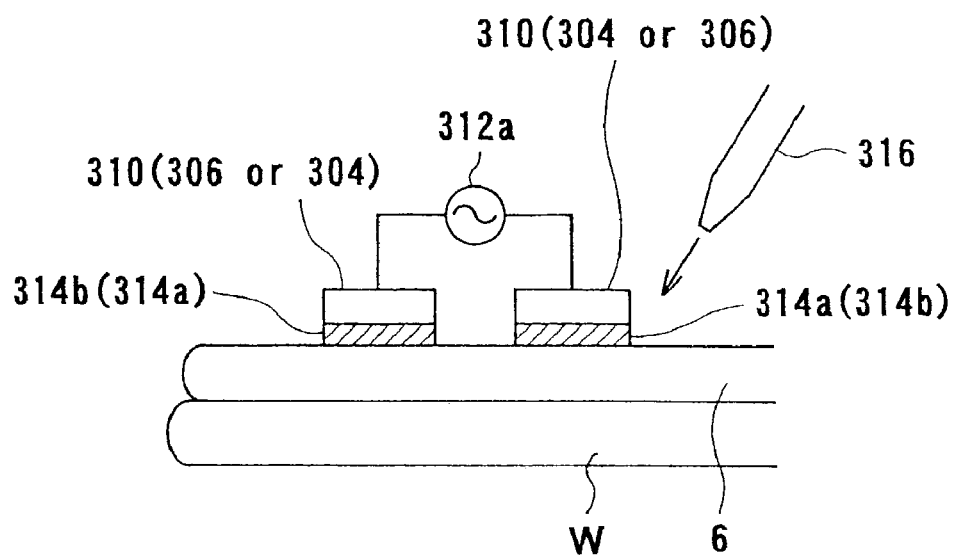
FIG. 52 is a schematic front view of still other processing and feeding electrodes.
Figure 53:
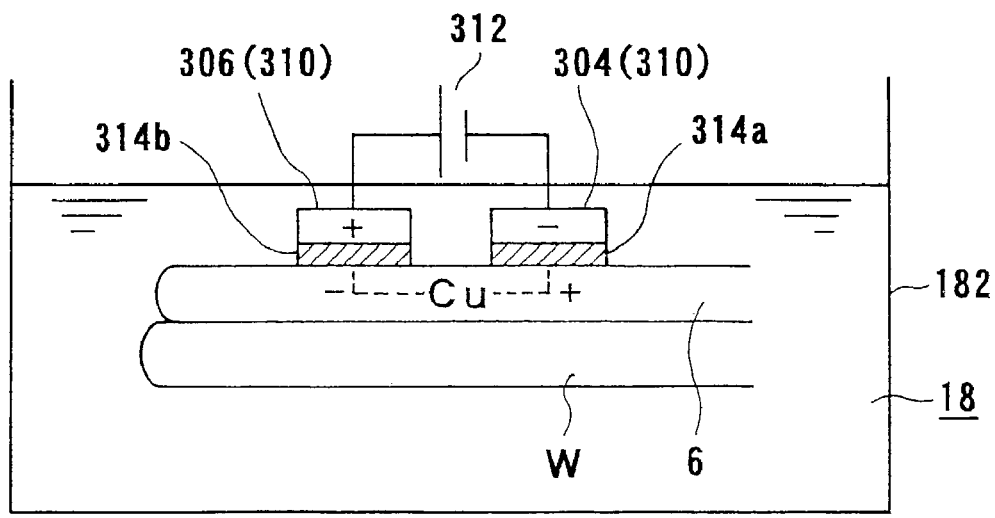
FIG. 53 is a schematic front view of still other processing and feeding electrodes.

Further, as shown in FIG. 52, it is possible to use an AC power source 312*a* so that the pair of the electrode plates 310 can alternate between the processing electrode 304 and the feeding electrode 306. Moreover, as shown in FIG. 53, it is possible to conduct electrolytic processing of a conductor film by filling a water tank 182 with a liquid 18 such as pure water or ultrapure water, immersing a substrate W, e.g. a substrate having on its surface a conductor film such as the copper film 6 shown in FIG. 85B, with its front surface upward, in the liquid 18, and bringing the processing electrode 304 and the feeding electrode 306 close to the substrate W.

Figure 54A:
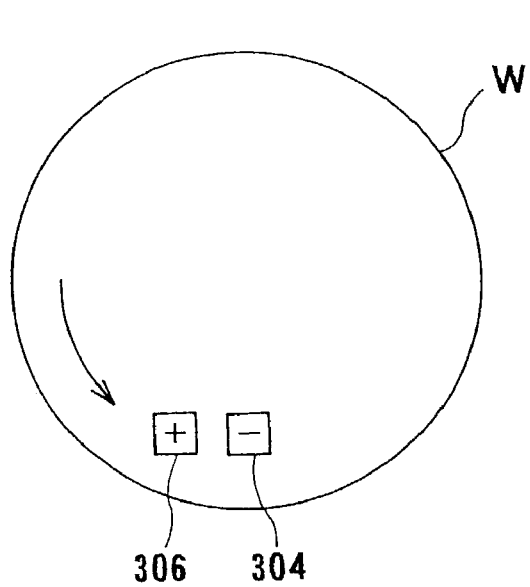
FIGS. 54A and 54B are diagrams illustrating different arrangements of processing and feeding electrodes relative to a substrate.
Figure 54B:
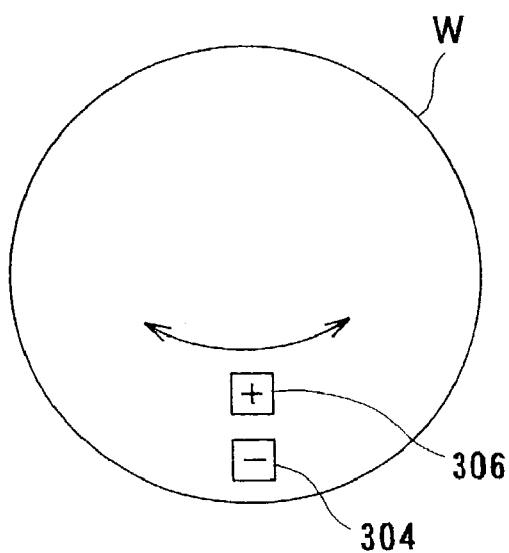

As described above, in the electrolytic processing of copper, for example, processing proceeds on a surface (lower surface) of the processing electrode 304 as a cathode. Accordingly, when the processing electrode (cathode) 304 and the feeding electrode (anode) 306 are disposed in a chord direction of the substrate W, as shown in FIG. 54A, and the substrate W is rotated, it is necessary to locate the feeding electrode (anode) 306 on an upstream side in a rotating direction of the substrate. This is because if a portion of the substrate surface facing the processing electrode (cathode) 304 is electrolytically processed to remove the conductor film, it becomes impossible to supply electricity from the feeding electrode 306. It will be understood that there is no such restriction in a case of disposing the processing electrode (cathode) 304 and the feeding electrode (anode) 306 in a radial direction of the substrate as shown in FIG. 54B, and in a case of using an AC power source as shown in FIG. 52.

Figure 55:
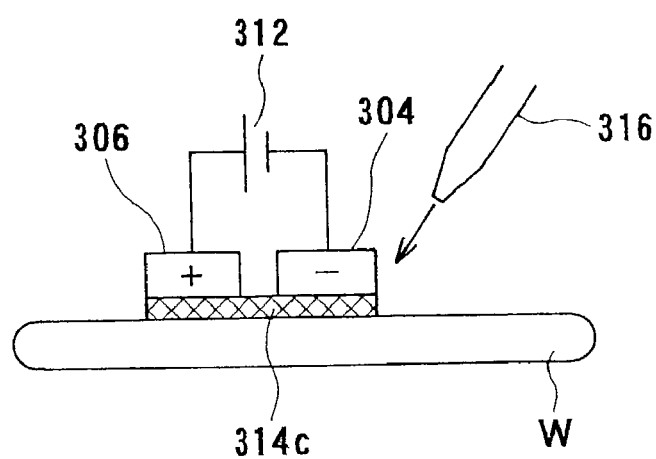
FIG. 55 is a schematic front view of another processing electrode, feeding electrode and ion exchanger.

As shown in FIG. 55, it is possible to integrally cover the surface of the processing electrode 304 and the surface of the feeding electrode 306 with one ion exchanger 314*c*. This can facilitate production of the processing electrode 304 and the feeding electrode 306, and can further lower electric resistance.

Figure 56:
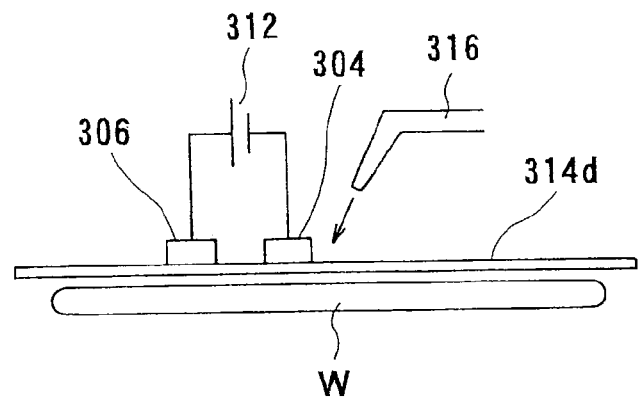
FIG. 56 is a schematic front view of still another processing electrode, feeding electrode and ion exchanger.

Alternatively, electrolytic processing may be performed by disposing an ion exchanger 314*d* above a substrate W such that it covers an entire surface of the substrate W, as shown in FIG. 56, and either supplying pure water or ultrapure water from pure water nozzle 316 to the ion exchanger 314*d* so as to impregnate the ion exchanger 314*d* with pure water or ultrapure water, or continuously immerse the ion exchanger 314*d* in pure water or ultrapure water, and placing processing electrode 304 and feeding electrode 306 on an upper surface of the ion exchanger 314*d*. This makes it possible to change with ease the ion exchanger 314*d* when it is stained after electrolytic processing. Though not shown, it is also possible to dispose an ion exchanger so that it covers part of the surface of the substrate, and place the processing electrode 304 and the feeding electrode 306 on an upper surface of the ion exchanger.

Figure 57:
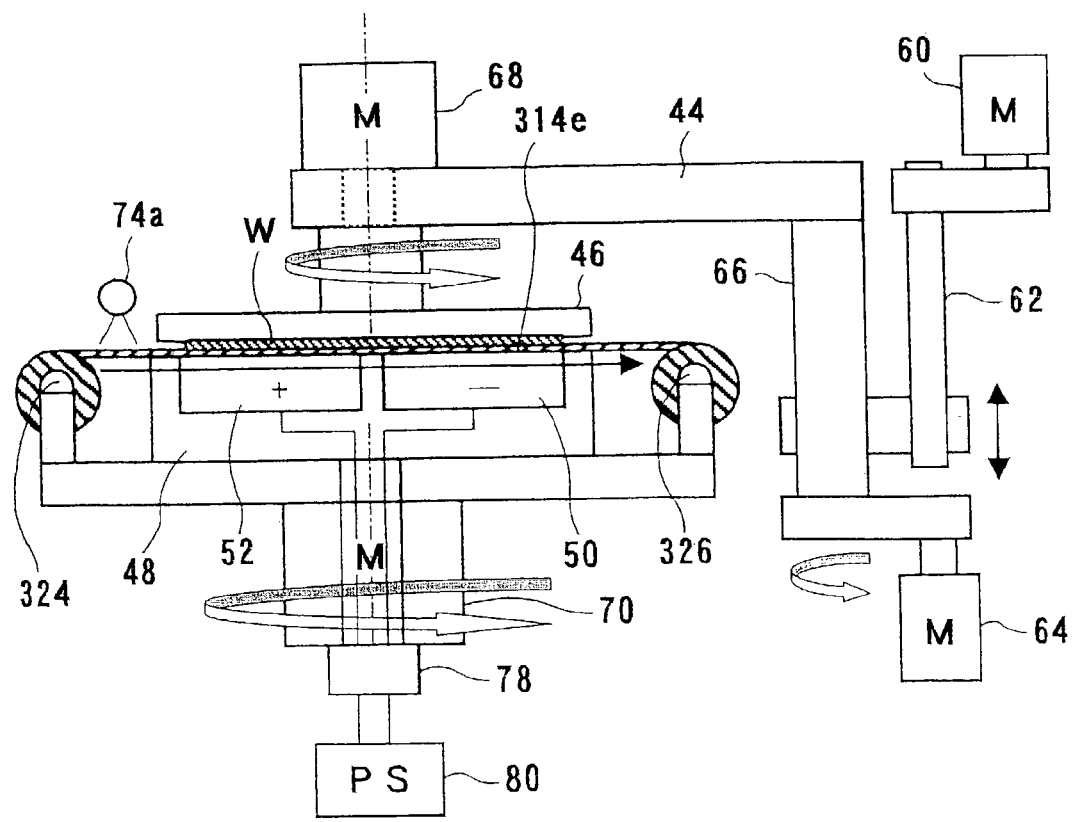
FIG. 57 is a cross-sectional view of an electrolytic processing device according to still another embodiment of the present invention.
Figure 58:
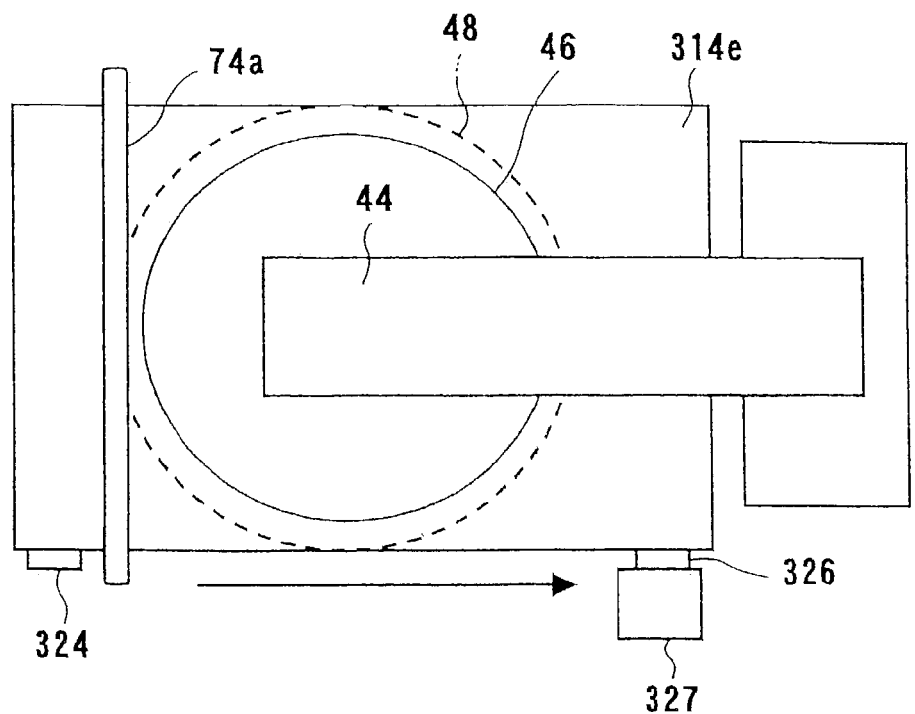
FIG. 58 is a plan view of the electrolytic processing device of FIG. 57.

In this case, as shown in FIGS. 57 and 58, it is possible to stretch a long sheet form of an ion exchanger 314*e* between a supply shaft 324 and a rewind shaft 326, both disposed on opposite sides across substrate holder 308, and rewind the ion exchanger 314*e* sequentially by rotating the rewind shaft 326 through a rewind motor 327. This makes it possible to change the ion exchanger in a successive manner. This embodiment shows a case in which an electrolytic processing device having a similar construction to that of FIG. 5, but substrate holder 46 and electrode section 48 having substantially the same diameter, is used and a pure water nozzle 74*a*, extending in a width direction of the ion exchanger 314*e*, over an entire length thereof, is disposed upstream of the electrode section 48 in a flow direction of the ion exchanger 314*e*. In this embodiment shown in FIGS. 57 and 58, the ion exchanger 314*e* may be taken up intermittently at a low speed. Alternatively, it is possible to fix the ion exchanger 314*e* to the electrode section 48 during processing, and rewind the ion exchanger by a given length when it is worn or when impurities accumulate on it, thereby providing a fresh processing surface.

Figure 59:
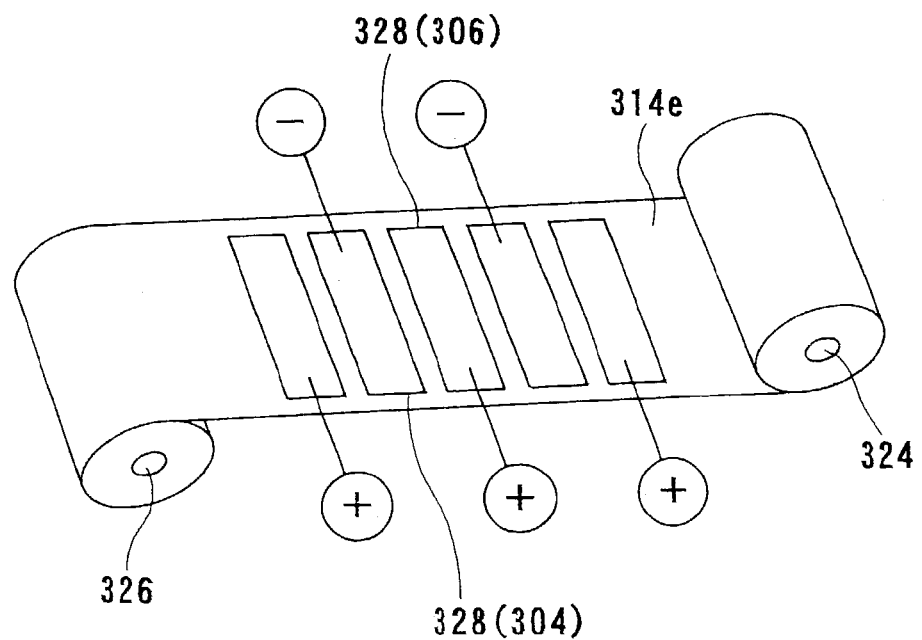
FIG. 59 is a perspective view of still another ion exchanger.
Figure 60:
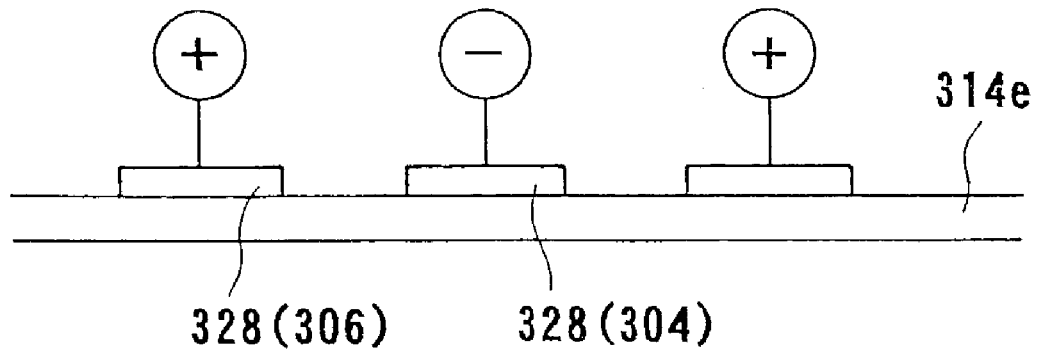
FIG. 60 is a front view of the ion exchanger of FIG. 59.

Further, as shown in FIGS. 59 and 60, it is possible to mount rectangular electrode portions 328 on the ion exchanger 314*e* of a long sheet form by printing or lamination at a given pitch in a length direction of the ion exchanger so that when the ion exchanger 314*e* is taken up by one-time use length, one of two adjacent electrode portions 328 may be connected to the cathode of the power source 312 (see FIG. 55) to become processing electrode 304, and the other one may be connected to the anode to become feeding electrode 306. This eliminates a need to provide electrode sections separately, and thus can simplify the device.

Figure 61A:
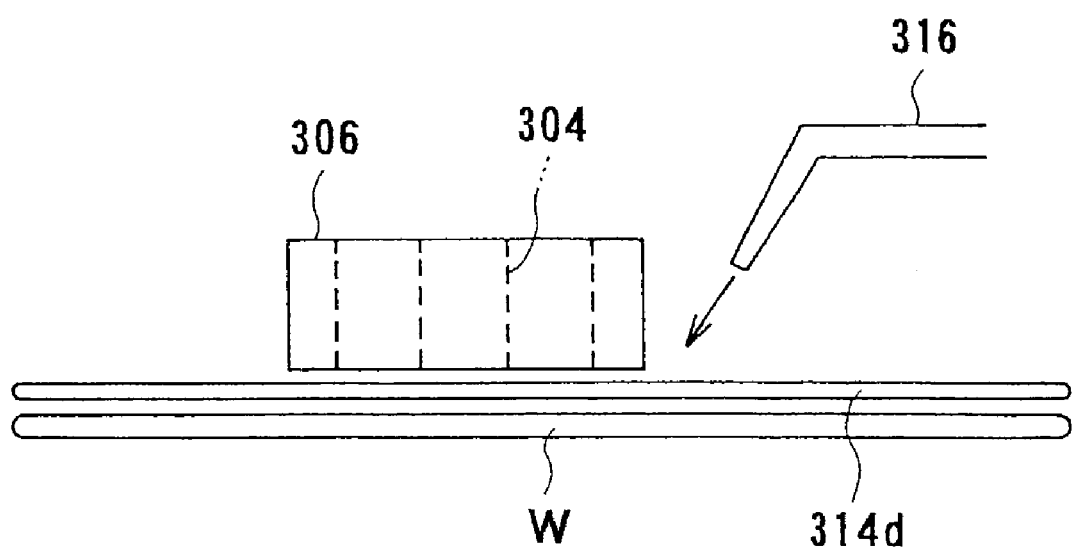
FIGS. 61A and 61B are respectively front and perspective views showing still another arrangement of processing and feeding electrodes.
Figure 61B:
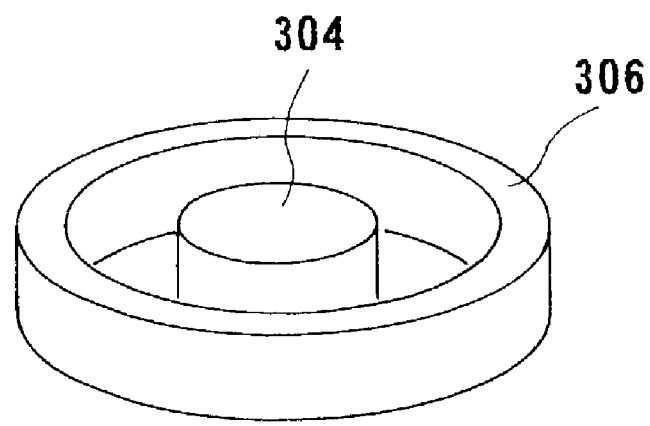

Further, as shown in FIGS. 61A and 61B, the processing electrode 304 may be in the shape of a column, and may be surrounded by a ring-shaped feeding electrode 306. In a case of copper, for example, electrolytic processing thereof proceeds just under a cathode. Accordingly, it is preferred to dispose the processing electrode 304 and the feeding electrode 306 so that electric current can flow between the electrodes 304, 306 through a shortest route. By disposing the electrodes such that the feeding electrode 306 surrounds the processing electrode 304, all the electric currents can flow from the feeding electrode 306 to the processing electrode 304 through shortest routes, whereby current efficiency can be enhanced and power consumption can be reduced. Further, though not shown, it is also possible to surround a column-shaped feeding electrode with a ring-shaped processing electrode. This holds also for the below-described embodiments.

Figure 62:
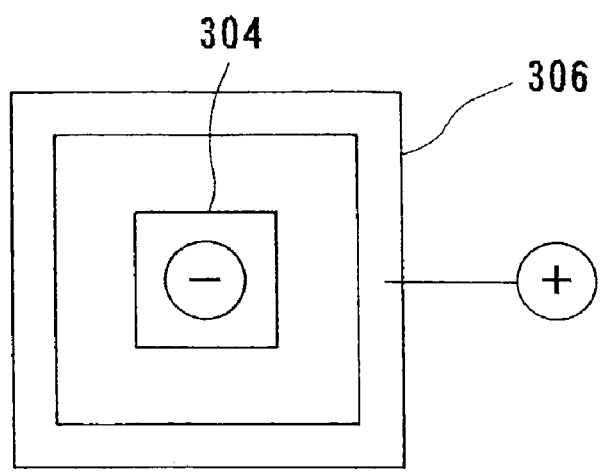
FIG. 62 is a plan view showing still another arrangement of processing and feeding electrodes.
Figure 63:
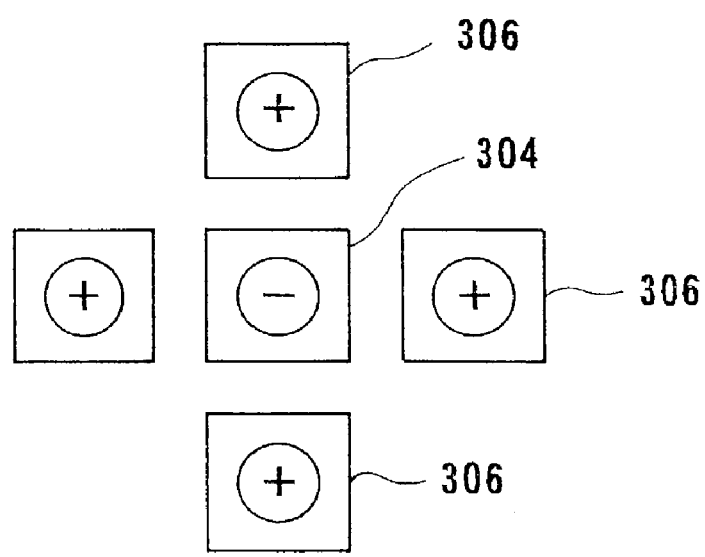
FIG. 63 is a plan view showing still another arrangement of processing and feeding electrodes.

It is also possible to surround a prismatic processing electrode 304 with a rectangular frame-shaped feeding electrode 306 as shown in FIG. 62. Further, as shown in FIG. 63, prismatic processing electrode 304 may be surrounded with a plurality of prismatic feeding electrodes 306. The above-described example of the shape and disposition of electrodes shown in FIGS. 46 to 56 and FIGS. 61 to 63 are applicable to the electrolytic processing device in FIG. 45.

Figure 65:
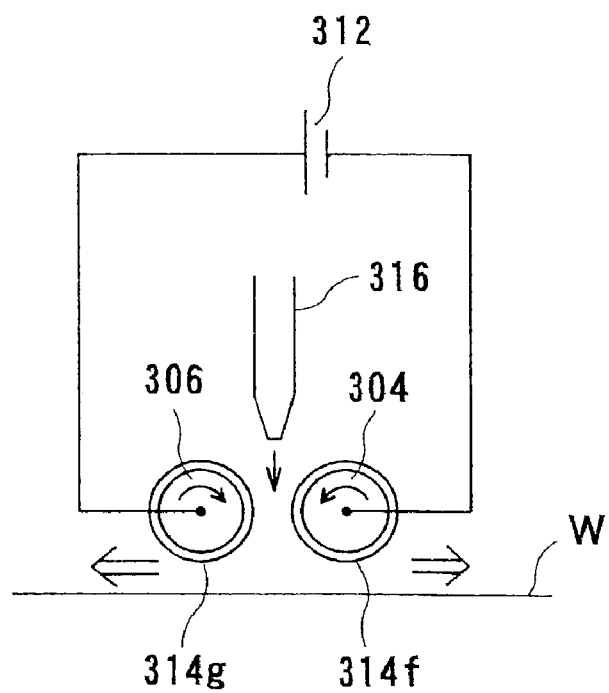
FIG. 65 is a schematic side view of the electrolytic processing device of FIG. 64.

FIGS. 64 and 65 show an electrolytic processing device according to still another embodiment of the present invention. In this electrolytic processing device, processing electrode 304 and feeding electrode 306 are both in the shape of a column, and ion exchangers 314*f*, 314*g* are mounted on a peripheral surface of the processing electrode 304 and on a peripheral surface of the feeding electrode 306, respectively. The processing electrode 304 and the feeding electrode 306 are disposed in parallel at a given distance such that their central axes are parallel to substrate W. In operation, pure water or ultrapure water is supplied from pure water nozzle 316 between the processing electrode 304 and the feeding electrode 306, while the processing electrode 304 and the feeding electrode 306 are allowed to rotate in such opposite directions that these rotating electrodes enwind the pure water or ultrapure water supplied from the pure water nozzle 316.

According to this embodiment, electrolytic processing is performed by rotating a substrate W, which is in contact with or close to the ion exchangers 314*f*, 314*g*, and, at the same time, rotating the processing electrode 304 and the feeding electrode 306 around their own central axes, while supplying pure water or ultrapure water between the processing electrode 304 and the feeding electrode 306, and applying a given voltage between the processing electrode 304 and the feeding electrode 306. In the electrolytic processing, reaction products of an electrode reaction or electrochemical reaction can accumulate with progress of reaction and impede a useful reaction. According to this embodiment, however, a flow of pure water or ultrapure water on a surface of the substrate can be produced by supplying pure water or ultrapure water between the column-shaped electrodes 304, 306 rotating in such opposite directions that the electrodes enwind this supplied water, and a flow of pure water or ultrapure water can effectively discharge unnecessary products. Further, use of the column-shaped electrodes 304, 306 disposed in the above manner allows a linear contact or proximity between the electrodes 304, 306 and the substrate W, which can enhance flatness of a processed surface.

Figure 66:
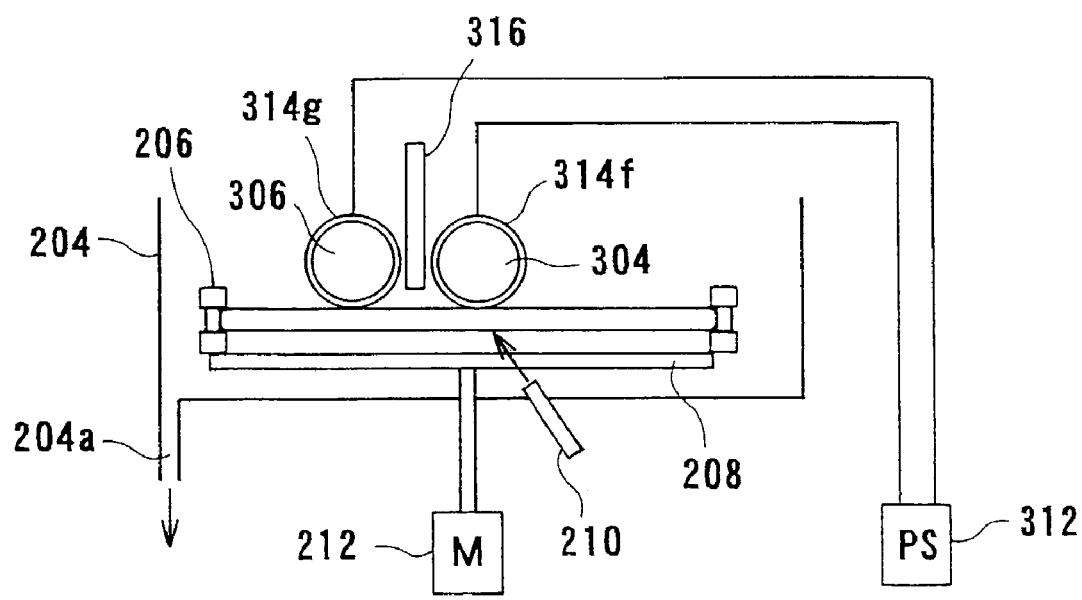
FIG. 66 is a cross-sectional view of an electrolytic processing device according to still another embodiment of the present invention.

FIGS. 66 and 67 show a variation of the above electrolytic processing device shown in FIGS. 64 and 65. In this electrolytic processing device, electrodes with a length substantially equal to a diameter of a substrate W are used as the column-shaped processing electrode 304 and feeding electrode 306, and the processing electrode 304 and the feeding electrode are allowed to rotate in opposite directions through a motor 200 and a pair of spur gears 202a, 202b that engage each other. Further, this electrolytic processing device includes a bottomed, cylindrical waterproof cover 204 having a drain 204a and, provided in its interior, with a substrate holder 208 for holding the substrate W by spin chucks 206 which engage the substrate W at certain points in a peripheral region of the substrate W and rotating the substrate W horizontally with its front surface upward, and a back surface nozzle 210 which is oriented towards almost a center of a back surface of the substrate W. The substrate holder 208 is connected directly to motor 212. The substrate W is loaded and unloaded by a substrate transport arm 214. Other construction is the same as shown in FIGS. 64 and 65.

According to this embodiment, electrolytic processing of the surface of the substrate W is conducted while rotating the substrate holder 208 to thereby rotate the substrate W and, at the same time, rotating the processing electrode 304 and the feeding electrode 306 around their own central axes; and simultaneously therewith, rinsing (cleaning) of the back surface of the substrate W can be conducted by supplying pure water from the back surface nozzle 210 to the back surface of the substrate W.

Figure 68:
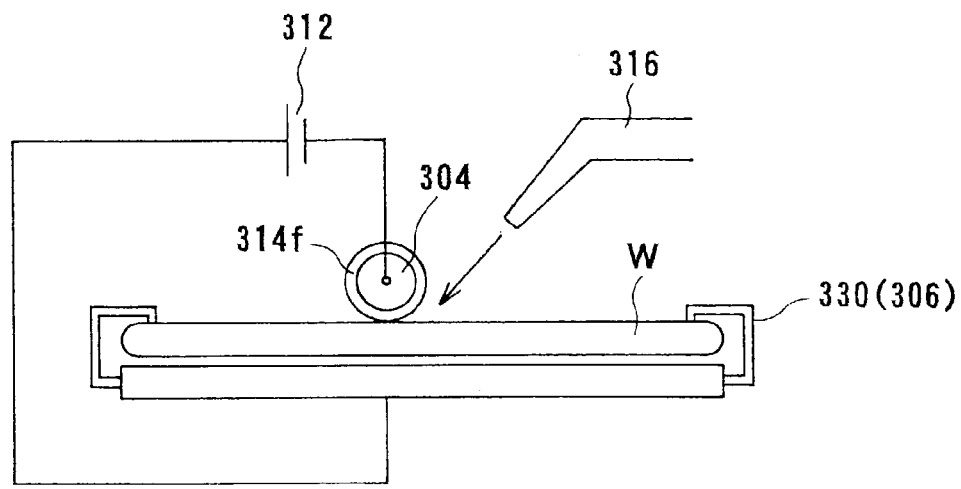
FIG. 68 is a schematic front view of an electrolytic processing device according to still another embodiment of the present invention.

FIG. 68 shows an electrolytic processing device according to still another embodiment of the present invention. In this electrolytic processing device, a column-shaped electrode that can rotate about its central axis, the axis being parallel to substrate W, is used as processing electrode 304. An ion exchanger 314f is mounted on an outer peripheral surface of the processing electrode 304. Pure water or ultrapure water is supplied from pure water nozzle 316 between the processing electrode 304 and the substrate W. Further, a feeding chuck 330 for supplying electricity, which directly contacts a conductor film formed on a surface of the substrate to supply electricity thereto, is used as feeding electrode 306. The feeding chuck 330 connects a feeding electrode positioned beneath the back surface of the substrate W to a conductor film of the substrate W. Even when the back surface of the substrate W is composed of an insulator film such as an SiO₂ film, supply of electricity from the back surface side becomes possible by using the feeding chuck 330.

Figure 69:
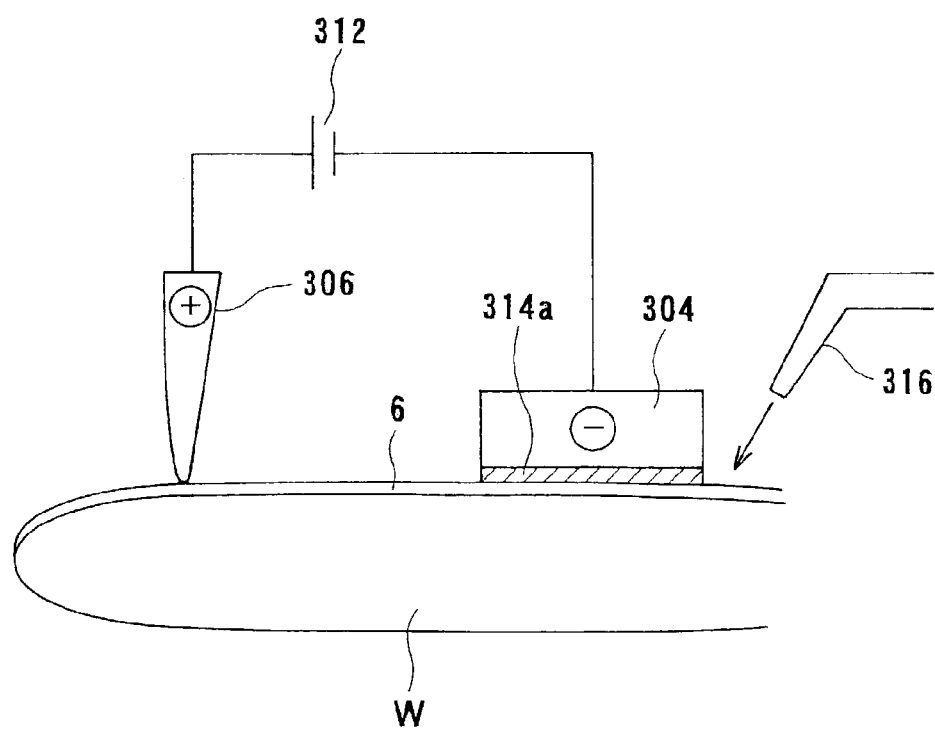
FIG. 69 is a schematic front view of an electrolytic processing device according to still another embodiment of the present invention.

FIG. 69 shows an electrolytic processing device according to still another embodiment of the present invention. In this electrolytic processing device, an electrode in the shape of a flat rectangular plate is used as processing electrode 304. Ion exchanger 314a is mounted on a surface of the electrode facing a substrate W. Pure water or ultrapure water is supplied from pure water nozzle 316 between the processing electrode 304 and the substrate W. Further a contact pin-like electrode, which directly contacts a conductor film (portion to be processed) such as the copper film 6 (see FIG. 85B) formed on a surface of the substrate W to supply electricity thereto, is used as feeding electrode 306. The feeding electrode 306 should preferably have such a contact area that does not leave its trace on the conductor film after direct contact between the feeding electrode 306 and the conductor film. It is possible to bring the feeding electrode 306 into contact with a conductor film such as the copper film 6 formed on a bevel portion of the substrate W, thereby removing the conductor film formed on the bevel portion of the substrate W in a later bevel-etching step.

Figure 70:
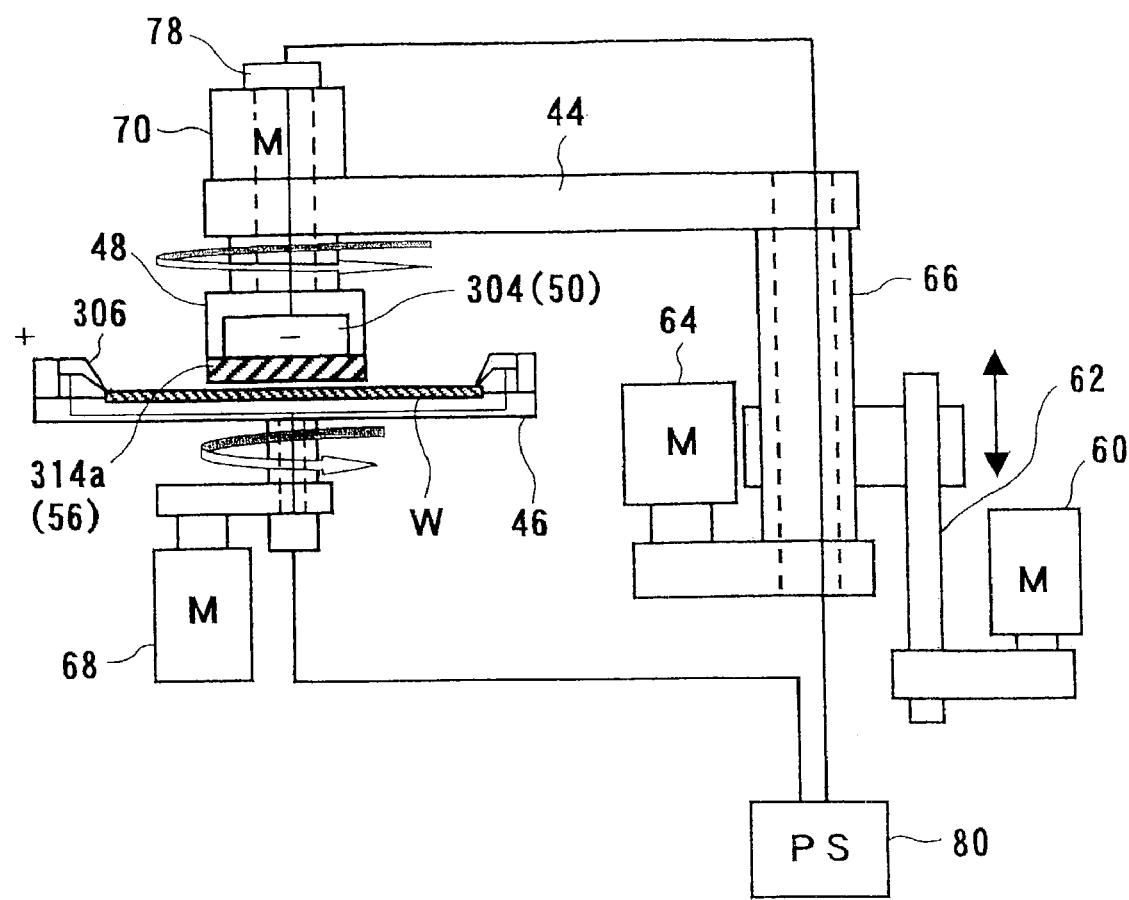
FIG. 70 is a vertical sectional view of an electrolytic processing device according to still another embodiment of the present invention.
Figure 71:
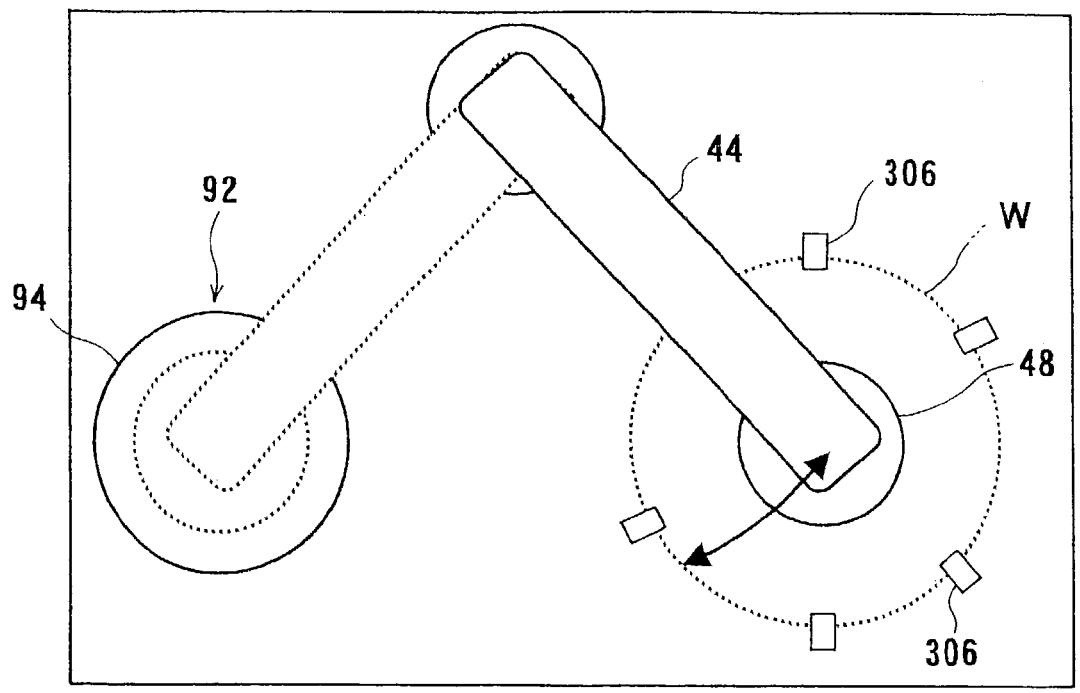
FIG. 71 is a plan view of the electrolytic processing device of FIG. 70.

FIGS. 70 and 71 show another embodiment of an electrolytic processing device according to the present invention in which electricity is supplied from a front surface side of a bevel portion. This electrolytic processing device differs from the electrolytic processing device shown in FIGS. 28 and 29 in the following points:

Substrate holder 46, disposed below electrode section 48, is designed to hold a substrate W with its front surface upward and rotate by actuation of motor 68, and is provided with feeding electrodes 306, which contact a peripheral portion of the substrate W placed on the substrate holder 46, in certain positions along a circumferential direction of the substrate holder 46. The feeding electrodes 306 are connected to an anode extending from power source 80.

On the other hand, vertically movable, swingable and rotatable electrode section 48 is provided with a processing electrode 304 (50) which is connected to a cathode extending from the power source 80 through a hollow portion formed in drive shaft 66 to slip ring 78, and further extending from the slip ring 78 through a hollow portion of hollow motor 70. An ion exchanger 314a (56) is mounted on a surface (lower surface) of the processing electrode 304 (50). Other construction is the same as shown in FIGS. 28 and 29.

According to this embodiment, the electrode holder 48 is lowered so as to bring the ion exchanger 314a (56) into contact with or close to a surface of the substrate W held by the substrate holder 46. While supplying pure water or ultrapure water to an upper surface of the substrate, a given voltage is applied through the power source 80 between the processing electrode 304 (50) and the feeding electrode 306, the substrate holder 46 and the electrode section are rotated and at the same time, and swingable arm 44 is swung to move the electrode section along the upper surface of the substrate W, thereby effecting electrolytic processing of this surface of the substrate W.

Figure 72:
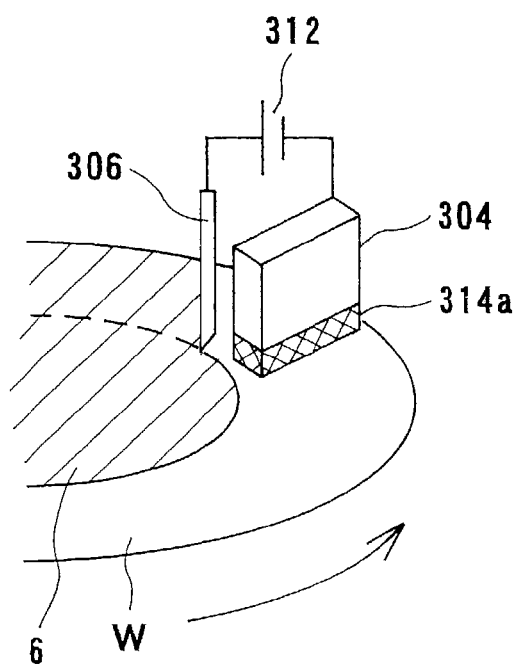
FIG. 72 is a schematic perspective view of an electrolytic processing device according to still another embodiment of the present invention, which is utilized as a bevel-etching device.
Figure 73:
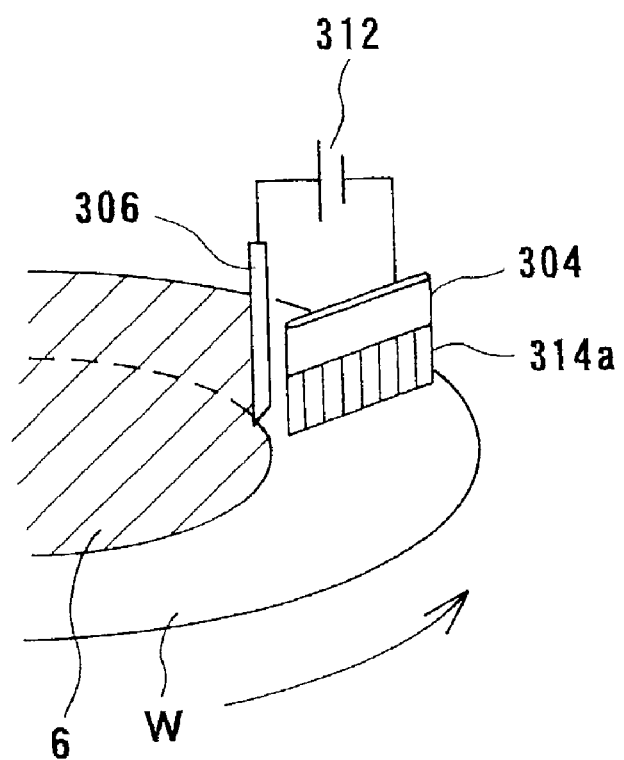
FIG. 73 is a schematic perspective view of an electrolytic processing device according to still another embodiment of the present invention, which is utilized as a bevel-etching device.
Figure 74:
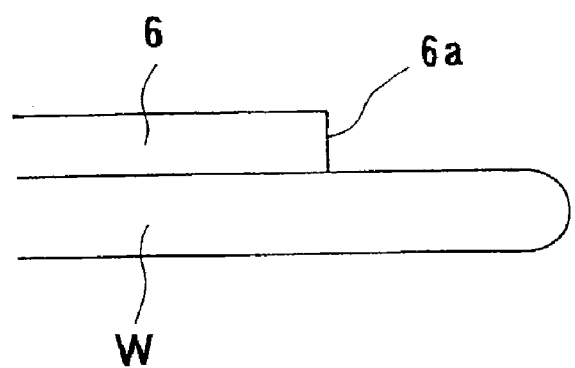
FIG. 74 is a diagram illustrating a state of a substrate after undergoing electrolytic processing in the electrolytic processing device (bevel-etching device) of FIG. 72 or of FIG. 73.

FIGS. 72 and 73 show an electrolytic processing device according to still another embodiment of the present invention which is used as a bevel-etching device. Construction of this electrolytic processing device is basically the same as the above-described electrolytic processing device shown in FIG. 69. In this electrolytic processing device, ion exchanger 314a mounted on processing electrode 304 contacts or gets close to a bevel portion of substrate W, and feeding electrode 306 directly contacts a conductor film (portion to be processed) such as copper film 6 formed in a surface of the substrate W. The processing electrode 304 may either be a thick one as shown in FIG. 72, or a thin one as shown in FIG. 73. Bevel-etching processing can obtain a conductor layer such as copper film 6 with a sharp profile (step) 6*a*, as shown in FIG. 74.

Figure 75:
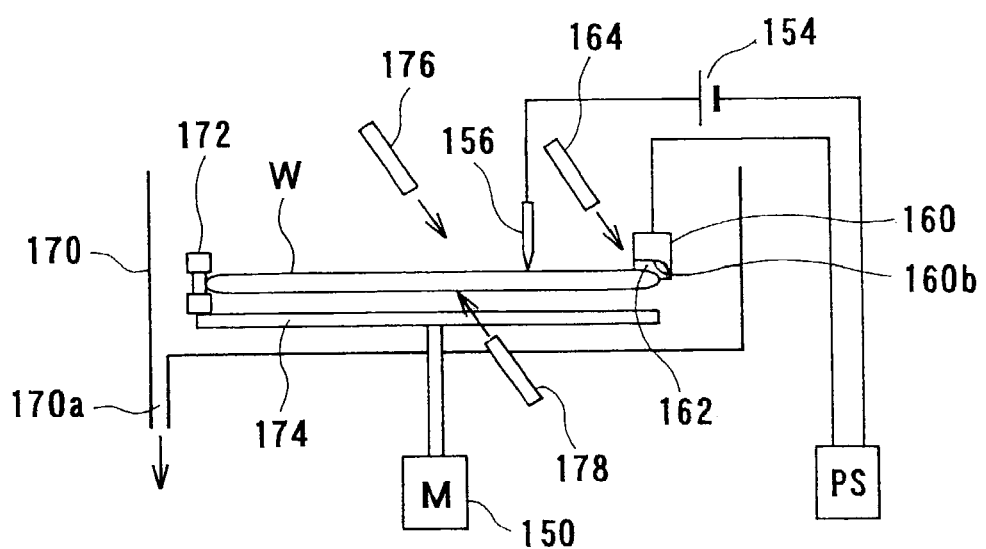
FIG. 75 is a cross-sectional view of an electrolytic processing device according to still another embodiment of the present invention, which is utilized as a bevel-etching device.

FIGS. 75 and 76 show an electrolytic processing device according to still another embodiment of the present invention which is used as a bevel-etching device. This electrolytic processing device differs from the electrolytic processing device shown in FIGS. 42 and 43 in that: In this electrolytic processing device, a non-rotatable flat plate-shaped electrode, having in a lower surface a curved portion 160*b* conforming to a configuration of an upper half of a bevel portion of a substrate W, is used as processing electrode 160, and a contact pin-like electrode is used as feeding electrode 156. Ion exchanger 162 is mounted on a lower surface of the processing electrode 160. The ion exchanger 162 is brought into contact with or close to the bevel portion of the substrate W, thereby electrolytically processing the upper half of the bevel portion of the substrate W. Other construction is the same as shown in FIGS. 42 and 43. According to this embodiment, simultaneously with electrolytic polishing of the upper half of the bevel portion, rinsing (cleaning) of front and back surfaces of the substrate can be performed.

Figure 77:
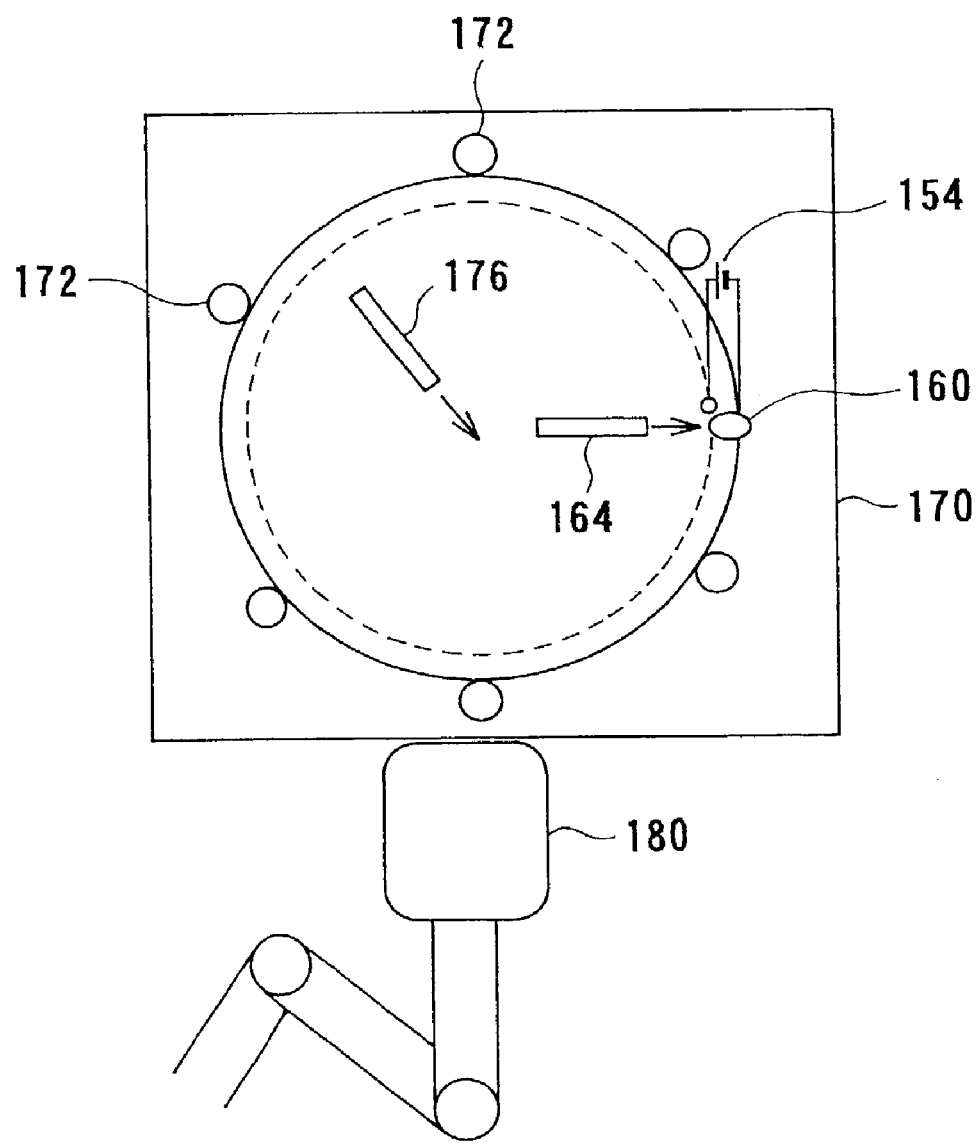
FIG. 77 is a plan view showing a variation of the electrolytic processing device of FIG. 75.

FIG. 77 shows a variation of the above electrolytic processing device. This electrolytic processing device differs from the above electrolytic processing device shown in FIGS. 75 and 76 in use of a thicker processing electrode 160. Other construction is the same as shown in FIGS. 75 and 76.

Figure 78:
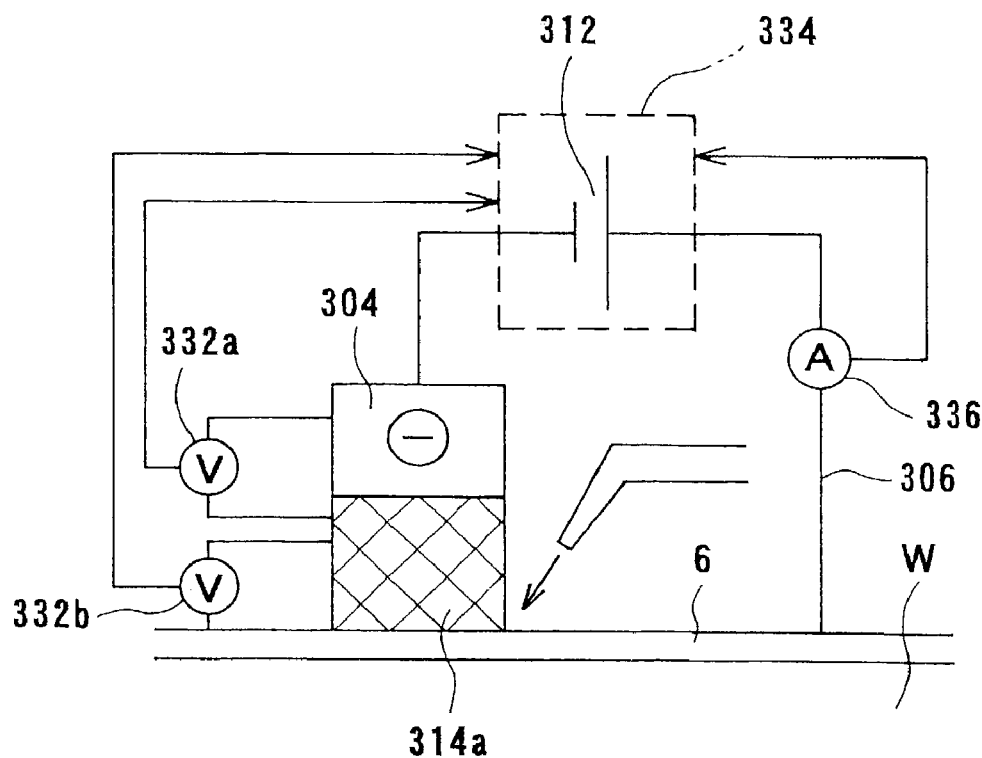
FIG. 78 is a schematic front view of an electrolytic processing device according to still another embodiment of the present invention.

As shown in FIG. 78, it is preferred to monitor with voltmeters 332*a*, 332*b* voltage between the processing electrode 304 and the ion exchanger 314*a*, and voltage between the ion exchanger 314*a* and the conductor film (portion to be processed) such as the copper film 6 (see FIG. 85B), and feed back monitored values to a controller 334 so as to keep the voltages constant, and also to monitor with an ammeter 336 electric current flowing between the processing electrode 304 and the feeding electrode 306, and feed back monitored values to the controller 334 so as to allow a constant current to flow between the processing electrode 304 and the feeding electrode 306. This makes it possible to restrain side reactions on a surface of the electrode or on a surface of the conductor film such as copper film to thereby prevent formation of impurities. If impurities are formed on the surface of the electrode, a decrease in a processing rate can be avoided by maintaining a constant electric current.

Figure 85C:
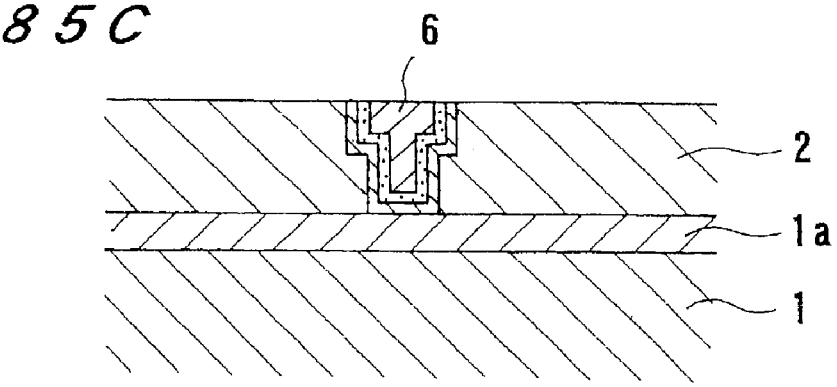

When electrolytic processing of a substrate W, for example the substrate W of FIG. 85B having the copper film 6 formed on its surface, is conducted at a controlled constant current value, current density (current value per unit area) increases upon a decrease in processing area at a time of exposure of an interconnect pattern composed of copper layer 6 (as shown in FIG. 85C, copper is present only in the trench), whereby a removal processing rate inevitably increases. With electrolytic processing of the substrate at a controlled constant current, the removal processing rate thus varies before and after the exposure of the interconnect pattern, thereby making processing control in the vicinity of such exposure difficult. Further, upon processing of the copper film 6 on the interconnect pattern, the voltage applied increases with a decrease in film thickness. Too high an applied voltage can cause electric discharge. Also from a viewpoint of power consumption, a low voltage is preferred.

When processing is conducted at a controlled constant voltage, on the other hand, a current value decreases with exposure of the interconnect pattern, whereby it becomes possible to suppress arise of current density. Further, because of constancy of voltage, there is no fear of electric discharge. Furthermore, since the current value decreases with the decrease of film thickness, there is no increase of power consumption. However, since the current value charges, the processing rate changes with time. When the current value becomes too low, a mode of processing can change from removal processing to oxide film formation.

When processing is conducted at a controlled constant current density, the processing rate does not change before and after exposure of an interconnect pattern, thus enabling removal processing at a constant processing rate. In order to make this control, however, it is necessary to grasp beforehand an area of an exposed interconnect pattern, and make a control of changing (virtually decreasing) the current value at a particular moment. It would therefore be difficult to respond to a variety of interconnect patterns.

In view of the above and making use of the advantages of the above controlling methods, it may be considered to first perform constant-current control up to the vicinity of an exposure of an interconnect pattern in view of easy processing control because of a constant processing rate, and then perform constant-voltage control which is free from a fear of a rise in voltage and which can suppress a rise of current density.

Figure 79:
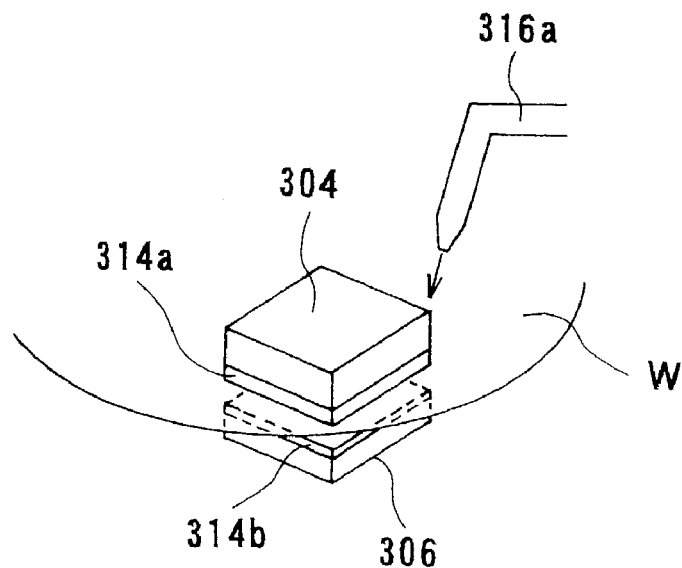
FIG. 79 is a schematic perspective view of an electrolytic processing device according to still another embodiment of the present invention.
Figure 80:
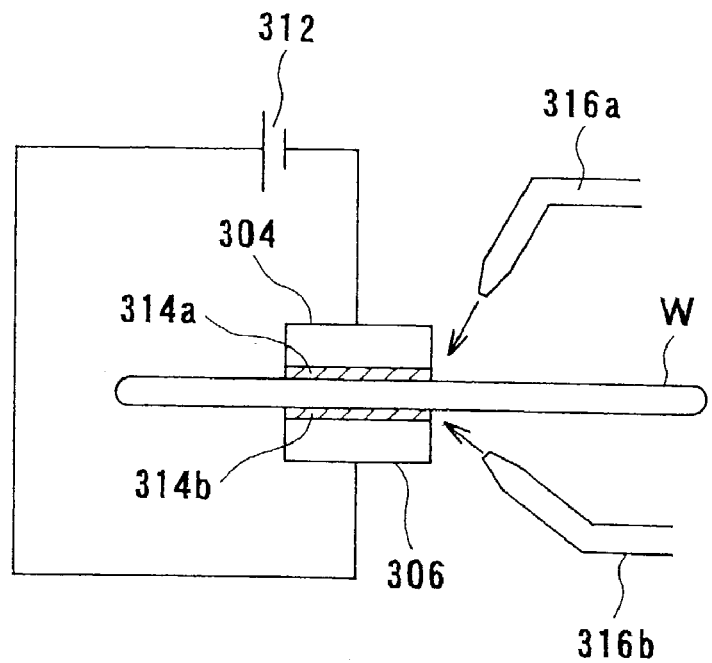
FIG. 80 is a schematic front view of the electrolytic processing device of FIG. 79.

FIGS. 79 and 80 show an electrolytic processing device according to still another embodiment of the present invention, which is adapted for electrolytic processing of a substrate W in which a conductor film (portion to be processed) such as a copper film is formed over an entire peripheral surface. In this electrolytic processing device, a processing electrode 304 and a feeding electrode 306, both in the shape of a flat rectangular plate, are disposed in opposite positions across the substrate W. Thus, in this embodiment, an electrode plate located on an upper surface side of the substrate W and connected to a cathode of a power source 312 functions as the processing electrode 304, and on electrode plate located on a lower surface side of the substrate W and connected to an anode functions as the feeding electrode 306. Ion exchangers 314*a*, 314*b* are mounted on a surface of the processing electrode 304 facing the substrate W and on a surface of the feeding electrode 306 facing the substrate W, respectively. A pure water nozzle 316*a* for supplying pure water or ultrapure water between the processing electrode 304 and the substrate W is provided on the upper surface side of the substrate W, and a pure water nozzle 316*a* for supplying pure water or ultrapure water between the feeding electrode 306 and the substrate W is provided on the lower surface side of the substrate W.

In operation, the ion exchangers 314*a*, 314*b*, respectively mounted on the processing electrode 304 and on the feeding electrode 306, are brought into contact with or close to the substrate W, and pure water or ultrapure water is supplied from the pure water nozzle 316*a* between the processing electrode 304 and the substrate W, and from a pure water nozzle 316*b* between the feeding electrode 306 and the substrate W, thereby electrolytically processing a part of the substrate W facing the processing electrode 304; and either one or both of the substrate W and the processing electrode 304 are allowed to move so as to effect electrolytic processing of an entire surface of the substrate W on a side of the processing electrode 304. The feeding electrode 306 may be connected directly to the substrate W. Further, as with the preceding embodiments, an electrolytic solution or a liquid having an electric conductivity of not more than 500 μS/cm may be used instead of pure water or ultrapure water.

Figure 81:
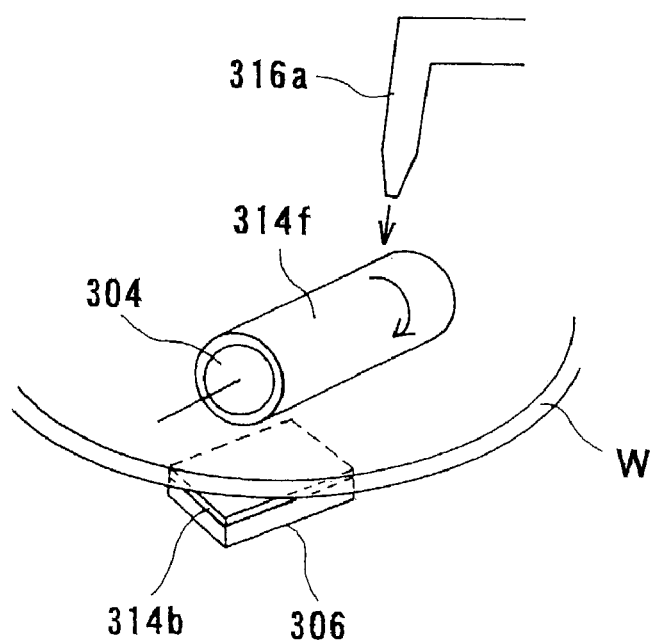
FIG. 81 is a schematic front view of an electrolytic processing device according to still another embodiment of the present invention.
Figure 82:
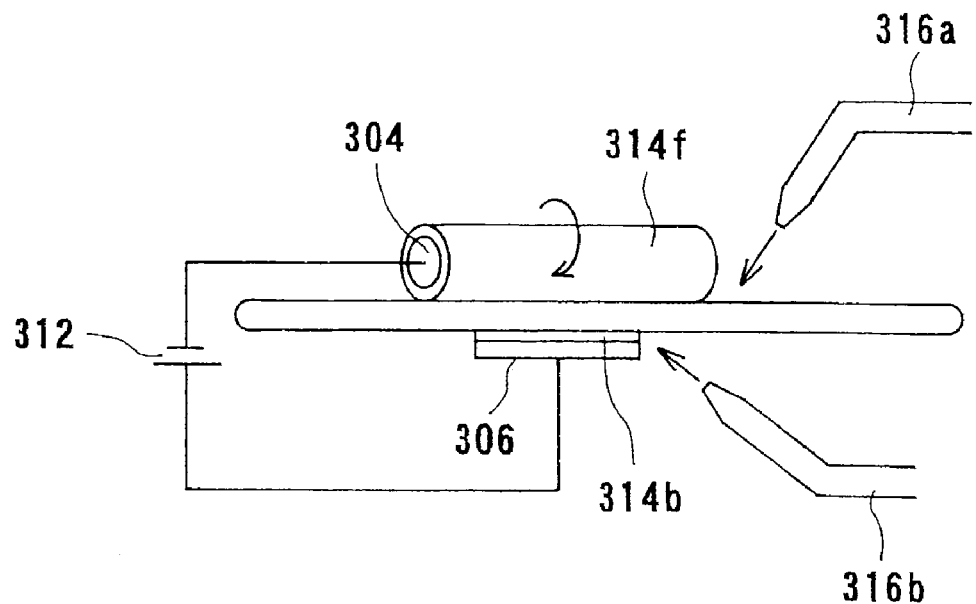
FIG. 82 is a schematic front view of the electrolytic processing device of FIG. 81.

FIGS. 81 and 82 show an electrolytic processing device according to still another embodiment of the present invention. This electrolytic processing device employs, as processing electrode 304, a column-shaped one whose peripheral surface is covered with an ion exchanger 314f and which can rotate about its central axis, the central axis being parallel to substrate W. Other construction is the same as shown in FIGS. 79 and 80. Use of such a column-shaped rotatable processing electrode 304 allows the processing electrode 304 to linearly contact or get close to the substrate W, whereby flatness of a processed surface can be enhanced.

Figure 83:
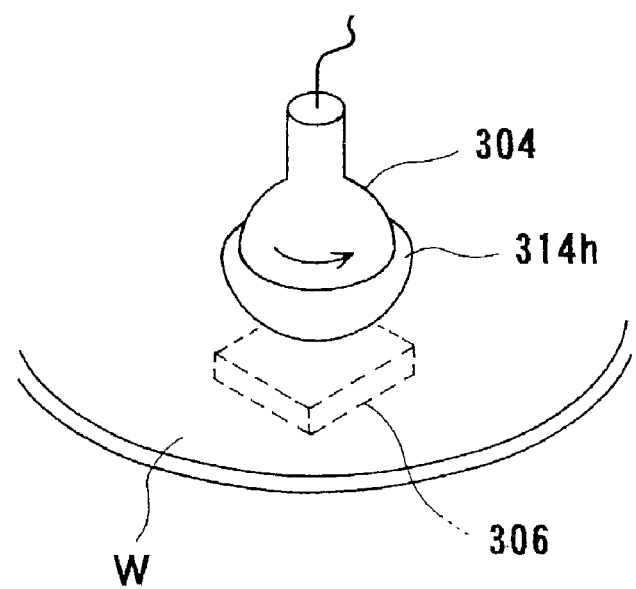
FIG. 83 is a schematic front view of an electrolytic processing device according to still another embodiment of the present invention.
Figure 84:
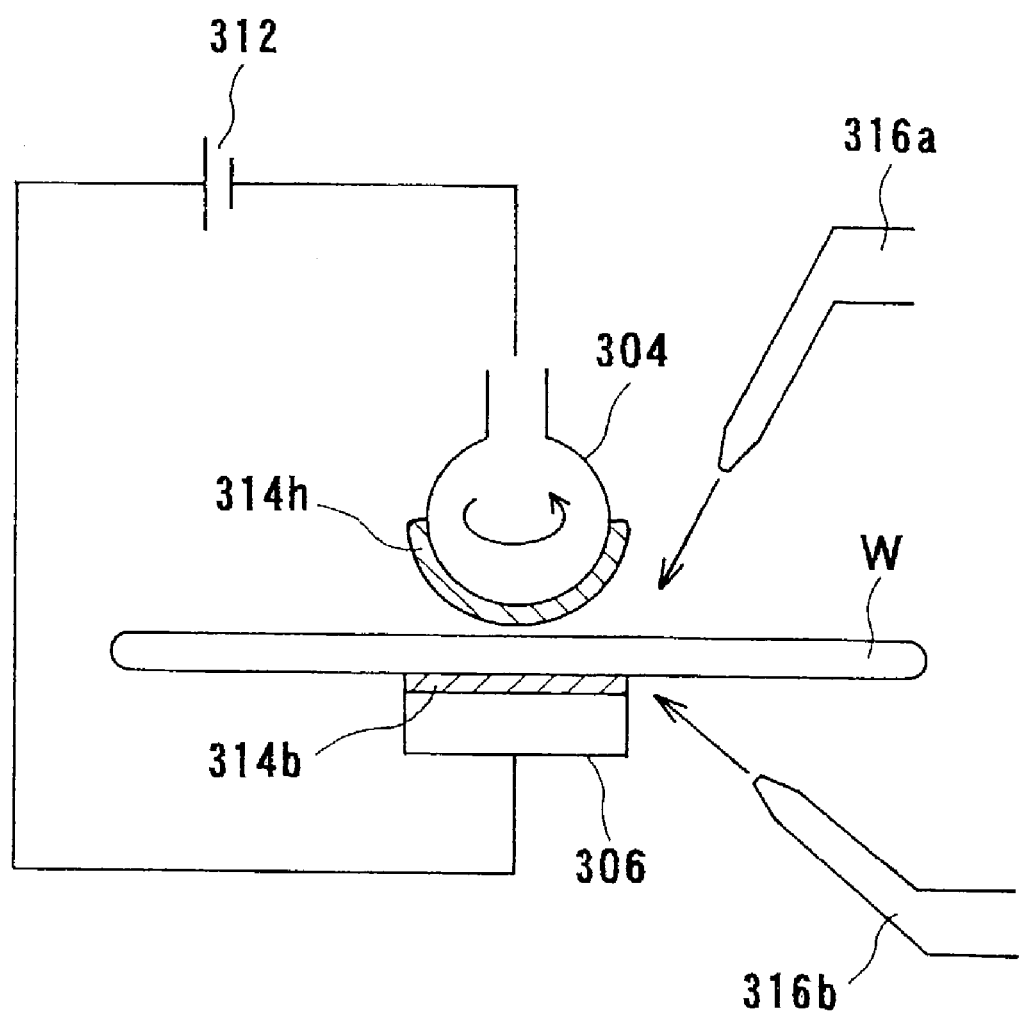
FIG. 84 is a schematic front view of the electrolytic processing device of FIG. 83.

FIGS. 83 and 84 show an electrolytic processing device according to still another embodiment of the present invention. This electrolytic processing device uses, as processing electrode 304, an electrode of a spherical or oval spherical shape that can rotate about its central axis, the central axis being perpendicular to substrate W. A lower half of the processing electrode 304 is covered with an ion exchanger 314h. Other construction is the same as shown in FIGS. 79 and 80. Use of such a spherical or oval spherical processing electrode 304, which allows ion exchanger 314h to contact or get close to the substrate W at a point, enables processing at a point or of a curved surface. Further, uniformity of a processed surface can be enhanced by rotating this spherical processing electrode. Of course, such a spherical processing electrode may be used also in the preceding embodiments and, in addition, it is also possible to use a spherical or oval spherical form of feeding electrode.

According to the present invention, as described hereinabove, electrolytic processing of a workpiece, such as a substrate, can be effected through electrochemical action, in place of CMP treatment, for example, without causing any physical defects in the workpiece that would impair properties of the workpiece. The present electrolytic processing device can effectively remove (clean) matter adhering to a surface of the workpiece such as a substrate. Accordingly, the present invention can omit a CMP treatment entirely or at least reduce a load upon CMP. Furthermore, electrolytic processing of a substrate can be effected even by solely using pure water or ultrapure water. This obviates a possibility that impurities such as an electrolyte will adhere to or remain on a surface of the substrate, can simplify a cleaning process after removal processing, and can remarkably reduce a load upon waste liquid disposal.

FIG. 86 schematically shows an electrolytic processing device according to still another embodiment of the present invention. Electrolytic processing device 510 is adapted for etching and removing e.g. an extra ruthenium film formed on or adhering to a peripheral region of a front surface of a substrate W. The electrolytic processing device 510 includes a rotatable substrate holder 512 for attracting and holding the substrate W with its front surface facing upward, a liquid supply nozzle 526 for supplying a liquid, e.g. ultrapure water 514 according to this embodiment, to a to-be-processed portion of the substrate W, and a processing chamber 516 for holding the ultrapure water 514 so that it may not scatter after processing. A drain 518 for discharging the ultrapure water 514 is connected to a side portion of the processing chamber 516.

Positioned above a peripheral portion of the substrate W held by the substrate holder 512, there is disposed a feeding electrode 520 that comes close to or into contact with a surface of the substrate W and feeds electricity to a ruthenium film on the surface of the substrate W. Further, a processing electrode 522 is disposed above a peripheral portion of the substrate W held by the substrate holder 512 at a given distance from the surface of the substrate W. An ion exchanger 524, comprised of e.g. a nonwoven fabric having a strongly acidic cation-exchange group, is mounted tightly to a surface (lower surface) of the processing electrode 522. A surface (lower surface) of the ion exchanger 524 is allowed to be close to or in contact with the surface of the substrate W held by the substrate holder 512. The liquid supply nozzle 526 is disposed above the substrate W held by the substrate holder 512, and supplies the ultrapure water 514 between the surface (to-be-processed portion) of the substrate W and the processing electrode 522.

The feeding electrode 520 is to be connected to an anode of a power source 528 and the processing electrode 522 is to be connected to the cathode, so that the ruthenium film in the surface of the substrate W serves as an anode and the processing electrode 522 serves as a cathode, and a portion of the ruthenium film facing the ion exchanger 524 mounted to the surface of the processing electrode 522 is etched and removed.

An ion exchanger having a strongly acidic cation-exchange group (sulfonic acid group) or a strongly basic anion-exchange group (quaternary ammonium group) is usually used as the ion exchanger 524. It is, however, possible to use an ion exchanger having a weakly acidic cation-exchange group (carboxyl group) or a weakly basic anion-exchange group (tertiary or lower ammonium group).

A description will now be given of electrolytic processing for etching and removing the ruthenium film by the electrolytic processing device 510.

First, the substrate W is attracted and held with its front surface facing upward by the substrate holder 512. Ultrapure water 514 is supplied from the liquid supply nozzle 526 to between the substrate W and the processing electrode 522, and part of the ultrapure water 514 in the processing chamber 516 is discharged through the drain 518. The feeding electrode 520 is brought close to or in contact with the surface of the substrate W, and the ion exchanger 524 mounted to the processing electrode 522 is brought into contact with the surface of the substrate W. While rotating the substrate holder 512 integrally with the substrate W and feeding the ultrapure water 514 in the above manner, the feeding electrode 520 is connected to the anode of the power source 528 and the processing electrode 522 is connected to the cathode to perform removal processing of the ruthenium film through action of hydrogen ions and hydroxide ions generated by a chemical reaction that takes place at a solid surface of the ion exchanger 524, such as a nonwoven fabric having a strongly acidic cation-exchanger group.

FIG. 87 schematically shows an electrolytic processing device according to still another embodiment of the present invention. Electrolytic processing device 510a is adapted for etching and removing e.g. an extra ruthenium film formed on or adhering to a peripheral region of a front surface of a substrate W. The electrolytic processing device 510a includes a rotatable substrate holder 512 for attracting and holding the substrate W with its front surface facing upward, an electrolysis solution supply nozzle 525 for supplying a halide-containing electrolysis solution 515 to a to-be-processed portion of the substrate W, and a processing chamber 516 for holding the electrolysis solution 515 so that it may not scatter after processing. A drain 518 for discharging the electrolysis solution 515 is connected to a side portion of the processing chamber 516.

Positioned above a peripheral portion of the substrate W held by the substrate holder 512, there is disposed a feeding electrode 520 that comes close to or into contact with a surface of the substrate W and feeds electricity to a ruthenium film on the surface of the substrate W. Further, a processing electrode 522 is disposed above a peripheral portion of the substrate W held by the substrate holder 512 at a given distance from the surface of the substrate W. Furthermore, in addition to the electrolysis solution supply nozzle (electrolysis solution supply section) 525 for supplying the halide-containing electrolysis solution 515 between a surface (lower surface) of the processing electrode 522 and the ruthenium film in a to-be-processed portion of the substrate W, there is disposed a cleaning liquid supply nozzle 527 for supplying pure water or ultrapure water, as a cleaning liquid for cleaning (rinsing) the surface of the substrate after processing, to a processed substrate surface.

The feeding electrode 520 is to be connected to an anode of a power source 528 and the processing electrode 522 is to be connected to a cathode, so that the ruthenium film on the surface of the substrate W serves as an anode and the processing electrode 522 serves as a cathode, and a portion of the ruthenium film to which the halide-containing electrolysis solution 515 is supplied is etched and removed.

With regard to the electrolysis solution 515, water or an organic solvent such as an alcohol, acetonitrile, dimethyl form amide, dimethyl sulfoxide, and the like may be used as a solvent for a halide. An appropriate solvent may be selected depending on an intended usage of the ruthenium film to be processed, a cleaning step necessary after processing, a surface condition of the ruthenium film, and the like. For a substrate for use in semiconductor manufacturing, it is preferred to use pure water, more preferably ultrapure water, in order to best avoid impurity contamination of the substrate.

An electrolysis solution of any halide may be employed insofar as etching processing of the ruthenium film can progress through an electrochemical interaction, and a compound generated during electrolysis reacts with ruthenium and a reaction product can be dissolved in an electrolysis solution or volatilized and removed. Specific examples of usable electrolysis solutions may include an aqueous solution of a hydrogen halide acid such as HCl, HBr or HI, an aqueous solution of a halogen oxo acid such as $HClO_3$, $HBrO_3$, $HIO_3$, HClO, HBrO or HIO, an aqueous solution of a halogen oxo acid salt such as $NaClO_3$, $KClO_3$, NaClO or KClO, and an aqueous solution of a neutral salt such as NaCl or KCl. An appropriate electrolysis solution may be selected depending on an intended usage of the ruthenium film after processing and an influence of remaining material upon the usage, a thickness of the ruthenium film, properties of a film underlying the ruthenium film, and the like.

In operation of the electrolytic processing device 510a, at the outset, the substrate W is attracted and held with its front surface facing upward by the substrate holder 512. The halide-containing electrolysis solution 515 is supplied from the electrolysis solution supply nozzle 525 to between the substrate W and the processing electrode 522. The electrolysis solution 515 that has collected in the processing chamber 516 is discharged through the drain 518. While rotating the substrate holder 512 integrally with the substrate W and supplying the electrolysis solution 515 in the above manner, the feeding electrode 520 is connected to the anode of the power source 528 and the processing electrode 522 is connected to the cathode, whereby the ruthenium film is etched and removed though an electrochemical reaction. Further, a halide generated by electrolysis reacts with the ruthenium, whereby etching and removal of the ruthenium film progresses. A substrate surface after processing is cleaned by pure water or ultrapure water supplied from the cleaning liquid supply nozzle 527.

A halide concentration of the halide-containing electrolysis solution 515 is generally 1 mg/l to 10 g/l, preferably 100 mg/l to 1 g/l. A type of halide, a processing time, a processing area, a distance between the ruthenium film as an anode and the processing electrode 522 as a cathode, an electrolysis voltage, and the like may appropriately be determined depending upon a surface condition of the substrate after electrolytic processing, a capacity for waste liquid treatment, and the like. For example, an amount of chemicals can be reduced by using an electrolysis solution with a dilute halide concentration and increasing the electrolysis voltage. A processing rate can be increased by increasing the halide concentration of the electrolysis solution.

Although certain preferred embodiments of the present invention have been shown and described in detail, it should be understood that various changes and modifications may be made therein without departing from the scope of the appended claims.

This invention relates to an electrolytic processing device useful for processing a conductive material present on a surface of a substrate, especially a semiconductor wafer, or for removing impurities adhering to a surface of a substrate, and a substrate processing apparatus provided with the electrolytic processing device.

What is claimed is:

1. An electrolytic processing device, comprising:
   a processing electrode to be brought into contact with or close to a workpiece;
   a feeding electrode for supplying electricity to the workpiece;
   an ion exchanger disposed in at least one of a spaces between the workpiece and said processing electrode while the workpiece is being processed, and a space between the workpiece and said feeding electrode while the workpiece is being processed;
   a power source for applying a voltage between said processing electrode and said feeding electrode; and
   a liquid supply section for supplying liquid, while the workpiece is being processed, to the space between the workpiece and said processing electrode when said ion exchanger is present in this space, and to the space between the workpiece and said feeding electrode when said ion exchanger is present in this space.

2. The electrolytic processing device according to claim 1, wherein the liquid is pure water, or a liquid having electric conductivity of not more than 500 μS/cm.

3. The electrolytic processing device according to claim 2, wherein the pure water is ultrapure water.

4. The electrolytic processing device according to claim 1, wherein said ion exchanger includes a first portion disposed in the space between said processing electrode and the workpiece while the workpiece is being processed, and a separate second portion disposed in the space between said feeding electrode and the workpiece while the workpiece is being processed.

5. The electrolytic processing device according to claim 1, wherein said ion exchanger is disposed, as an integrated structure, in both the spaces between said processing electrode and the workpiece while the workpiece is being processed and the space between said feeding electrode and the workpiece while the workpiece is being processed.

6. The electrolytic processing device according to claim 1, wherein said ion exchanger covers a surface, to be processed, of the substrate while the workpiece is being processed, and is disposed in the spaces between said processing electrode and the workpiece while the workpiece is being processed, and the space between said feeding electrode and the workpiece while the workpiece is being processed.

7. The electrolytic processing device according to claim 6, wherein said ion exchanger extends between a supply shaft and a rewind shaft, and is to be taken up sequentially.

8. The electrolytic processing device according to claim 7, wherein said processing electrode and said feeding electrode are mounted alternately on said ion exchanger at a given pitch along a length of said ion exchanger.

9. The electrolytic processing device according to claim 1, wherein said ion exchanger has water-absorbing properties.

10. The electrolytic processing device according to claim 1, wherein said ion exchanger has at least one of an anion-exchange ability and a cation-exchange ability.

11. The electrolytic processing device according to claim 1, wherein said ion exchanger is covered with a porous body.

12. The electrolytic processing device according to claim 1, further comprising a regeneration section for regenerating said ion exchanger.

13. The electrolytic processing device according to claim 1, wherein at least one of said processing electrode and said feeding electrode is in the shape of a flat rectangular plate.

14. The electrolytic processing device according to claim 1, wherein at least one of said processing electrode and said feeding electrode is in the shape of a column, and is disposed such that a central axis thereof is parallel to a surface, to be processed, of the workpiece while the workpiece is being processed.

15. The electrolytic processing device according to claim 1, wherein at least one of said processing electrode and said feeding electrode is of a spherical or oval spherical shape.

16. The electrolytic processing device according to claim 1, wherein at least one of said processing electrode and said feeding electrode has a depressed portion or a raised portion conforming to a configuration of the workpiece, and processing of the workpiece is to be conducted by allowing the workpiece to face said depressed portion or said raised portion.

17. The electrolytic processing device according to claim 1, wherein said processing electrode is designed to move relative to the workpiece while the workpiece is being processed, and/or said feeding electrode is designed to move relative to the workpiece while the workpiece is being processed.

18. The electrolytic processing device according to claim 17, wherein said processing electrode and/or said feeding electrode is designed to move relative to the workpiece by being designed to at least one of
  (i) rotate relative to the workpiece,
  (ii) reciprocate relative to the workpiece,
  (iii) eccentrically rotate relative to the workpiece,
  (iv) perform a scroll movement relative to the workpiece.

19. The electrolytic processing device according to claim 1, wherein said processing electrode and said feeding electrode are disposed such that one of said processing electrode and feeding electrode surrounds the other of said processing electrode and feeding electrode.

20. The electrolytic processing device according to claim 1, wherein at least one of said processing electrode and said feeding electrode is in the shape of a fan.

21. The electrolytic processing device according to claim 1, wherein at least one of said processing electrode and said feeding electrode is disposed linearly or circularly.

22. An electrolytic processing device comprising:
a processing electrode to be brought into contact with or close to a workpiece;
a feeding electrode for supplying electricity to the workpiece;
a power source for applying a voltage between said processing electrode and said feeding electrode; and
a liquid supply section for supplying pure waters or a liquid having an electric conductivity of not more than 500 µS/cm, between the workpiece and said processing electrode while the workpiece is being processed.

23. The electrolytic processing device according to claim 22, wherein the pure water is ultrapure water.

24. The electrolytic processing device according to claim 22, wherein at least one of said processing electrode and said feeding electrode is in the shape of a flat rectangular plate.

25. The electrolytic processing device according to claim 22, wherein at least one of said processing electrode and said feeding electrode is in the shape of a column, and is disposed such that a central axis thereof is parallel to a surface, to be processed, of the workpiece while the workpiece is being processed.

26. The electrolytic processing device according to claim 22, wherein at least one of said processing electrode and said feeding electrode is of a spherical or oval spherical shape.

27. The electrolytic processing device according to claim 22, wherein at least one of said processing electrode and said feeding electrode has a depressed portion or a raised portion conforming to a configuration of the workpiece, and processing of the workpiece is to be conducted by allowing the workpiece to face said depressed portion or said raised portion.

28. The electrolytic processing device according to claim 22, wherein said processing electrode is designed to move relative to the workpiece while the workpiece is being processed, and/or said feeding electrode is designed to move relative to the workpiece while the workpiece is being processed.

29. The electrolytic processing device according to claim 28, wherein said processing electrode and/or said feeding electrode is designed to move relative to the workpiece by being designed to at least one of
  (i) rotate relative to the workpiece,
  (ii) reciprocate relative to the workpiece,
  (iii) eccentrically rotate relative to the workpiece, or
  (iv) perform a scroll movement relative to the workpiece.

30. The electrolytic processing device according to claim 22, wherein said processing electrode and said feeding electrode are disposed such that one of said processing electrode and feeding electrode surrounds the other of said processing electrode and feeding electrode.

31. The electrolytic processing device according to claim 22, wherein at least one of said processing electrode and said feeding electrode is in the shape of a fan.

32. The electrolytic processing device according to claim 22, wherein at least one of said processing electrode and said feeding electrode is disposed linearly or circularly.

33. A substrate processing apparatus, comprising:
a substrate carry-in and carry-out section for carrying in and carrying out a substrate;
an electrolytic processing device including
  (i) a processing electrode to be brought into contact with or close to a substrate,
  (ii) a feeding electrode for supplying electricity to the substrate,
  (iii) an ion exchanger disposed in at least one of a space between the substrate and said processing electrode while the substrate is being processed, and a space between the substrate and said feeding electrode while the substrate is being processed,
  (iv) a power source for applying a voltage between said processing electrode and said feeding electrode, and
  (v) a liquid supply section for supplying liquid, while the substrate is being processed, to the space between the substrate and said processing electrode when said ion exchanger is present in this space, and to the space between the substrate and said feeding electrode when said ion exchanger is present in this space; and a transport device for transporting the substrate between said substrate carry-in and carry-out section and said electrolytic processing device.

34. The substrate processing apparatus according to claim 33, further comprising a cleaning device for cleaning the substrate after having been processed by said electrolytic processing device.

35. The substrate processing apparatus according to claim 33, further comprising a CMP device for chemical mechanical polishing a surface of the substrate.

36. The substrate processing apparatus according to claim 35, further comprising a cleaning device for cleaning the substrate after having been polished by said CMP device.

37. The substrate processing apparatus according to claim 35, further comprising a film thickness-measuring section for measuring a film thickness of a portion to be processed, during or after polishing of the substrate by said CMP device.

38. The substrate processing apparatus according to claim 33, further comprising a film-forming device for forming a film, as a portion to be processed, on a surface of the substrate.

39. The substrate processing apparatus according to claim 38, further comprising at least one of a cleaning device for cleaning the portion to be processed, and an annealing device for annealing the portion to be processed.

40. The substrate processing apparatus according to claim 39, further comprising a bevel-etching device for etching a part of the portion to be processed that is adhering to a peripheral portion of the substrate.

41. The substrate processing apparatus according to claim 40, wherein said bevel-etching device is for etching the part of the portion to be processed by performing electrolytic processing.

42. The substrate processing apparatus according to claim 38, further comprising a film thickness-measuring section for measuring a film thickness of the portion to be processed, during or after formation of the film by said film-forming device.

43. The substrate processing apparatus according to claim 38, wherein said film-forming device is for forming the film by performing plating.

44. The substrate processing apparatus according to claim 33, further comprising a monitor for monitoring at least one of electrolytic current and electrolytic voltage when voltage is applied, by said power source, between said feeding electrode and said processing electrode.

45. The substrate processing apparatus according to claim 44, wherein said monitor is for further monitoring a change in a state of the substrate, while being processed, to detect an end point of processing.

46. The substrate processing apparatus according to claim 33, further comprising a drying device for finally drying the substrate after having been processed.

47. The substrate processing apparatus according to claim 33, further comprising a film-thickness detection section for detecting an end point of processing.

48. A substrate processing apparatus, comprising:
a substrate carry-in and carry-out section for carrying in and carrying out a substrate;
an electrolytic processing device including
(i) a processing electrode to be brought into contact with or close to a substrate,
(ii) a feeding electrode for supplying electricity to the substrate,
(iii) a power source for applying a voltage between said processing electrode and said feeding electrode, and
(iv) a liquid supply section for supplying pure water, or a liquid having an electric conductivity of not more than 500 μS/cm, between the substrate and said processing electrode while the substrate is being processed; and
a transport device for transporting the substrate between said substrate carry-in and carry-out section and said electrolytic processing device.

49. The substrate processing apparatus according to claim 48, further comprising a cleaning device for cleaning the substrate after having been processed by said electrolytic processing device.

50. The substrate processing apparatus according to claim 48, further comprising a CMP device for chemical mechanical polishing a surface of the substrate.

51. The substrate processing apparatus according to claim 50, further comprising a cleaning device for cleaning the substrate after having been polished by said CMP device.

52. The substrate processing apparatus according to claim 50, further comprising a film thickness-measuring section for measuring a film thickness of a portion to be processed, during or after polishing of the substrate by said CMP device.

53. The substrate processing apparatus according to claim 48, further comprising a film-forming device for forming a film, as a portion to be processed, on a surface of the substrate.

54. The substrate processing apparatus according to claim 53, further comprising at least one of a cleaning device for cleaning the portion to be processed, and an annealing device for annealing the portion to be processed.

55. The substrate processing apparatus according to claim 54, further comprising a bevel-etching device for etching a part of the portion to be processed that is adhering to a peripheral portion of the substrate.

56. The substrate processing apparatus according to claim 55, wherein said bevel-etching device is for etching the part of the portion to be processed by performing electrolytic processing.

57. The substrate processing apparatus according to claim 53, further comprising a film thickness-measuring section for measuring a film thickness of the portion to be processed during or after formation of the film by said film-forming device.

58. The substrate processing apparatus according to claim 53, wherein said film-forming device is for forming the film by performing plating.

59. The substrate processing apparatus according to claim 48, further comprising a monitor for monitoring at least one of electrolytic current and electrolytic voltage when voltage is applied, by said power source, between said feeding electrode and said processing electrode.

60. The substrate processing apparatus according to claim 59, wherein said monitor is for further monitoring a change in a state of the substrate, while being processed, to detect an end point of processing.

61. The substrate processing apparatus according to claim 48, further comprising a drying device for finally drying the substrate after having been processed.

62. The substrate processing apparatus according to claim 48, further comprising a film-thickness detection section for detecting an end point of processing.

* * * * *

UNITED STATES PATENT AND TRADEMARK OFFICE
CERTIFICATE OF CORRECTION

| | | |
|---|---|---|
| PATENT NO. | : 7,101,465 B2 | Page 1 of 1 |
| APPLICATION NO. | : 10/337357 | |
| DATED | : September 5, 2006 | |
| INVENTOR(S) | : Itsuki Kobata et al. | |

It is certified that error appears in the above-identified patent and that said Letters Patent is hereby corrected as shown below:

On the Front Page
In section (63), under Related U.S. Application Data, please change "Continuation-in-part of application No. 10/296,333, filed on February 21, 2002." to --Continuation-in-part of application No. 10/296,333, filed on November 22, 2002, now abandoned, which is the National Stage application of PCT/JP02/01545, filed on February 21, 2002.--.

Under Related U.S. Application Data, please delete --(60) Provisional application No. PCT/JP02/01545, filed on February 21, 2002, now abandoned.--.

In section (30), Foreign Application Priority Data, please add
-- June 18, 2001    (JP)    ......................2001-183822
   August 31, 2001    (JP)    ......................2001-264368
   December 28, 2001    (JP)    ......................2001-401436--.

Signed and Sealed this

Seventeenth Day of April, 2007

JON W. DUDAS
*Director of the United States Patent and Trademark Office*